(12) United States Patent
Tabata

(10) Patent No.: US 11,427,882 B2
(45) Date of Patent: Aug. 30, 2022

(54) COATED STEEL MEMBER, COATED STEEL SHEET, AND METHODS FOR MANUFACTURING SAME

(71) Applicant: NIPPON STEEL CORPORATION, Tokyo (JP)

(72) Inventor: Shinichiro Tabata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/291,507

(22) PCT Filed: Feb. 5, 2020

(86) PCT No.: PCT/JP2020/004427
§ 371 (c)(1),
(2) Date: May 5, 2021

(87) PCT Pub. No.: WO2020/162513
PCT Pub. Date: Aug. 13, 2020

(65) Prior Publication Data
US 2021/0355560 A1    Nov. 18, 2021

(30) Foreign Application Priority Data
Feb. 5, 2019   (JP) .............................. JP2019-018995

(51) Int. Cl.
| | |
|---|---|
| *C21D 9/46* | (2006.01) |
| *B32B 15/01* | (2006.01) |
| *C21D 6/00* | (2006.01) |
| *C21D 8/02* | (2006.01) |
| *C22C 21/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/24* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/54* | (2006.01) |
| *C23C 2/12* | (2006.01) |

(Continued)

(52) U.S. Cl.
CPC .............. *C21D 9/46* (2013.01); *B32B 15/012* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0263* (2013.01); *C22C 21/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/24* (2013.01); *C22C 38/42* (2013.01); *C22C 38/44* (2013.01); *C22C 38/48* (2013.01); *C22C 38/50* (2013.01); *C22C 38/54* (2013.01); *C23C 2/12* (2013.01); *C23C 2/40* (2013.01); *C23G 1/08* (2013.01)

(58) Field of Classification Search
CPC .......... B32B 15/012; C21D 1/18; C21D 1/26; C21D 1/673; C21D 2211/008; C21D 6/004; C21D 6/005; C21D 6/008; C21D 7/13; C21D 8/005; C21D 8/0205; C21D 8/0226; C21D 8/0257; C21D 8/0263; C21D 8/0278; C21D 9/46; C21D 21/00; C21D 38/001; C21D 38/002; C21D 38/005; C21D 38/008; C21D 38/02; C21D 38/04; C21D 38/06; C21D 38/08; C21D 38/12; C21D 38/14; C21D 38/16; C21D 38/20; C21D 38/22; C21D 38/24; C21D 38/26; C21D 38/28; C21D 38/32; C21D 38/34; C21D 38/38; C21D 38/42; C21D 38/44; C21D 38/48; C21D 38/50; C21D 38/54; C21D 38/58; C21D 38/60; C23C 2/02; C23C 2/12; C23C 2/28; C23C 2/40; C23C 28/023; C23G 1/08
See application file for complete search history.

(56) References Cited

U.S. PATENT DOCUMENTS

| | | | |
|---|---|---|---|
| 2005/0121119 | A1 | 6/2005 | Hasegawa et al. |
| 2012/0321903 | A1 | 12/2012 | Nakamaru et al. |
| 2013/0280552 | A1 | 10/2013 | Bae et al. |
| 2016/0312331 | A1 | 10/2016 | Cho et al. |
| 2017/0198152 | A1 | 7/2017 | Blumenau et al. |

(Continued)

FOREIGN PATENT DOCUMENTS

| | | |
|---|---|---|
| CN | 104233149 A | 12/2014 |
| CN | 107022702 A | 8/2017 |

(Continued)

OTHER PUBLICATIONS

Notice of Reasons for Refusal issued in JP Application No. 2020-537558 dated Sep. 16, 2020.

*Primary Examiner* — Jenny R Wu
(74) *Attorney, Agent, or Firm* — Birch, Stewart, Kolasch & Birch, LLP

(57) ABSTRACT

The present invention has as its object the provision of a coated steel member and coated steel sheet excellent in hydrogen embrittlement resistance in a corrosive environment and methods for manufacturing the same. The coated steel member of the present invention is provided on its surface with an Al—Fe-based coating containing Cu and one or more of Mo, Ni, Mn, and Cr in a total by mass % of 0.12% or more by heating, cooling, and manufacturing a coated steel sheet having a layer containing Cu on its surface under predetermined conditions.

15 Claims, 1 Drawing Sheet

(51) Int. Cl.
  *C23C 2/40* (2006.01)
  *C23G 1/08* (2006.01)

(56) References Cited

U.S. PATENT DOCUMENTS

| | | |
|---|---|---|
| 2017/0253941 A1 | 9/2017 | Cobo et al. |
| 2018/0216218 A1 | 8/2018 | Machado Amorim et al. |
| 2019/0249268 A1 | 8/2019 | Nakagawa et al. |
| 2020/0189233 A1 | 6/2020 | Suzuki et al. |

FOREIGN PATENT DOCUMENTS

| | | | |
|---|---|---|---|
| CN | 107904535 A | | 4/2018 |
| EP | 3 712 293 A1 | | 9/2020 |
| JP | 2002-102980 A | | 4/2002 |
| JP | 2003-183802 A | | 7/2003 |
| JP | 2003-268489 A | | 9/2003 |
| JP | 2004-124208 A | | 4/2004 |
| JP | 2004-250734 A | | 9/2004 |
| JP | 2004250734 A | * | 9/2004 |
| JP | 2011-122207 A | | 6/2011 |
| JP | 2011-246801 A | | 12/2011 |
| JP | 2012-1802 A | | 1/2012 |
| JP | 2012-1816 A | | 1/2012 |
| JP | 2012-41610 A | | 3/2012 |
| JP | 2012-62500 A | | 3/2012 |
| JP | 2012-180594 A | | 9/2012 |
| JP | 2014-503690 A | | 2/2014 |
| JP | 2015-113500 A | | 6/2015 |
| JP | 2017-508069 A | | 3/2017 |
| JP | 2017-525849 A | | 9/2017 |
| JP | 2017-528595 A | | 9/2017 |
| JP | 2017-179589 A | | 10/2017 |
| JP | 2018-527461 A | | 9/2018 |
| WO | WO 2018/158166 A1 | | 9/2018 |
| WO | WO 2018/221738 A1 | | 12/2018 |
| WO | WO-2018221738 A1 | * | 12/2018 ............... C23C 2/40 |

* cited by examiner

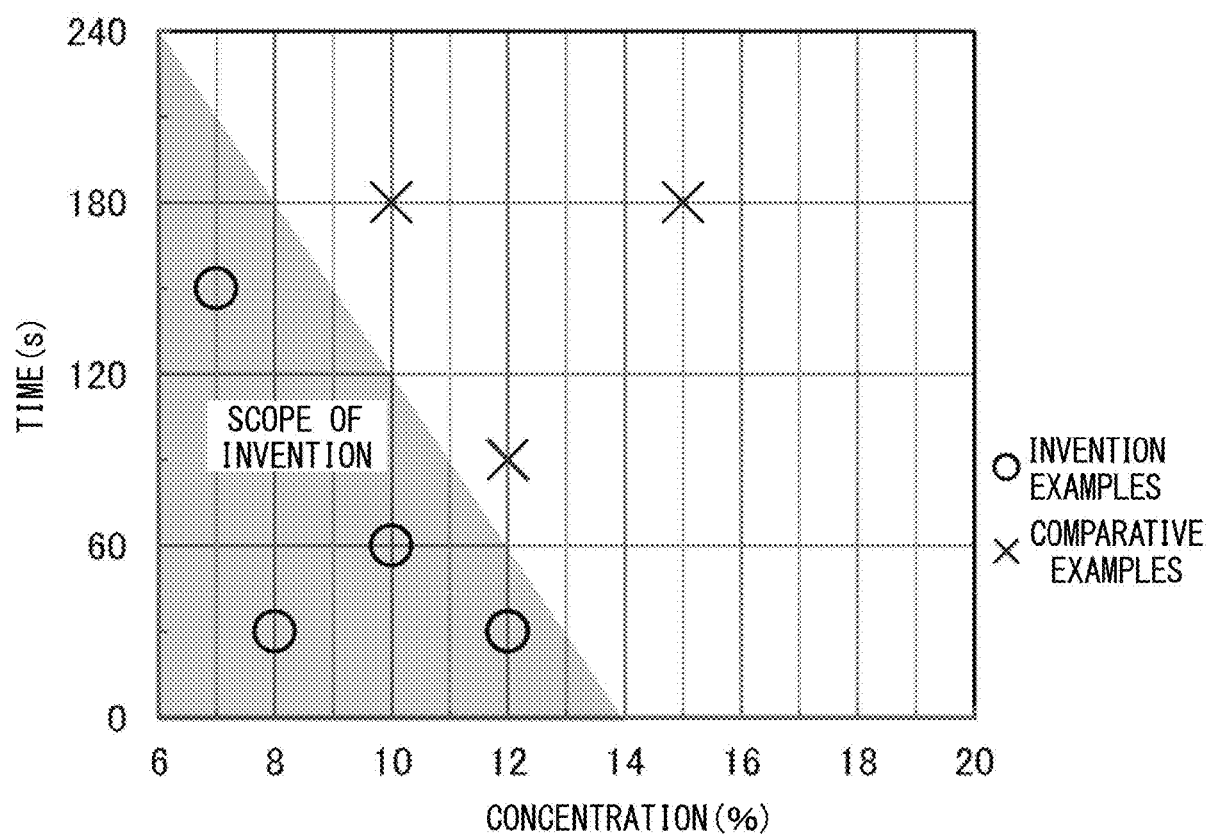

COATED STEEL MEMBER, COATED STEEL SHEET, AND METHODS FOR MANUFACTURING SAME

FIELD

The present invention relates to a coated steel member, coated steel sheet, and methods for manufacturing the same.

BACKGROUND

In the field of steel sheets for automobile use, due to the recent increasing severity of environmental regulations and collision safety standards, applications of steel sheet having high tensile strength are increasing so as to achieve both fuel efficiency and collision safety. However, along with the higher strength, the press formability of steel sheet falls, so it has become difficult to manufacture products with complicated shapes.

Specifically, due to the drop in ductility of steel sheet accompanying higher strength, the problem arises of fracture of the highly worked portions. Further, due to the residual stress after working, the problems arise that springback and wall camber occur and the dimensional precision deteriorates. Therefore, it is not easy to press form steel sheet having a high strength, in particular a tensile strength of 780 MPa or more, into a product having a complicated shape. Note that, if using not press forming, but roll forming, high strength steel sheet is easily worked, but applications have been limited to parts having uniform cross-sections in the longitudinal direction.

Therefore, in recent years, for example, as disclosed in PTLs 1 to 3, hot stamping has been employed as art for press-forming materials which are difficult to shape such as high strength steel sheet. Hot stamping is a hot shaping technology for heating a material before shaping, then shaping the material.

In this art, the material is heated, then shaped, so at the time of shaping, the steel material is soft and has good shapeability. Due to this, even if a high strength steel material, it is possible to precisely form it into a complicated shape. Further, in hot stamping, a press die is used for hardening during shaping, so after the shaping, the steel material has sufficient strength.

For example, according to PTL 1, hot stamping can be used to impart a tensile strength of 1400 MPa or more to a steel material after shaping.

CITATIONS LIST

Patent Literature

[PTL 1] Japanese Unexamined Patent Publication No. 2002-102980
[PTL 2] Japanese Unexamined Patent Publication No. 2012-180594
[PTL 3] Japanese Unexamined Patent Publication No. 2012-1802
[PTL 4] Japanese Unexamined Patent Publication No. 2003-183802
[PTL 5] Japanese Unexamined Patent Publication No. 2004-124208
[PTL 6] Japanese Unexamined Patent Publication No. 2012-62500
[PTL 7] Japanese Unexamined Patent Publication No. 2003-268489
[PTL 8] Japanese Unexamined Patent Publication No. 2017-179589
[PTL 9] Japanese Unexamined Patent Publication No. 2015-113500
[PTL 10] Japanese Unexamined Patent Publication No. 2017-525849
[PTL 11] Japanese Unexamined Patent Publication No. 2011-122207
[PTL 12] Japanese Unexamined Patent Publication No. 2011-246801
[PTL 13] Japanese Unexamined Patent Publication No. 2012-1816

SUMMARY

Technical Problem

At the present time, along with the establishment of challenging fuel efficiency targets in various countries, further higher strength steel materials are being demanded for lightening the weight of car bodies. Specifically, high strength steel materials of over the general strength of 1.5 GPa in hot stamping are considered necessary.

In this regard, if applying high strength steel materials of over a strength of 1 GPa to automobiles, not only the above-mentioned shapeability and toughness after shaping, but also hydrogen embrittlement resistance is demanded. If the hydrogen embrittlement resistance of high strength steel sheet is not sufficient, after an automobile is shipped to the market, the steel will corrode during use by the general user and the hydrogen generated along with the corrosion reaction may cause embrittlement cracking.

In a region over a strength of 1.5 GPa, the sensitivity of a steel material to hydrogen embrittlement rapidly increases, so hydrogen embrittlement cracking is a concern even at a surface coated steel sheet having corrosion resistance. Therefore, to commercially apply high strength steel materials of over 1.5 GPa to car bodies, art is necessary for providing a coated steel member provided with the conventional or better corrosion resistance and excellent in hydrogen embrittlement resistance in a corrosive environment.

Regarding high strength steel materials of over 1.5 GPa, for example, in PTL 2, a press formed article excellent in toughness and having a tensile strength of 1.8 GPa or more which is formed by hot pressing is disclosed. However, the measures against hydrogen embrittlement in a corrosive environment are not sufficient. In use as an automobile member, sometimes greater safety demands are not answered.

Further, in PTL 3, a steel material having an extremely high tensile strength of 2.0 GPa or more and further having excellent toughness and ductility is disclosed. However, the measures against hydrogen embrittlement in a corrosive environment are not sufficient. In use as an automobile member, sometimes greater safety demands are not answered.

Regarding corrosion resistance, for example in PTL 4, high strength Al-plated steel sheet excellent in corrosion resistance after coating is disclosed. However, there is no description regarding hydrogen embrittlement resistance. This is unsuitable for actual use of a high strength material of over 1.5 GPa.

Further, in PTL 5, high strength surface treated steel sheets having Ni, Cu, Cr, and Sn layers excellent in corrosion resistance after coating are disclosed and in PTL 6, Ni, Cr, Cu, and Co plated coated steel materials are disclosed. However, there are no descriptions regarding hydrogen embrittlement resistance. These are unsuitable for actual use of a high strength material of over 1.5 GPa.

Regarding hydrogen embrittlement resistance, for example, in PTLs 7, 8, and 9, hot stamped materials excellent in hydrogen embrittlement resistance in a hydrochloric acid immersion environment are disclosed. However, the hydrogen embrittlement resistance in an air corrosive environment and the hydrogen embrittlement resistance in a solution immersion environment of hydrochloric acid etc. often do not match. These materials are unsuitable for practical use of high strength materials of over 1.5 GPa.

Further, in PTL 10, a hot stamping material with the Ni in the steel concentrated at the surface layer is disclosed and it is described that this has the effect of suppressing hydrogen penetration at the time of heating in the hot stamping process. However, there is no description relating to the hydrogen embrittlement resistance in a corrosive environment at the time of actual use. This is unsuitable for actual use of a high strength material of over 1.5 GPa.

Further, in PTLs 11, 12, and 13, hot stamping materials in which Ni diffuses from an Ni-based plating layer to the surface layer of the steel sheet is disclosed and it is described that this has the effect of suppressing hydrogen penetration in a corrosive environment. However, the hydrogen embrittlement resistance of the steel material is not sufficient, so this is unsuitable for actual use of a high strength steel material of over 1.5 GPa.

The present invention was made so as to solve the above problem and has as its object the provision of a coated steel member and coated steel sheet having high tensile strength and excellent in hydrogen embrittlement resistance in a corrosive environment and methods for manufacturing the same.

Solution to Problem

The present invention has as its gist the following coated steel member, coated steel sheet, and methods for manufacturing the same. Below, steel sheet which is not coated and is used as a material of coated steel sheet will be simply referred to as "steel sheet".

(1) A coated steel member comprising an Al—Fe-based coating on its surface, the Al—Fe-based coating containing Cu and one or more of Mo, Ni, Mn, and Cr in a total by mass % of 0.12% or more, the contents of Cu, Mo, Ni, Mn, and Cr satisfying, by mass %, Cu+0.01×63.5(Mo/95.9+Ni/58.7+Mn/54.9+Cr/52.0)≥0.12%.

(2) The coated steel member of (1) wherein a thickness of the Al—Fe-based coating is 10 to 100 μm and the chemical composition of the Al—Fe-based coating satisfies, by mass %, an average value of Al content in a thickness direction: 20.0% or more, an average value of Fe content in the thickness direction: 50.0% or more, a minimum value of Cu content in the thickness direction: 0.06% or more, and a ratio of a maximum value and minimum value of Cu content in the thickness direction: 1.4 or more.

(3) The coated steel member of (1) or (2) wherein a chemical composition of the part of the coated steel member other than the Al—Fe-based coating comprises, by mass %, C: 0.25 to 0.60%, Si: 0.25 to 2.00%, Mn: 0.30 to 3.00%, P: 0.050% or less, S: 0.0100% or less, N: 0.010% or less, Ti: 0.010 to 0.100%, B: 0.0005 to 0.0100%, Mo: 0.10 to 1.00%, Cu: 0.01 to 1.00%, Cr: 0 to 1.00%, Ni: 0 to 1.00%, V: 0 to 1.00%, Ca: 0 to 0.010%, Al: 0 to 1.00%, Nb: 0 to 0.10%, Sn: 0 to 1.00%, W: 0 to 1.00%, Sb: 0 to 1.00%, REMs: 0 to 0.30%, and balance: Fe and impurities.

(4) The coated steel member of any of (1) to (3) wherein the Al—Fe-based coating contains, by mass %, Si in 1 to 20%.

(5) A coated steel sheet having a layer where Cu is concentrated at a surface of a steel sheet, having a degree of Cu surface concentration at the layer where Cu is concentrated of 1.2 or more, further having an Al-based coating on the layer where Cu is concentrated, and having an average crystal grain size of the steel sheet of 30 μm or less. Here, the "degree of Cu surface concentration" shows the ratio of (maximum content of Cu in range from surface of steel sheet to depth of 0 to 30 μm)/(average content of Cu from surface of steel sheet to depth of 200 μm), while the "surface of steel sheet" means the position of a depth where the Fe content becomes 90% when performing GDS from the surface of the coated steel sheet in the thickness direction.

(6) A coated steel sheet comprised of a steel sheet, an intermediate layer positioned on a surface of the steel sheet, and an Al-based coating positioned on a surface of the intermediate layer, the intermediate layer containing Cu, the intermediate layer containing Cu and one or more of Mo, Ni, Mn, and Cr in a total by mass % of 30% or more.

(7) A coated steel sheet comprised of a steel sheet and an Al-based coating positioned on a surface of the steel sheet, the Al-based coating containing Cu, the Al-based coating containing Cu and one or more of Mo, Ni, Mn, and Cr in a total by mass % of 1.0% or more.

(8) The coated steel sheet of any of (5) to (7) wherein a chemical composition of the steel sheet comprises, by mass %, C: 0.25 to 0.60%, Si: 0.25 to 2.00%, Mn: 0.30 to 3.00%, P: 0.050% or less, S: 0.0100% or less, N: 0.010% or less, Ti: 0.010 to 0.100%, B: 0.0005 to 0.0100%, Mo: 0.10 to 1.00%, Cu: 0.01 to 1.00%, Cr: 0 to 1.00%, Ni: 0 to 1.00%, V: 0 to 1.00%, Ca: 0 to 0.010%, Al: 0 to 1.00%, Nb: 0 to 0.10%, Sn: 0 to 1.00%, W: 0 to 1.00%, Sb: 0 to 1.00%, REMs: 0 to 0.30%, and balance: Fe and impurities.

(9) A method for manufacturing the coated steel sheet of (5), the method comprising the steps of: heating a slab at 1100 to 1350° C., hot rolling the heated slab to obtain hot rolled steel sheet under conditions where, when defining a time $t_1$ (hr) from an end of rough rolling to a start of finish rolling and an average temperature $T_1$ (° C.) of a rough bar from the end of rough rolling to the start of finish rolling, $(T_1+273)\times(\log t_1+20)\geq 20000$ and a finish rolling end temperature becomes an $Ar_3$ point to 1000° C., cooling the above hot rolled steel sheet by an average cooling rate of 10° C./s, coiling the steel sheet after cooling at 700° C. or less, and pickling the steel sheet after coiling.

(10) The method of (3) wherein in the step of pickling hydrochloric acid or sulfuric acid is used, a pickling temperature is 80 to 90° C., and an acid concentration a (%) and pickling time "t" (s) satisfy 6≤α<14, 0<t≤420−30×α.

(11) A method for manufacturing the coated steel member of any of (1) to (4), the method comprising the steps of: heating the coated steel sheet of any of (5) to (8) under conditions where, when defining a peak temperature as $T_2$ (° C.) and a time from when a temperature of the coated steel sheet reaches a temperature lower by 10° C. from $T_2$ (° C.) as $t_2$ (hr), $(T_2+273-10)\times(\log t_2+20)\geq 19000$, an $Ac_3$ point≤$T_2$≤($Ac_3$ point+300)° C., and an average rate of temperature rise 5 to 1000° C./s, and cooling the heated coated steel sheet down to an Ms point by an average cooling rate made an upper critical cooling rate or more, then cooling from the Ms point down to 100° C. or less by an average cooling rate of 5° C./s or more.

(12) The method of (11), wherein the coated steel sheet is hot shaped during cooling down to the Ms point.

Advantageous Effects of Invention

According to the present invention, it is possible to provide a coated steel member and coated steel sheet having high tensile strength and excellent in hydrogen embrittlement resistance in a corrosive environment and methods for manufacturing the same.

BRIEF DESCRIPTION OF DRAWINGS

FIG. 1 is a view showing the relationship between acid concentration and time in pickling in the present invention.

DESCRIPTION OF EMBODIMENTS

First, details of studies by the inventors in investigating the effects of chemical constituents and structure on properties so as to obtain a coated steel member having a high tensile strength and excellent in hydrogen embrittlement resistance in a corrosive environment will be explained.

Most of the steel sheet for hot stamping produced in Japan and overseas aiming at corrosion resistance are surface coated steel sheet obtained by aluminum coating or galvanization. If these coated steel sheet are hot stamped, alloying reactions proceed at the surface and a coated steel member having an Al—Fe-based coating or Zn—Fe-based plating is obtained. Note that most steel sheet are similar in chemical composition and exhibit strengths of the 1.5 GPa class after hot stamping due to C, which is included in 0.20 mass % or so.

(a) The inventors engaged in detailed studies for further lightening the weight of car bodies by increasing C to 0.25 mass % or more and applying over 1.5 GPa high strength steel materials to the bodies of automobiles. As a result, it was learned that even when applying an Al-based or Zn-based coating such as explained above, there is a high risk of hydrogen embrittlement cracking.

In the strength region over a strength of 1.5 GPa, the susceptibility of a steel material to hydrogen embrittlement rapidly increases. Embrittlement cracking occurs even with a trace amount of hydrogen produced, so it was guessed that even when applying an Al-based or Zn-based coating such as explained above, the corrosion resistance is not sufficient and hydrogen embrittlement cracking occurs due to a trace amount of hydrogen at a portion where moderate corrosion has progressed.

(b) The inventors tackled the improvement of corrosion resistance based on the mechanism of hydrogen embrittlement in a corrosive environment of a high strength steel material of over 1.5 GPa described above. As a result, they discovered that by including Cu in the surface Al—Fe-based coating of a coated steel member, the corrosion resistance is greatly improved and the hydrogen embrittlement resistance in a corrosive environment can be dramatically raised.

(c) Furthermore, the inventors discovered that if including the corrosion resistance elements of Mo, Ni, Mn, and Cr in the above Al—Fe-based coating in addition to Cu, the corrosion resistance is further improved. Further, in addition to the corrosion resistance, they optimized the chemical composition and structure of steel materials with a strength over 1.5 GPa to reduce the susceptibility to hydrogen embrittlement. That is, they improved the corrosion resistance over a conventional Al—Fe-based coating to prevent production of hydrogen accompanying a corrosion reaction and improved the hydrogen embrittlement resistance of steel materials even if hydrogen is generated and thereby developed technology for withstanding actual use of automobiles etc. even in a corrosive environment.

The present invention was made based on the above findings. Below, the requirements of the coated steel member, coated steel sheet, and methods for manufacturing the same according to one embodiment of the present invention will be explained in detail.

(A) Coated Steel Member (A1) Coating of Coated Steel Member

The coated steel member according to the present embodiment has on its surface an Al—Fe-based coating containing Cu and one or more of Mo, Ni, Mn, and Cr in a total by mass % of 0.12% or more so as to satisfy the following formula (1). Note that, in the following explanation, the "%" regarding content will mean "mass %". Further, an "Al—Fe-based coating" is a coating mainly comprised of Al and Fe. The Al and Fe are preferably included in a total of 70% or more. Further, an "Al—Fe-based coating" also means a film, alloyed plated layer, or intermetallic compound layer.

$$Cu+0.01\times 63.5(Mo/95.9+Ni/58.7+Mn/54.9+Cr/52.0)\geq 0.12\% \quad \text{formula (1)}$$

The element symbols in the formula (1) show the contents of the elements of the Al—Fe-based coating (mass %). Further, below, the left side of formula (1) will be called the "concentration of corrosion resistance elements".

An Al—Fe-based coating provided on the surface of a coated steel member and containing the corrosion resistance elements Cu and Mo, Ni, Mn, and Cr exhibits excellent corrosion resistance at the time of use of the member and has the effect of improving the hydrogen embrittlement resistance in a corrosive environment. If the concentration of corrosion resistance elements in the Al—Fe-based coating is less than 0.12%, the corrosion resistance at the time of use of the member will not be sufficient and the risk of hydrogen embrittlement accompanying corrosion will rise. Therefore, the concentration of corrosion resistance elements in the Al—Fe-based coating is made 0.12% or more. Preferably, it is 0.14% or more. The upper limit of the concentration of corrosion resistance elements is not particularly prescribed, but if over 1%, sometimes the above effect becomes saturated and the economicalness falls.

The Al—Fe-based coating may further contain Si in 1.0 to 20.0%. As explained later, the Al-based coating of coated steel sheet often has Si added to it. In that case, the Al—Fe-based coating of the coated steel member also contains Si. In an Al—Fe-based coating containing Si, the crystal structures of the intermetallic compounds become dense and there is the effect that the corrosion resistance is improved. Note that, even if Si is contained in 1 to 20%, if the above-mentioned concentration of corrosion resistance elements is 0.12% or more, the hydrogen embrittlement resistance in a corrosive environment becomes excellent. Note that, chemical composition of the Al—Fe-based coating is, by average value in the thickness direction, by mass %, Si: 0 to 20.0%, Cu: 0.06 to 3.0%, Mo: 0 to 5.0%, Ni: 0 to 5.0%, Mn: 0 to 8.0, Cr: 0 to 8.0%, Al: 5.0 to 60.0%, Fe: 30.0 to 90.0%, and a balance of impurities where Al+Fe: 70.0% or more. Al+Fe, that is, the total of the content of Al and the content of Fe, may be made 75.0% or more, 80.0% or more, or 85.0% or more.

The concentration of corrosion resistance elements in the Al—Fe-based coatings and the content of Si can be found in the following way.

GDS (glow discharge optical emission spectrometry) is performed in the thickness direction from the surface of the coated steel member to find the maximum contents of Cu, Mo, Ni, Mn, Cr, and Si in the Al—Fe-based coating. The measurement by GDS is performed at five random points at a position of ¼ of the sheet width (short side) from an end of the coated steel member in the width direction, the maximum amounts of Cu, Mo, Ni, Mn, and Cr in the Al—Fe-based coating at the different points were found, and the average values of the different elements at the five points were used by the formula (1) to find the concentration of corrosion resistance elements in the Al—Fe-based coating. Note that, "Al—Fe-based coating" shall mean the region where the content of Fe becomes less than 90% when performing GDS from the surface of the coated steel member. Note that, at the surface most layer, sometimes oxide scale and impurities are present, so the content of O is also measured and measurement values of the concentration of corrosion resistance elements in the range of thickness where the content of O is 1.0% or more are excluded.

The thickness of the Al—Fe-based coating is preferably 10 μm or more or 30 μm or more and preferably 100 μm or less or 80 μm. The content of Al in the Al—Fe-based coating is, by average value in the thickness direction, preferably 20.0% or more, 30.0% or more, or 40.0% or more while the content of Fe in the Al—Fe-based coating is preferably 50% or more or 60.0% or more.

The Al—Fe-based coating of the coated steel member of the present invention, as explained above, contains Cu. Due to this, it is possible to raise the hydrogen embrittlement resistance in a corrosive environment. By making the content of Cu near the boundary of the Al—Fe-based coating and steel sheet higher, it is possible to further lower the risk of hydrogen embrittlement. Specifically, in the Al—Fe-based coating, the minimum value of the content of Cu in the thickness direction is preferably made 0.06% or more and the ratio of the maximum value and minimum value of the content of Cu in the thickness direction is preferably made 1.4 or more.

(A2) Chemical Composition of Coated Steel Member

The reasons for limitation of the elements of the coated steel member according to the present embodiment are as follows. Here, the "chemical composition of the coated steel member" shall mean the average chemical composition of the part of the coated steel member other than the Al—Fe-based coating at the surface.

C: 0.25 to 0.60%

C is an element which raises the hardenability of steel and improves the strength of the coated steel member after hardening. However, with a content of C of less than 0.25%, it becomes difficult to secure sufficient strength in the coated steel member after hardening. Therefore, the content of C is made 0.25% or more. On the other hand, if the content of C is over 0.60%, the strength of the coated steel member after hardening becomes too high and the toughness and hydrogen embrittlement resistance remarkably deteriorate. Therefore, the content of C is made 0.60% or less. The content of C is preferably 0.29% or more or 0.31% or more and is preferably 0.55% or less, 0.50% or less, 0.48% or less, or 0.44% or less.

Si: 0.25 to 2.00%

Si is an element which is effective for raising the hardenability of steel and stably securing the strength after hardening. To obtain this effect, Si must be included in 0.25% or more. However, if the content of Si in the steel is over 2.00%, at the time of heat treatment, the heating temperature required for austenite transformation becomes remarkably high. Due to this, sometimes a rise in costs required for heat treatment is invited. Furthermore, a deterioration of toughness of the hardened part is invited. Therefore, the content of Si is made 2.00% or less. The content of Si is preferably 0.30% or more or 0.35% or more and is preferably 1.60% or less, 1.00% or less, 0.80% or less, or 0.60% or less.

Mn: 0.30 to 3.00%

Mn is an element which is extremely effective for raising the hardenability of steel sheet and stably securing the strength after hardening. Furthermore, it is an element lowering the $Ac_3$ point and promoting lowering of the hardening treatment temperature. Further, it has the effect of diffusing in an Al—Fe-based coating to improve the corrosion resistance. However, if the content of Mn is less than 0.30%, this effect is not sufficiently obtained. On the other hand, if the content of Mn is over 3.00%, the above effect becomes saturated and a deterioration of toughness or hydrogen embrittlement resistance of the hardened part is invited. Therefore, the content of Mn is made 0.30 to 3.00% The content of Mn is preferably 0.40% or more, 0.50% or more, or 0.60% or more. Further, the content of Mn is preferably 2.80% or less or 2.00%, more preferably 1.50% or less, 1.20% or less, or 0.90% or less.

P: 0.050% or less

P is an element causing a deterioration of toughness or hydrogen embrittlement resistance of the coated steel member after hardening. In particular, if the content of P is over 0.050%, the deterioration of toughness or hydrogen embrittlement resistance becomes remarkable. Therefore, the content of P is limited to 0.050% or less. The content of P is preferably limited to 0.020% or less, 0.010% or less, or 0.005% or less. The lower limit of the content of P is 0%. For reducing the refining costs, the lower limit of the content of P may be made 0.0001% or 0.001%.

S: 0.0100% or Less

S is an element causing a deterioration of toughness or hydrogen embrittlement resistance of the coated steel member after hardening. In particular, if the content of S is over 0.0100%, the deterioration of toughness or hydrogen embrittlement resistance becomes remarkable. Therefore, the content of S is limited to 0.0100% or less. The content of S is preferably limited to 0.0070% or less or 0.0050% or less. The lower limit of the content of S is 0%. For reducing the steelmaking costs for reducing the content of S, the lower limit of the content of S may be made 0.0001% or 0.0005%.

N: 0.010% or Less

N is an element causing a deterioration of toughness of the coated steel member after hardening. In particular, if the content of N is over 0.010%, coarse nitrides are formed in the steel and the toughness remarkably deteriorates. Therefore, the content of N is made 0.010% or less. The lower limit of the content of N is 0%. Reducing the content of N to less than 0.0002% invites an increase in steelmaking costs and is not economically preferable, so the content of N is preferably made 0.0002% or more, more preferably 0.0008% or more.

Ti: 0.010 to 0.100%

Ti is an element having the action of suppressing recrystallization when heating steel sheet to the $Ac_3$ point or more in temperature to heat treat it and of forming fine carbides to suppress grain growth and thereby make the austenite grains finer. For this reason, by including Ti, the effect is obtained of the toughness of the steel member greatly being improved. Further, Ti bonds with the N in the steel with priority to thereby suppress the consumption of B by precipitation of BN and promotes the effect of improvement of hardenability due to B explained later. With a content of Ti of less than 0.010%, the above effect is not sufficiently obtained. Therefore, the content of Ti is made 0.010% or more. On the other hand, if the content of Ti is over 0.100%, the amount of precipitation of TiC increases and C is consumed, so the strength of the coated steel member after hardening falls. Therefore, the content of Ti is made 0.100% or less. The content of Ti is preferably 0.015% or more or 0.025% or more and preferably 0.0800% or less or 0.045% or less.

B: 0.0005 to 0.0100%

B, even in fine amounts, has the action of dramatically raising the hardenability of steel, so is an important element in the present invention. Further, B precipitates at the grain boundaries to thereby strengthen the grain boundaries and improve the toughness and hydrogen embrittlement resistance. Furthermore, B suppresses grain growth of austenite at the time of heating the steel sheet. With a content of B of less than 0.0005%, the above effect sometimes cannot be sufficiently obtained. Therefore, the content of B is made 0.0005% or more. On the other hand, if the content of B is over 0.0100%, coarse compounds precipitate in large amounts and the toughness or hydrogen embrittlement resistance of the steel member deteriorates. Therefore, the content of B is made 0.0100% or less. The content of B is preferably 0.0010% or more, 0.0015% or more, or 0.0020% or more and preferably 0.0050% or less or 0.0030% or less.

Mo: 0.10 to 1.00%

Mo is an element which is extremely effective for raising the hardenability of steel sheet and stably securing the strength after hardening. Further, Mo segregates at the grain boundaries to thereby strengthen the grain boundaries and improve the toughness or hydrogen embrittlement resistance. Further, it has the effect of diffusing in the Al—Fe-based coating to raise the corrosion resistance. However, if the content of Mo is less than 0.10%, this effect is not sufficiently obtained. On the other hand, if the content of Mo is over 1.00%, the above effect becomes saturated and the economicalness falls. Further, Mo has the action of stabilizing the iron carbides, so if the content of Mo is over 1.00%, coarse iron carbides remain without being melted at the time of heating the steel sheet and the toughness of the steel member after hardening deteriorates. Therefore, the content of Mo if included is made 1.0% or less. The content of Mo is preferably 0.15% or more or 0.19% or more and is preferably 0.80% or less, 0.50% or less, or 0.30% or less.

Cu: 0.01 to 1.00%

Cu greatly improves the corrosion resistance in a corrosive environment in an Al—Fe-based coating and prevents hydrogen embrittlement cracking, so is an extremely important element in the present invention. However, it need not be included in the part of the steel sheet other than the coating. If Cu is contained in the steel, it diffuses to the Al—Fe-based coating and improves the corrosion resistance. Further, it is an element able to raise the hardenability of steel and stably secure the strength of the steel member after hardening. To obtain this effect, the content of Cu is preferably made 0.15% or more. On the other hand, if the content of Cu is over 1.00%, that effect becomes saturated and furthermore deterioration of the toughness or hydrogen embrittlement resistance of the coated steel member after hardening is invited. The content of Cu is preferably 0.18% or more or 0.20% or more. Further, the content of Cu is preferably 0.80% or less, 0.50% or less, or 0.35% or less.

The coated steel member of the present embodiment may further be made to include, in addition to the above elements, one or more elements selected from Cr, Ni, V, Ca, Al, Nb, Sn, W, Sb, and REMs shown below in order to raise the strength, toughness, and deoxidizing property. Further, these elements need not be included either. The lower limits of the contents of these elements are all 0%.

Cr: 0 to 1.00%

Cr is an element able to raise the hardenability of steel and stably secure the strength of the steel member after hardening, so may be included. Further, it has the effect of diffusing in the Al—Fe-based coating to improve the corrosion resistance. However, if the content of Cr is over 1.00%, that effect becomes saturated and an increase in costs is needlessly invited. Further, Cr has the action of stabilizing the iron carbides, so if the content of Cr is over 1.00%, coarse iron carbides remain without being melted at the time of heating the steel sheet and the toughness of the coated steel member after hardening deteriorates. Therefore, the content of Cr if included is made 1.00% or less. The content of Cr is preferably 0.80% or less or 0.50% or less. To obtain the above effect, the content of Cr is more preferably 0.01% or more or 0.05% or more. If the above effect does not have to be obtained, it may be made 0.05% or less or 0.01% or less.

Ni: 0 to 1.00%

Ni is an element which raises the hardenability of steel and stably secures the strength of the steel member after hardening, so may be included. Further, it has the effect of diffusing in the Al—Fe-based coating to improve the corrosion resistance. However, if the content of Ni is over 1.00%, the above effect becomes saturated and the economicalness falls. Therefore, the content of Ni if included is made 1.00% or less. The content of Ni may be made 0.80% or less or 0.50% or less. To obtain the above effect, Ni is preferably contained in 0.01% or more, more preferably is contained in 0.10% or more.

V: 0 to 1.00%

V is an element able to form fine carbides and raise the toughness due to the grain refining effect, so may be included. However, if the content of V is over 1.00%, the above effect becomes saturated and the economicalness falls. Therefore, the content of V if included is made 1.00% or less. To obtain the above effect, V is preferably included in 0.01% or more, more preferably is included in 0.10% or more. If the above effect does not have to be obtained, it may be made 0.10% or less or 0.01% or less.

Ca: 0 to 0.010%

Ca is an element which has the effect of refining inclusions in the steel and improving the toughness after hardening, so may be included. However, if the content of Ca is over 0.010%, that effect is saturated and an increase in costs is needlessly invited. Therefore, if containing Ca, the content is made 0.010% or less. The content of Ca is preferably 0.005% or less, more preferably 0.004% or less. If desiring to obtain the above effect, the content of Ca is preferably made 0.001% or more, more preferably is made 0.002% or more. If the above effect does not have to be obtained, it may be made 0.002% or less or 0.001% or less.

Al: 0 to 1.00%

Al is generally used as a deoxidizer of steel, so may be included. However, if the content of Al (however, not content of sol-Al, but content of T-Al) is over 1.00%, the above effect becomes saturated and the economicalness falls. Therefore, the content of Al if included is made 1.00% or less. The content of Al may be 0.10% or less or 0.05% or less. To obtain the above effect, Al is preferably included in 0.01% or more. If the above effect does not have to be obtained, it may be made 0.01% or less.

Nb: 0 to 0.10%

Nb is an element able to form fine carbides and raise the toughness due to the grain refining effect, so may be included. However, if the content of Nb is over 0.10%, the above effect becomes saturated and the economicalness falls. Therefore, the content of Nb if included is made 0.10% or less. The content of Nb may also be made 0.06% or less or 0.04% or less. To obtain the above effect, Nb is preferably included in 0.01% or more. If the above effect does not have to be obtained, it may be made 0.01% or less.

Sn: 0 to 1.00%

Sn improves the corrosion resistance in a corrosive environment, so may be included. However, if the content of Sn is over 1.00%, the intergranular strength falls and the toughness of the coated steel member after hardening deteriorates. Therefore, the content of Sn if included is made 1.00% or less. The content of Sn may be made 0.50% or less, 0.10%, or 0.04% or less. To obtain the above effect, Sn is preferably contained in 0.01% or more. If the above effect does not have to be obtained, it may be made 0.01% or less.

W: 0 to 1.00%

W is an element which raises the hardenability of steel and stably secures the strength of the coated steel member after hardening, so may be included. Further, W improves the corrosion resistance in a corrosive environment. However, if the content of W is over 1.00%, the above effect becomes saturated and the economicalness falls. Therefore, the content of W if included is made 1.00% or less. The content of W may be made 0.50% or less, 0.10%, or 0.04% or less. To obtain the above effect, W is preferably contained in 0.01% or more. If the above effect does not have to be obtained, it may be made 0.01% or less.

Sb: 0 to 1.00%

Sb improves the corrosion resistance in a corrosive environment, so may be included. However, if the content of Sb is over 1.00%, the intergranular strength falls and the toughness of the coated steel member after hardening deteriorates. Therefore, the content of Sb if included is made 1.00% or less. The content of Sn may also be made 0.50% or less or 0.10% or 0.04% or less. To obtain the above effect, Sb is preferably contained in 0.01% or more. If the above effect does not have to be obtained, it may be made 0.01% or less.

REMs: 0 to 0.30%

REMs are elements having the effect, like Ca, of refining inclusions in the steel and improving the toughness of the coated steel member after hardening, so may be included. However, if the content of REMs is over 0.30%, that effect becomes saturated and an increase in costs is needlessly invited. Therefore, the content of REMs if included is made 0.30% or less. The content of REMs is preferably 0.20% or less or 0.05% or less. If desiring to obtain the above effect, the content of REMs is preferably made 0.01% or more, more preferably is made 0.02% or more. If the above effect does not have to be obtained, it may be made 0.01% or less or 0.0010% or less.

Here, "REMs" indicates a total of 17 elements including Sc, Y, La, Nd, and other lanthanoids. The above "content of REMs" means the total content of these elements. REMs are added to the molten steel for example using Fe—Si-REM alloys. The alloys contain for example La, Nd, Ce, and Pr.

In the chemical compositions of the coated steel member of the present embodiment, the remainders other than the elements explained above, that is, the balances, are comprised of Fe and impurities.

Here, "impurities" mean constituents which enter from the ore, scraps, and other raw materials and various factors in the manufacturing process when industrially manufacturing steel sheet and are allowable in a range not having a detrimental effect on the present invention.

(A3) Structure of Heat Treated Coated Steel Member

The structure present in the coated steel member according to the present embodiment is a structure mainly comprised of high strength martensite. 70% or more by area ratio is martensite. Preferably, the content is 80% or more, more preferably 90% or more.

As the balance, retained austenite, bainite, ferrite, and pearlite may be included. Note that, the above-mentioned martensite also includes tempered or auto-tempered martensite. Auto-tempered martensite is martensite formed during the cooling at the time of hardening without performing heat treatment for tempering and is formed by the martensite formed being tempered on the spot by the heat generated along with martensite transformation.

(A4) Properties of Steel Member

The coated steel member of the present embodiment can be given excellent hydrogen embrittlement resistance in a corrosive environment due to the effect of corrosion resistance of the Al—Fe-based coating containing Cu and one or more of Mo, Ni, Mn, and Cr in a total by mass % of 0.12% or more so as to satisfy the above formula (1) on its surface.

Further, the coated steel member according to the present embodiment desirably not only has hydrogen embrittlement resistance in a corrosive environment, but also has a high strength of a tensile strength over 1500 MPa.

In the present embodiment, the hydrogen embrittlement resistance in a corrosive environment is evaluated by an exposure test in an actual environment of the coated steel member or an accelerated corrosion test using CCT (cyclic corrosion test). As the accelerated corrosion test, for example, the coated steel member is bent while supported at four points, subjected to a CCT based on the neutral salt spray cyclic test method described in JIS H 8502: 1999, and evaluated by the limit number of cycles where hydrogen embrittlement cracking does not occur.

Above, the coated steel member according to the present embodiment was explained, but the shape of the coated steel member is not particularly limited. That is, it may be a flat sheet, but in particular hot shaped coated steel members are in many cases shaped articles. In the present embodiment, both the case of a shaped member and the case of a flat sheet will be referred to together as a "coated steel member". The thickness of the coated steel member does not particularly have to be prescribed, but may be 0.5 to 5.0 mm. The upper limit of the thickness may be made 4.0 mm or 3.2 mm while the lower limit may be made 0.8 mm or 1.0 mm. The tensile strength of the steel member may be made over 1500 MPa, but if necessary many also be made 1700 MPa or more, 1800 MPa or more, or 1900 MPa or more. The upper limit of the tensile strength does not particularly have to be prescribed, but may be 2500 MPa or less or 2300 MPa or less.

(B) Coated Steel Sheet

Next, the coated steel sheet will be explained.

(B1) Chemical Composition of Coated Steel Sheet

The chemical composition of the steel sheet forming the coated steel sheet (however, in the case of the later explained Morphology Y, the base sheet before formation of the intermediate layer, while in the case of the later explained Morphology Z, the base sheet before formation of the Al-based coating) is the same as the chemical composition of the coated steel member explained above. The reasons for limitation are also similar.

(B2) Content of Cu and Coating of Surface of Steel Sheet

The coated steel sheet according to the present embodiment has a layer containing Cu on the surface of the steel sheet. As specific embodiments, the following three morphologies are preferable. Similar effects can be obtained in each of the morphologies.

(B2X) Morphology X

The coated steel sheet according to the present embodiment has, as the layer containing Cu, a layer where Cu is concentrated on the surface of the steel sheet and has, on top of that, an Al-based coating.

In addition to the Fe of the main constituent of the steel sheet, the Cu concentrated at the surface of the steel sheet diffuses in the Al-based coating to form an Al—Fe-based coating containing Cu and other corrosion resistance elements in the later explained heat treatment to thereby have the effect of suppressing production of hydrogen accompanying corrosion and improving the hydrogen embrittlement resistance in a corrosive environment. If the "degree of Cu surface concentration", defined as the ratio between the maximum value of the content of Cu in a range of a depth of 0 to 30 μm from the surface of the steel sheet and the average content of Cu at a depth of 200 μm from the surface of the steel sheet, is 1.2 or more, the concentration of corrosion resistance elements of the coated steel member becomes sufficiently high and the risk of hydrogen embrittlement accompanying corrosion becomes lower, so this is preferable. The degree of Cu surface concentration is more preferably 1.4 or more. The upper limit of the surface concentration of Cu does not have to be prescribed, but may be 2.5 or 2.1.

The surface concentration of Cu is found as follows:

GDS (glow discharge optical emission spectrometry) is performed in the thickness direction from the surface of the Al-based coated steel member to detect the content of Cu. At this time, GDS is performed from the surface of the steel member and the position of the depth where the content of Fe becomes 90% is found. The value of the maximum value of the content of Cu in a range of a depth of 0 to 30 μm from the position where the content of Fe becomes 90% divided by the content of Cu at the position of a depth of 200 μm from the position where the content of Fe becomes 90% is calculated. That value is defined as the surface concentration of Cu.

Note that, GDS is used to measure the maximum value of the content of Cu in a range of a depth of 0 to 30 μm from the position where the content of Fe becomes 90% at five random positions at a position near ¼ of the sheet width from an end of the steel member in the width direction and the content of Cu at a position of a depth of 200 μm from the position where the content of Fe becomes 90% to calculate the surface concentration of Cu. The surface concentration of Cu at the present invention is made the average value of the surface concentration of Cu at these five positions.

The coated steel sheet according to the present invention is comprised of a steel sheet having a layer where Cu is concentrated as explained above and further having an Al-based coating on its surface. By applying the later explained heat treatment to such a coated steel sheet, it is possible to obtain a coated steel member having an Al—Fe-based coating with a concentration of corrosion resistance elements of 0.12% or more and excellent in hydrogen embrittlement resistance in a corrosive environment. Note that, the "Al-based coating" is a coating which is mainly comprised of Al and preferably contains Al in 60% or more. The "coating" of the Al-based coating also can mean a film or plating layer. In general, Si is often included in 10% or so. Further, as the additive elements, there may be Mg, Ti, Zn, Sb, Sn, Cu, Co, In, Bi, Ca, Sr, a mischmetal, etc. These can be applied so long as the coating layer is mainly comprised of Al. The thickness of the Al-based coating is preferably 10 to 100 μm.

As one example of the chemical composition of the Al-based coating in the coated steel sheet (however, average chemical composition of Al-based coating as a whole), except for the case of application of the later explained Morphology Z in addition to the present embodiment, the following can be mentioned.

The chemical composition of the Al-based coating may be made, by mass %, Cu: 0 to less than 1.0%, Mo: 0 to less than 1.0%, Ni: 0 to less than 1.0%, Mn: 0 to less than 1.0%, Cr: 0 to less than 1.0%, Si: 0 to 20.0%, Al: 5.0 to 90.0%, Fe: 0 to 90%, and a balance: impurities (however, Cu+Mo+Ni+Mn+Cr: 0 to less than 1.0% and Al+Fe: 79.0% or more). Here, the lower limit of the content of Al may be made 40%, 50%, or 60%.

If the layer containing Cu is a layer where Cu is concentrated on the surface of the steel sheet, further, the average crystal grain size of the metallic structure of the steel sheet is made 30 μm or less.

The crystal grain boundaries function as paths for diffusion, so refinement of the crystal grain size results in the number of diffusion paths per unit volume increasing and as a result the actual diffusion rate becoming large, so there is the effect of further promoting the diffusion of Cu and other corrosion resistance elements into the Al-based coating in the later explained heat treatment. Therefore, refining the crystal grain size is necessary. In the morphology where the layer containing Cu is the layer where Cu is concentrated at the surface of the steel sheet, if the average crystal grain size of the steel sheet is over 30 μm, the concentration of the corrosion resistance elements of the coated steel member becomes less than 0.12% and the risk of hydrogen embrittlement accompanying corrosion rises. Therefore, the average crystal grain size of the steel sheet is made 30 μm or less. Preferably, it is 25 μm or less. The lower limit does not particularly have to be prescribed, but may be made 8 μm or 15 μm.

The average crystal grain size of the coated steel sheet is found as follows based on JIS G 0551: 2013.

A cross-section of a width (¼) part is cut out from an end of the steel sheet in the width direction so that it is parallel to the rolling direction and parallel to the thickness direction. The cross-section is polished to a mirror finish, then treated by a Nital corrosive solution to reveal the crystal grain boundaries of the ferrite. On a field enlarged using an optical microscope or a photograph taken by the same, three test lines are drawn at equal intervals in the vertical direction and three in the horizontal direction and the average line segment length per crystal grain is found. Note that, the magnification of the microscope is selected so that at least 10 or more crystal grains are caught by one test line and five random fields are examined from positions of ¼ or so of the thickness away from the surface of the steel sheet. Here, based on Appendix C.2.1 of JIS G 0551: 2013, if a test line passes through a crystal grain, the number of crystal grains caught is made 1 for that crystal, while if a test line ends inside a crystal grain or if a test line is contiguous with a crystal grain, the number of crystal grains caught is made 0.5. The average line segment length in each field is found and the average of the average line segment lengths of five fields for each of three test lines (total 15 average line segment lengths) is made the average crystal grain size.

Further, the structure present in the present embodiment is comprised of ferrite or pearlite. In the conditions of the method of manufacture explained later, bainite, martensite, and retained austenite are sometimes included. Note that, the above-mentioned martensite includes tempered and auto-tempered martensite. Auto-tempered martensite is tempered martensite formed during the cooling at the time of hardening without performing heat treatment for tempering and is formed by the martensite formed being tempered on the spot by the heat generated along with martensite transformation. The thickness of the coated steel sheet does not particularly have to be prescribed, but may be 0.5 to 5.0 mm. The upper limit of the thickness may be made 4.0 mm or 3.2 mm and the lower limit may be made 0.8 mm or 1.0 mm.

(B2Y) Morphology Y

The coated steel sheet according to the present embodiment has, as the layer containing Cu, an intermediate layer containing Cu and one or more of Mo, Ni, Mn, and Cr in a total by mass % of 30% or more on the surface of the steel sheet and further has, on top of that intermediate layer, an Al-based coating. By applying the later explained heat treatment to such a coated steel sheet, Fe of the main constituent of the steel sheet diffuses into the Al-based coating, an Al—Fe-based coating with a concentration of corrosion resistance elements of 0.12% or more is formed, and a coated steel member excellent in hydrogen embrittlement resistance in a corrosive environment can be obtained. Note that, as the base sheet of the steel sheet according to the present embodiment (base sheet before intermediate layer is formed), in addition to the steel sheet of the Morphology X, a steel sheet other than the Morphology X (so-called ordinary steel sheet) can be used.

If an intermediate layer having Cu and one or more of Mo, Ni, Mn, and Cr in a total of 30% or more at the interface of the steel sheet and the Al-based coating, the concentration of corrosion resistance elements of the coated steel member becomes sufficiently high and the risk of hydrogen embrittlement accompanying corrosion becomes lower, so this is preferable. The thickness of the intermediate layer is preferably 5 to 50 μm.

The chemical composition of the intermediate layer in the coated steel sheet (however, the average of the intermediate layer) may, for example, also comprise, by mass %, Cu: 15.0 to 20.0%, Mo: 0 to 20.0%, Ni: 0 to 20.0%, Mn: 0 to 20.0%, Cr: 0 to 20.0%, Si: 0 to 20%, Al: 0 to 60.0%, Fe: 0 to 90.0%, and a balance: impurities, where Cu+Mo+Ni+Mn+Cr: 30.0% or more.

As an example of the chemical composition of the Al-based coating in the coated steel sheet (however, average chemical composition of Al-based coating as a whole), except for the case of application of the later explained Morphology Z in addition to the present embodiment, the following can be mentioned.

The chemical composition of the Al-based coating may be made, by mass %, Cu: 0 to less than 1.0%, Mo: 0 to less than 1.0%, Ni: 0 to less than 1.0%, Mn: 0 to less than 1.0%, Cr: 0 to less than 1.0%, Si: 0 to 20.0%, Al: 5.0 to 90.0%, Fe: 0 to 90%, and a balance: impurities (however, Cu+Mo+Ni+Mn+Cr: 0 to less than 1.0% and Al+Fe: 79.0% or more). Here, the lower limit of the content of Al may be made 40%, 50%, or 60%.

(B2Z) Morphology Z

The coated steel sheet according to the present embodiment has, as the layer containing Cu, an Al-based coating containing Cu and one or more of Mo, Ni, Mn, and Cr in a total by mass % of 1.0% or more on the surface of the steel sheet. By applying the later explained heat treatment to such a coated steel sheet, Fe of the main constituent of the steel sheet diffuses into the Al-based coating, an Al—Fe-based coating with a concentration of corrosion resistance elements of 0.12% or more is formed, and a coated steel member excellent in hydrogen embrittlement resistance in a corrosive environment can be obtained. If the corrosion resistance elements in the Al-based coating become a total of 1.0% or more, the concentration of corrosion resistance elements of the coated steel member becomes sufficiently high and the risk of hydrogen embrittlement accompanying corrosion becomes lower, so this is preferable. Note that, as the base sheet of the steel sheet according to the present embodiment, in addition to the steel sheets of the Morphology X and Morphology Y, steel sheets other than the Morphology X or Morphology Y (so-called ordinary steel sheet) can be used.

As one example of the chemical composition of the Al-based coating in the coated steel sheet (however, average chemical composition of Al-based coating as a whole), the following can be mentioned.

The chemical composition of the Al-based coating may be made, by mass %, Cu: 0.1 to 20.0%, Mo: 0 to 10.0%, Ni: 0 to 10.0%, Mn: 0 to 10.0%, Cr: 0 to 10.0%, Si: 0 to 20.0%, Al: 5.0 to 90.0%, Fe: 0 to 90%, and a balance: impurities (where, Cu+Mo+Ni+Mn+Cr: 1.0% or more, Al+Fe: 70.0% or more). Here, the lower limit of the content of Al may be made 40%, 50%, or 60%.

Note that, in the case of this Morphology Z, as the steel sheet before formation of the Al-based coating with corrosion resistance elements in 1.0% or more, if using steel sheet other than the steel sheet of the above-mentioned Morphology X or Morphology Y, sometimes the ratio of the maximum value and minimum value of the content of Cu in the thickness direction cannot be made 1.4 or more in the Al—Fe-based coating.

Next, a method for manufacturing coated steel sheet will be explained.

(C) Method for Manufacturing Coated Steel Sheet

The coated steel sheet according to the present embodiment can be manufactured by using the method of manufacture shown below.

Steel having the above-mentioned chemical composition is melted in a furnace and cast, then the obtained slab is heated to 1100 to 1350° C. and hot rolled. In the hot rolling process, it is rough rolled, then descaled according to need and finally is finish rolled.

If, as in the above Morphology X, forming a concentrated layer of Cu at the surface of the steel sheet, the slab heating temperature before starting the hot rolling is made 1100 to 1350° C. If this temperature is over 1350° C., the austenite grain size during the heating becomes larger and sometimes the average crystal grain size of the steel sheet obtained after rolling exceeds 30 μm. On the other hand, if this temperature is 1100° C. or less, the alloying elements will not become sufficiently uniform and sometimes the toughness or hydrogen embrittlement resistance after the later explained heat treatment will deteriorate.

Further, if forming a concentrated layer of Cu at the surface of the steel sheet, the following parameter $S_1$ comprised of the time $t_1$ (hr) from the end of rough rolling to the start of finish rolling and the average temperature $T_1$ (° C.) of the rough bar during that is made 20000 or more. Here, if performing descaling after rough rolling, "the time from the end of rough rolling to the start of finish rolling" means the time until the start of finish rolling after the end of descaling.

$$S_1=(T_1+273)\times(\log t_1+20)$$

Cu is an element which is difficult to oxidize, so elements other than Cu are oxidized with priority in the hot rolling process whereby the Cu concentrates at the surface. In particular, if making the parameter $S_1$ comprised of the time $t_1$ (hr) from the end of rough rolling to the start of finish rolling and the average temperature $T_1$ (° C.) of the rough bar during that 20000 or more from the end of rough rolling to the start of finish rolling, it becomes possible to make the Cu concentrate 1.2 times or more at the surface of the steel sheet. If the parameter $S_1$ is less than 20000, the steel sheet insufficiently oxidizes and sometimes the degree of surface concentration of Cu becomes less than 1.2. The upper limit of the above parameter $S_1$ is not particularly prescribed, but if over 30000, sometimes a tremendous amount of scale forms due to the oxidation and the yield falls.

If not forming a concentrated layer of Cu at the surface of the steel sheet like in the above-mentioned Morphology Y and Morphology Z, there is no need to limit the $S_1$ to the above-mentioned range. A general method may be used for hot rolling.

Finish Rolling End Temperature: $Ar_3$ Point to 1000° C.

The end temperature of the finish rolling is made the $Ar_3$ point to 1000° C. If the finish rolling end temperature is over 1000° C., recrystallization of austenite occurs right after rolling and the number of nucleation sites of ferrite is limited, so the average crystal grain size of the steel sheet obtained by rolling sometimes exceeds 30 μm. On the other hand, if the finish temperature is less than the $Ar_3$ point, the rolling is performed after ferrite transformation and abnormal grain growth of the ferrite is invited, so the average crystal grain size of the steel sheet obtained after rolling sometimes exceeds 30 μm.

Average Cooling Rate from Completion of Finish Rolling to Coiling: 10° C./s or More The average cooling rate from completion of finish rolling to coiling is made 10° C./s or more. If this average cooling rate is less than 10° C./s, the ferrite grains proceed to grow and sometimes the average crystal grain size after rolling exceeds 30 μm. The upper limit of this cooling rate is not particularly prescribed, but if over 150° C./s, the steel sheet is coiled without the ferrite transformation being completed. The transformation proceeds even after coiling, so sometimes the coil deforms due to the transformation strain.

Coiling Temperature: 700° C. or Less

The coiling temperature is made 700° C. or less. If this temperature is over 700° C., the ferrite grains proceed to grow and sometimes the average crystal grain size of the steel sheet after rolling exceeds 30 μm. The lower limit of this temperature is not particularly prescribed, but if falling below 500° C., martensite or bainite transformation occurs after coiling, so sometimes the coil deforms due to the transformation strain.

After the hot rolling, if necessary, descaling is performed and then cold rolling. At this time, from the viewpoint of securing good flatness, the rolling reduction in the cold rolling is preferably made 30% or more. On the other hand, to avoid the load from becoming excessively large, the rolling reduction in the cold rolling is preferably made 80% or less.

If, like in the above-mentioned Morphology X, forming a concentrated layer of Cu on the surface of the steel sheet, the hot rolled steel sheet is descaled. The descaling is made lighter pickling compared with the pickling of usual steel sheet and removes only the iron scale by hydrochloric acid or sulfuric acid pickling. Specifically, when using hydrochloric acid or sulfuric acid, making the pickling temperature 80 to 90° C., designating the acid concentration as $\alpha$ (%), and designating the pickling time as "t" (s), preferably $6 \leq \alpha < 14$, $0 < t \leq 420 - 30 \times \alpha$.

FIG. 1 shows the preferable pickling conditions (relationship of acid concentration and pickling time). For example, it is possible to use concentration 12% hydrochloric acid for descaling for an immersion time of 30 seconds to remove only the iron scale and leave the Cu concentrated layer of the surface of the steel sheet obtained in the above hot rolling process.

If manufacturing the Al-based coated steel sheet of the present embodiment, the hot rolled steel sheet or cold rolled steel sheet is annealed. In the annealing process, the hot rolled steel sheet or cold rolled steel sheet is annealed in for example the 550 to 950° C. temperature region.

The method of the Al-based coating is not particularly limited. Hot dip coating first and foremost and also electroplating, vacuum deposition, cladding, etc. are possible. Al thermal spraying may also be used to form an Al thermal sprayed layer. The most popular method industrially is hot dip coating. As the usual coating bath, Al-10% Si is often used. Fe is mixed in this as an impurity.

If like in the above-mentioned Morphology Z, making the layer containing Cu an Al-based coating, the Al-based coating is performed by an Al coating bath containing, in addition to this, Cu and one or more of Mo, Ni, Mn, and Cr in a total by mass % of 1.0% or more.

Further, as elements which can be added to the coating bath besides the above-mentioned elements, there are Mg, Ti, Zn, Sb, Sn, Cu, Co, In, Bi, Ca, Sr, a mischmetal, etc. These elements can also be used so long as the coating layer is mainly comprised of Al.

The pretreatment and post treatment of the Al-based coating are not particularly limited. Precoating or solvent coating, alloying, etc. are possible.

If like in the above-mentioned Morphology Y, making the layer containing Cu an intermediate layer, before coating, the surface of the steel sheet is precoated with an intermediate layer containing Cu and one or more of Mo, Ni, Mn, and Cr in a total by mass % of 30% or more. The precoating can be performed by electroplating or thermal spraying etc.

By applying the later explained heat treatment to the coated steel sheet manufactured in this way, it becomes possible to obtain a coated steel member excellent in hydrogen embrittlement resistance in a corrosive environment which has a concentration of corrosion resistance elements at an Al—Fe coating of 0.12% or more.

(D) Method for Manufacturing Coated Steel Member

Next, the method for manufacturing a coated steel member according to the present embodiment will be explained.

In the method for manufacturing a coated steel member of the present embodiment, a coated steel sheet comprised of a steel sheet having the above-mentioned chemical composition and having a metallic structure with a surface concentration of Cu within a depth of 30 μm from the surface of 1.2 or more and with an average crystal grain size of 30 μm or less on the surface of which an Al-based coating is provided, a coated steel sheet comprised of a steel sheet on the surface of which an intermediate layer containing Cu and one or more of Mo, Ni, Mn, and Cr in a total by mass % of 30% or more is provided and on which layer an Al-based coating is provided, or a coated steel sheet comprised of a steel sheet on the surface of which an Al-based coating containing Cu and one or more of Mo, Ni, Mn, and Cr in a total by mass % of 1.0% or more is provided can be treated by the heat treatment shown below to thereby obtain a coated steel member excellent in hydrogen embrittlement resistance in a corrosive environment characterized by having a concentration of corrosion resistance elements in the Al—Fe coating of 0.12% or more.

The average rate of temperature rise explained below is made the value of the amount of temperature rise of the steel sheet from the time of start of heating to the time of end of heating divided by the time required from the time of start of heating to the time of end of heating.

Further, the average cooling rate is made the value of the amount of temperature fall from the time of start of cooling to the time of end of cooling divided by the time required from the time of start of cooling to the time of end of cooling.

The above-mentioned steel sheet is heated by a 5 to 1000° C./s average rate of temperature rise up to $T_2$ (° C.) of the temperature region of the $Ac_3$ point to ($Ac_3$ point+300)° C., is cooled down to Ms ° C. by an average cooling rate made the upper critical cooling rate or more, then cooled from the Ms point to 100° C. or less by an average cooling rate of 5° C./s or more. At the time of heating, the following parameter $S_2$, comprised of the peak heating temperature $T_2$ (° C.) and the time $t_2$ (hr) from when reaching a temperature 10° C. lower than $T_2$ to when ending the heating, is made 19000 or more. The features of this heat treatment will be explained below. Here, the upper critical cooling rate is the minimum cooling rate where the structure becomes 100% martensite. Various methods are known as the method for measuring this, but one example will be explained in the section on examples. Further, the time until ending the heating means the time until right before starting cooling. For example, if held for a certain time after reaching $T_2$ (° C.), that holding time is also included.

$$S_2=(T_2+273-10)\times(\log t_2+20)$$

$S_2$ from peak heating temperature −10° C. to heating end: 19000 or more

If the above parameter comprised of the peak heating temperature $T_2$ (° C.) and the time $t_2$ (hr) from when reaching a temperature 10° C. lower than $T_2$ to when ending the heating is made 19000 or more, the Cu and the Mo, Ni, Mn, and Cr sufficiently diffuse in the Al-based coating and the corrosion resistance is improved. If the above parameter $S_2$ is less than 19000, sometimes the corrosion resistance elements insufficiently diffuse and the corrosion resistance is not sufficiently improved. The upper limit of $S_2$ is not particularly prescribed, but if over 30000, sometimes the productivity in the heat treatment falls.

Note that if the rate of temperature rise is less than 5° C./s, the structure becomes coarser and the hydrogen embrittlement resistance falls, so this is not preferable. On the other hand, if the rate of temperature rise is over 1000° C./s, the structure becomes a mixed grain type and the hydrogen embrittlement resistance falls, so this is not preferable.

Further, if the heating temperature is less than the $Ac_3$ point, a small amount of ferrite remains mixed in after the cooling and the hydrogen embrittlement resistance and strength fall, so this is not preferable. On the other hand, if the peak temperature of heating is over the ($Ac_3$ point+300), the structure becomes coarser and the toughness falls, so this is not preferable.

Further, if the average cooling rate from the Ms point to 100° C. or less is less than 5° C./s, the spot tempering of the martensite (auto-tempering) excessively proceeds and the strength becomes insufficient, so this is not preferable.

Here, at the time of the above series of heat treatment, it is also possible to perform hot shaping such as hot stamping while cooling to the Ms point after heating to a temperature region of the $Ac_3$ point to ($Ac_3$ point+300)° C., that is, simultaneously with the process of cooling by the upper critical cooling rate or more. As the hot shaping, bending, drawing, bulging, hole expanding, flanging, etc. may be mentioned. Further, if providing means for cooling the steel sheet simultaneously with or directly after shaping, the present invention may also be applied to a shaping method other than press forming, for example, roll forming. Note that if following the above-mentioned heat history, it is also possible to repeatedly perform hot shaping.

Note that, as explained above, in the present invention, both what is hot shaped to form a shaped article and what is only heat treated to form a flat sheet will be referred to together as "coated steel members".

Further, it is possible to hot shape or heat treat part of the steel materials to obtain steel members having regions of different strengths.

The above series of heat treatment can be performed by any methods. For example, they may be performed by high frequency hardening, ohmic heating, infrared heating, or furnace heating.

EXAMPLES

Below, examples will be used to explain the present invention more specifically, but the present invention is not limited to these examples.

First, in manufacturing the coated steel sheet and coated steel member, steel having each of the chemical constituents shown in Table 1 and Table 2 was melted to obtain a slab for hot rolling use.

TABLE 1

| Steel No. | Chemical composition (mass %) | | | | | | | | | | | | |
|---|---|---|---|---|---|---|---|---|---|---|---|---|---|
| | C | Si | Mn | P | S | N | Ti | B | Cu | Mo | Cr | Ni | V |
| A1 | 0.29 | 0.40 | 0.90 | 0.010 | 0.0007 | 0.004 | 0.040 | 0.0025 | 0.21 | 0.19 | | | |
| A2 | 0.50 | 0.50 | 0.40 | 0.012 | 0.0005 | 0.003 | 0.032 | 0.0026 | 0.25 | 0.15 | 0.10 | 0.10 | |
| A3 | 0.30 | 0.30 | 1.00 | 0.011 | 0.0008 | 0.004 | 0.040 | 0.0025 | 0.20 | 0.18 | | | |
| A4 | 0.32 | 1.60 | 0.90 | 0.012 | 0.0006 | 0.002 | 0.032 | 0.0026 | 0.26 | 0.16 | 0.20 | | |
| A5 | 0.31 | 0.35 | 0.32 | 0.009 | 0.0010 | 0.002 | 0.040 | 0.0025 | 0.21 | 0.20 | | 0.15 | |
| A6 | 0.34 | 0.40 | 2.50 | 0.018 | 0.0010 | 0.002 | 0.032 | 0.0026 | 0.26 | 0.15 | | | 0.25 |
| A7 | 0.36 | 0.55 | 0.95 | 0.030 | 0.0009 | 0.002 | 0.040 | 0.0025 | 0.20 | 0.20 | | | |
| A8 | 0.38 | 0.60 | 0.80 | 0.010 | 0.0080 | 0.002 | 0.040 | 0.0025 | 0.21 | 0.21 | | | |
| A9 | 0.33 | 0.70 | 0.75 | 0.009 | 0.0012 | 0.008 | 0.032 | 0.0026 | 0.21 | 0.20 | 0.23 | | 0.30 |
| A10 | 0.30 | 0.55 | 0.70 | 0.008 | 0.0010 | 0.003 | 0.020 | 0.0025 | 0.24 | 0.15 | | | |
| A11 | 0.36 | 0.63 | 0.65 | 0.012 | 0.0009 | 0.002 | 0.080 | 0.0026 | 0.25 | 0.20 | 0.15 | | |
| A12 | 0.34 | 0.38 | 0.85 | 0.014 | 0.0009 | 0.002 | 0.034 | 0.0010 | 0.21 | 0.18 | | 0.18 | |
| A13 | 0.34 | 0.41 | 0.75 | 0.016 | 0.0008 | 0.003 | 0.022 | 0.0060 | 0.27 | 0.20 | | | |
| A14 | 0.36 | 0.40 | 0.77 | 0.010 | 0.0010 | 0.004 | 0.040 | 0.0025 | 0.18 | 0.16 | | | 0.25 |
| A15 | 0.37 | 0.45 | 0.80 | 0.008 | 0.0009 | 0.003 | 0.032 | 0.0026 | 0.70 | 0.21 | 0.23 | | |

TABLE 1-continued

| | | | | | | | | | | | | | |
|---|---|---|---|---|---|---|---|---|---|---|---|---|---|
| A16 | 0.36 | 0.52 | 0.78 | 0.010 | 0.0008 | 0.004 | 0.040 | 0.0025 | 0.20 | 0.13 | | 0.10 | |
| A17 | 0.39 | 0.50 | 0.69 | 0.009 | 0.0006 | 0.002 | 0.032 | 0.0026 | 0.28 | 0.70 | | | |
| A18 | 0.33 | 0.39 | 0.65 | 0.012 | 0.0008 | 0.004 | 0.040 | 0.0025 | 0.21 | 0.20 | 0.70 | | |
| A19 | 0.31 | 0.40 | 0.55 | 0.008 | 0.0005 | 0.003 | 0.032 | 0.0026 | 0.25 | 0.15 | | 0.60 | |
| A20 | 0.30 | 0.42 | 0.67 | 0.007 | 0.0007 | 0.006 | 0.040 | 0.0025 | 0.20 | 0.20 | 0.10 | | 0.70 |
| A21 | 0.35 | 0.51 | 0.78 | 0.008 | 0.0006 | 0.003 | 0.032 | 0.0026 | 0.24 | 0.15 | | 0.23 | |
| A22 | 0.36 | 0.35 | 0.90 | 0.005 | 0.0008 | 0.005 | 0.040 | 0.0025 | 0.20 | 0.20 | | | 0.10 |
| A23 | 0.40 | 0.63 | 0.75 | 0.010 | 0.0008 | 0.004 | 0.040 | 0.0025 | 0.20 | 0.20 | 0.14 | | |
| A24 | 0.32 | 0.43 | 0.65 | 0.009 | 0.0005 | 0.003 | 0.032 | 0.0026 | 0.21 | 0.16 | | 0.20 | |
| A25 | 0.31 | 0.47 | 0.60 | 0.010 | 0.0008 | 0.005 | 0.040 | 0.0025 | 0.24 | 0.19 | | | |
| A26 | 0.32 | 0.46 | 1.05 | 0.015 | 0.0005 | 0.003 | 0.032 | 0.0026 | 0.20 | 0.17 | 0.23 | | |
| A27 | 0.36 | 0.52 | 0.90 | 0.016 | 0.0009 | 0.003 | 0.026 | 0.0026 | 0.24 | 0.19 | | 0.15 | |
| A28 | 0.30 | 0.40 | 0.90 | 0.010 | 0.0008 | 0.004 | 0.040 | 0.0025 | 0.20 | 0.20 | | | |
| A29 | 0.35 | 0.50 | 0.75 | 0.008 | 0.0005 | 0.003 | 0.032 | 0.0026 | 0.25 | 0.15 | 0.10 | 0.15 | |
| A30 | 0.35 | 0.50 | 0.40 | 0.009 | 0.008 | 0.004 | 0.021 | 0.0025 | 0.05 | 0.15 | | 0.20 | |
| A31 | 0.37 | 0.45 | 0.45 | 0.010 | 0.0009 | 0.004 | 0.025 | 0.0020 | 0.10 | 0.12 | 0.10 | | |

| Steel No. | Chemical composition (mass %) | | | | | | Transformation point (° C.) | | | Upper critical cooling rate (° C./s) |
|---|---|---|---|---|---|---|---|---|---|---|
| | Ca | Al | Nb | Sn | W | Sb | REM | Ar3 | Ac3 | Ms | |
| A1 | | | | | | | | 793 | 826 | 396 | 20 |
| A2 | | 0.04 | 0.04 | | | | | 774 | 808 | 326 | 20 |
| A3 | | | | | | | | 781 | 815 | 388 | 20 |
| A4 | | | | 0.10 | | | | 860 | 895 | 370 | 10 |
| A5 | | | 0.01 | | | | 0.20 | 801 | 831 | 409 | 40 |
| A6 | 0.004 | | | | | | | 744 | 775 | 312 | 10 |
| A7 | | | 0.02 | | 0.18 | | | 809 | 834 | 361 | 20 |
| A8 | | 0.06 | | | | 0.15 | | 805 | 834 | 361 | 20 |
| A9 | | | | | | | | 804 | 836 | 377 | 20 |
| A10 | | | | | 0.15 | | 0.15 | 793 | 829 | 396 | 30 |
| A11 | 0.003 | | | | | | | 816 | 849 | 368 | 20 |
| A12 | | | | | | | | 779 | 812 | 377 | 20 |
| A13 | | | 0.03 | 0.24 | | | | 785 | 818 | 378 | 20 |
| A14 | | | | | 0.30 | | | 787 | 815 | 371 | 20 |
| A15 | | | 0.03 | | | 0.26 | | 768 | 795 | 356 | 20 |
| A16 | | | | 0.26 | | | | 793 | 819 | 372 | 20 |
| A17 | 0.003 | | | | | | 0.18 | 799 | 832 | 349 | 10 |
| A18 | | 0.05 | | | 0.25 | | | 789 | 826 | 372 | 10 |
| A19 | 0.002 | | | | | 0.15 | | 781 | 818 | 396 | 30 |
| A20 | | | 0.05 | | 0.20 | | | 798 | 829 | 398 | 30 |
| A21 | 0.008 | | | 0.15 | | | | 782 | 815 | 375 | 20 |
| A22 | | 0.70 | | | | 0.27 | | 852 | 882 | 367 | 20 |
| A23 | | | 0.07 | | | | | 792 | 826 | 350 | 20 |
| A24 | | | | 0.60 | | | 0.15 | 793 | 824 | 390 | 30 |
| A25 | 0.002 | | | | 0.70 | | | 806 | 833 | 397 | 30 |
| A26 | | | 0.03 | | | 0.60 | | 789 | 815 | 373 | 20 |
| A27 | 0.002 | | | 0.16 | | | 0.20 | 783 | 817 | 364 | 20 |
| A28 | | | | 0.16 | | | | 792 | 826 | 389 | 20 |
| A29 | | 0.04 | 0.04 | | | | | 785 | 817 | 370 | 20 |
| A30 | | 0.05 | 0.03 | | | 0.36 | | 793 | 825 | 390 | 40 |
| A31 | | 0.05 | 0.05 | 0.10 | | | | 790 | 822 | 380 | 30 |

TABLE 2

| Steel No. | Chemical composition (mass %) | | | | | | | | | | | | |
|---|---|---|---|---|---|---|---|---|---|---|---|---|---|
| | C | Si | Mn | P | S | N | Ti | B | Cu | Mo | Cr | Ni | V |
| a1 | 0.17 | 0.40 | 0.85 | 0.010 | 0.0008 | 0.004 | 0.040 | 0.0025 | 0.08 | 0.18 | 0.10 | 0.10 | |
| a2 | 0.80 | 0.50 | 0.80 | 0.008 | 0.0006 | 0.003 | 0.032 | 0.0026 | 0.10 | 0.16 | | | |
| a3 | 0.33 | 0.02 | 0.30 | 0.011 | 0.0008 | 0.004 | 0.040 | 0.0025 | 0.09 | 0.12 | 0.20 | | |
| a4 | 0.45 | 3.00 | 1.50 | 0.007 | 0.0009 | 0.005 | 0.032 | 0.0026 | 0.11 | 0.25 | 0.40 | 0.25 | |
| a5 | 0.36 | 0.40 | 0.05 | 0.009 | 0.0009 | 0.004 | 0.040 | 0.0025 | 0.10 | 0.15 | | | 0.25 |
| a6 | 0.40 | 0.45 | 5.00 | 0.018 | 0.0010 | 0.003 | 0.032 | 0.0026 | 0.11 | 0.21 | | | |
| a7 | 0.40 | 0.52 | 0.90 | 0.100 | 0.0009 | 0.002 | 0.040 | 0.0025 | 0.10 | 0.20 | | 0.20 | |
| a8 | 0.43 | 0.47 | 0.80 | 0.010 | 0.1000 | 0.001 | 0.040 | 0.0025 | 0.11 | 0.15 | 0.43 | | 0.30 |
| a9 | 0.37 | 0.39 | 0.85 | 0.010 | 0.0010 | 0.100 | 0.032 | 0.0026 | 0.08 | 0.20 | | | |
| a10 | 0.44 | 0.40 | 0.79 | 0.000 | 0.0010 | 0.001 | 0.001 | 0.0025 | 0.10 | 0.17 | 0.15 | | |
| a11 | 0.30 | 0.56 | 0.75 | 0.009 | 0.0008 | 0.006 | 0.300 | 0.0026 | 0.08 | 0.21 | | 0.20 | |
| a12 | 0.34 | 0.45 | 0.69 | 0.008 | 0.0010 | 0.004 | 0.021 | 0.0002 | 0.10 | 0.18 | 0.50 | | |
| a13 | 0.40 | 0.52 | 0.74 | 0.010 | 0.0009 | 0.002 | 0.022 | 0.0500 | 0.11 | 0.22 | | | 0.25 |
| a14 | 0.41 | 0.39 | 1.10 | 0.012 | 0.0006 | 0.003 | 0.022 | 0.0026 | 3.00 | 0.20 | 0.40 | | |
| a15 | 0.39 | 0.40 | 0.81 | 0.008 | 0.0008 | 0.006 | 0.021 | 0.0025 | 0.12 | 0.02 | | | 0.45 |

TABLE 2-continued

| | | | | | | | | | | | | |
|---|---|---|---|---|---|---|---|---|---|---|---|---|
| a16 | 0.39 | 0.66 | 1.00 | 0.007 | 0.0005 | 0.003 | 0.022 | 0.0025 | 0.09 | 3.00 | | 0.25 | |
| a17 | 0.42 | 0.51 | 0.76 | 0.008 | 0.0007 | 0.005 | 0.026 | 0.0026 | 0.08 | 0.20 | 2.00 | | 0.30 |
| a18 | 0.40 | 0.63 | 0.65 | 0.010 | 0.0008 | 0.002 | 0.031 | 0.0031 | 0.10 | 0.22 | 0.30 | | 0.50 |
| a19 | 0.44 | 0.88 | 0.60 | 0.010 | 0.0008 | 0.002 | 0.031 | 0.0031 | 0.12 | 0.21 | 0.35 | 0.20 | |

| Steel | Chemical composition (mass %) | | | | | | | Transformation point (° C.) | | | Upper critical cooling rate |
|---|---|---|---|---|---|---|---|---|---|---|---|
| No. | Ca | Al | Nb | Sn | W | Sb | REM | Ar3 | Ac3 | Ms | (° C./s) |
| a1 | 0.002 | 0.04 | 0.04 | | | 0.30 | 0.40 | 817 | 847 | 432 | 30 |
| a2 | | | | | | | | 728 | 756 | 190 | 10 |
| a3 | | | | 0.25 | | | | 769 | 801 | 401 | 60 |
| a4 | | | 0.01 | | | | 0.20 | 894 | 916 | 272 | 10 |
| a5 | 0.004 | | | | | | | 803 | 830 | 396 | 70 |
| a6 | | | 0.08 | | 0.18 | | | 682 | 710 | 191 | 10 |
| a7 | | 0.06 | | | | 0.15 | | 844 | 879 | 347 | 20 |
| a8 | | | | | | | | 773 | 805 | 332 | 20 |
| a9 | | | | | | 0.30 | 3.00 | 781 | 809 | 361 | 20 |
| a10 | 0.003 | 0.06 | | | | | | 748 | 780 | 333 | 20 |
| a11 | | | | | | | | 893 | 914 | 390 | 20 |
| a12 | | | 0.03 | 0.24 | | | | 773 | 809 | 369 | 70 |
| a13 | | | | | 0.30 | | 0.45 | 783 | 811 | 354 | 20 |
| a14 | | | | 0.30 | | | | 699 | 736 | 275 | 10 |
| a15 | 0.004 | | | | 0.40 | | 0.23 | 768 | 798 | 359 | 40 |
| a16 | | | 0.04 | | | 0.40 | | 860 | 892 | 284 | 10 |
| a17 | | 0.08 | | 0.40 | | | | 762 | 797 | 302 | 10 |
| a18 | | | | 2.00 | | | | 787 | 822 | 350 | 20 |
| a19 | | 0.08 | | | | 2.00 | | 806 | 836 | 333 | 10 |

$Ar_3$ and $Ac_3$ Points, Ms Point, and Upper Critical Cooling Rate

Each obtained slab was examined for the $Ar_3$ point, $Ac_3$ point, Ms point, and upper critical cooling rate by the following method. The results are shown in Table 1 and Table 2.

From the slab, a diameter 3 mm, length 10 mm columnar test piece was cut out. The test piece was heated in the air atmosphere up to 1000° C. by a 10° C./s average rate of temperature rise, was held at that temperature for 5 minutes, then was cooled down to room temperature by various cooling rates. The cooling rates were set at 10° C./s intervals from 1° C./s to 100° C./s. The changes in the thermal expansion of the test piece during the heating and cooling at that time were measured and the structure of the test piece after cooling was examined to thereby measure the $Ar_3$ point, $Ac_3$ point, Ms point, and upper critical cooling rate.

Regarding the upper critical cooling rate, the minimum cooling rate where no ferrite phases precipitated in each test piece cooled by the above cooling rates was made the upper critical cooling rate.

Next, the obtained slabs were used to prepare the coated steel sheets and coated steel members shown in the following Examples 1 to 5.

Example 1

Each slab of the above Table 1 and Table 2 was hot rolled to obtain a thickness 3.0 mm hot rolled steel sheet. In the hot rolling process, the slab heating temperature was made 1250° C. and the slab was hot rolled and pickled. Next, this was cold rolled to obtain a thickness 1.4 mm cold rolled steel sheet, then this was coated to obtain an Al-based coated steel sheet. The hot rolling, pickling, and coating conditions are shown in Tables 3 and 4. Note that, in Table 3 and Table 4, $t_1$ (s) is the time from the end of rough rolling to the start of finish rolling, $T_1$ (° C.) is the average temperature of the rough bar from the end of rough rolling to the start of finish rolling, and $S_1$ is the value found by $(T_1+273) \times (\log t_1+20)$. However, in the formula of $S_1$, the unit of $t_1$ is (hr). Further, in the column of "hot dip Al coating", A, B, and C respectively mean the following coating:

A: hot dip Al coating by a usual coating bath (not including corrosion resistance elements)

B: hot dip Al coating by a coating bath with a total content of corrosion resistance elements of more than 0% and less than 1.0%

C: hot dip Al coating by a coating bath with a total content of corrosion resistance elements of 1.0% or more The above coated steel sheet was heated to the $T_2$ (° C.) of Tables 3 and 4 by an average rate of temperature rise of 10° C./s and held there for $t_2$ (s). $S_2$ of Tables 3 and 4 is a value found by $(T_2+273-10) \times (\log t_2+0)$. However, in the formula of $S_2$, the unit of $t_2$ is (hr). Next, the coated steel sheet was cooled down to the Ms point by an average cooling rate of 50° C./s, then was cooled down to 100° C. by an average cooling rate of 30° C./s as heat treatment to obtain the coated steel member.

After that, test pieces were cut out from the coated steel member and subjected to GDS (glow discharge optical emission spectrometry), a tensile test, and CCT (salt spray cyclic corrosion test) by the following methods to evaluate the concentration of corrosion resistance elements in Al—Fe-based coating, the concentration of Si (content of Si) in the Al—Fe-based coating, the tensile strength, and critical number of cycles of CCT (hydrogen embrittlement resistance in a corrosive environment). The results of evaluation of the coated steel member are shown in Tables 5-1 to 6-2.

Concentration of Corrosion Resistance Elements and Concentration of Si in Al—Fe-Based Coating The concentration of corrosion resistance elements and the concentration of Si in the Al—Fe-based coating were measured by the following procedure.

GDS (glow discharge optical emission spectrometry) was performed in the thickness direction from the surface of the coated steel member to find the maximum contents of Cu, Mo, Ni, Mn, Cr, and Si in the Al—Fe-based coating. The measurement by GDS was performed at five random points at a position of ¼ of the sheet width (short side) from an end of the coated steel member in the width direction, the maximum amounts of Cu, Mo, Ni, Mn, and Cr in the Al—Fe-based coating at the different points were found, and the average values of the different elements at the five points were used by the formula (1) to find the concentration of corrosion resistance elements in the Al—Fe-based coating. Note that, Al—Fe-based coating was deemed to mean the region where the content of Fe becomes less than 90% when performing GDS from the surface of the coated steel member. Note that, at the surface most layer, sometimes oxide scale and impurities are present, so the content of O was also measured and measurement values of the concentration of corrosion resistance elements in the range of thickness where the content of O is 1.0% or more were excluded.

$$Cu + 0.01 \times 63.5(Mo/95.9 + Ni/58.7 + Mn/54.9 + Cr/52.0) \geq 0.12\% \quad \text{formula (1)}$$

Tensile Strength

A tensile test was conducted based on the provisions of the ASTM Standard E8. A half size plate-shaped test piece (parallel part length: 32 mm, parallel part width: 6.25 mm) of ASTM standard E8 was taken from a soaked part of the above coated steel member so that the test direction became parallel to the rolling direction.

Further, a strain gauge (gauge length: 5 mm) was attached to each test piece and a room temperature tensile test was conducted by a strain rate of 3 mm/min to measure the tensile strength (maximum strength). Note that, in the present embodiment, cases having a tensile strength over 1500 MPa were evaluated as being excellent in strength.

Critical Number of Cycles of CCT

The CCT was performed based on the provisions of the neutral salt spray cyclic test method described in JIS H 8502: 1999. A width 8 mm, length 68 mm strip shaped test piece was prepared from a soaking part of the above coated steel member. Further, a strain gauge (gauge length: 5 mm) similar to the tensile test was attached to the center of the test piece surface in the width and length directions and was bent by a four-point support jig until a strain equivalent to ½ of the tensile strength. The test piece bent at four points was inserted in the CCT apparatus together with its jig and subjected to the CCT described in the above JIS H 8502: 1999 comprised of cycles of spraying saltwater for 2 hours, drying for 4 hours, and wetting for 2 hours. During this, the test piece was observed for 3 cycles every 24 hours and was checked for any cracking up to 360 cycles. The limit number of cycles up to which no cracking occurred was found. In the present embodiment, the test was conducted five times and cases where no hydrogen embrittlement cracking occurred up to an average 150 cycles were deemed excellent in hydrogen embrittlement resistance in a corrosive environment.

As shown in Tables 3 to 6-2, Invention Examples B1 to B45 satisfying the scope of the present invention turned out to be excellent in both of the concentration of corrosion resistance elements in the Al—Fe-based coating and the properties, but Comparative Examples b1 to b23 not satisfying the scope of the present invention turned out to not satisfy the concentration of corrosion resistance elements in the Al—Fe-based coating.

TABLE 3

| Symbol | Steel no. | Hot rolling | | | Pickling | | | | Electroplating including corrosion resistance elements | Hot dip Al coating | Heat treatment | | |
|---|---|---|---|---|---|---|---|---|---|---|---|---|---|
| | | $t_1$ (s) | $T_1$ (°C.) | $S_1$ | Acid | Conc. (%) | Temp. (°C.) | Time (s) | | | $T_2$ (°C.) | $t_2$ (s) | $S_2$ |
| B1 | A1 | 12 | 1020 | 22657 | Hydrochloric | 12 | 90 | 30 | — | A | 920 | 90 | 21765 |
| B2 | A2 | 12 | 1020 | 22657 | Hydrochloric | 12 | 90 | 30 | — | A | 920 | 90 | 21765 |
| B3 | A3 | 12 | 1020 | 22657 | Hydrochloric | 12 | 90 | 30 | — | A | 920 | 90 | 21765 |
| B4 | A4 | 12 | 1020 | 22657 | Hydrochloric | 12 | 90 | 30 | — | A | 920 | 90 | 21765 |
| B5 | A5 | 12 | 1020 | 22657 | Hydrochloric | 12 | 90 | 30 | — | A | 920 | 90 | 21765 |
| B6 | A6 | 12 | 1020 | 22657 | Hydrochloric | 12 | 90 | 30 | — | A | 920 | 90 | 21765 |
| B7 | A7 | 12 | 1020 | 22657 | Hydrochloric | 12 | 90 | 30 | — | A | 920 | 90 | 21765 |
| B8 | A8 | 12 | 1020 | 22657 | Hydrochloric | 12 | 90 | 30 | — | A | 920 | 90 | 21765 |
| B9 | A9 | 12 | 1020 | 22657 | Hydrochloric | 12 | 90 | 30 | — | A | 920 | 90 | 21765 |
| B10 | A10 | 12 | 1020 | 22657 | Hydrochloric | 12 | 90 | 30 | — | A | 920 | 90 | 21765 |
| B11 | A11 | 12 | 1020 | 22657 | Hydrochloric | 12 | 90 | 30 | — | A | 920 | 90 | 21765 |
| B12 | A12 | 12 | 1020 | 22657 | Hydrochloric | 12 | 90 | 30 | — | A | 920 | 90 | 21765 |
| B13 | A13 | 12 | 1020 | 22657 | Hydrochloric | 12 | 90 | 30 | — | A | 920 | 90 | 21765 |
| B14 | A14 | 12 | 1020 | 22657 | Hydrochloric | 12 | 90 | 30 | — | A | 920 | 90 | 21765 |
| B15 | A15 | 12 | 1020 | 22657 | Hydrochloric | 12 | 90 | 30 | — | A | 920 | 90 | 21765 |
| B16 | A16 | 12 | 1020 | 22657 | Hydrochloric | 12 | 90 | 30 | — | A | 920 | 90 | 21765 |
| B17 | A17 | 12 | 1020 | 22657 | Hydrochloric | 12 | 90 | 30 | — | A | 920 | 90 | 21765 |
| B18 | A18 | 12 | 1020 | 22657 | Hydrochloric | 12 | 90 | 30 | — | A | 920 | 90 | 21765 |
| B19 | A19 | 12 | 1020 | 22657 | Hydrochloric | 12 | 90 | 30 | — | A | 920 | 90 | 21765 |
| B20 | A20 | 12 | 1020 | 22657 | Hydrochloric | 12 | 90 | 30 | — | A | 920 | 90 | 21765 |
| B21 | A21 | 12 | 1020 | 22657 | Hydrochloric | 12 | 90 | 30 | — | A | 920 | 90 | 21765 |
| B22 | A22 | 12 | 1020 | 22657 | Hydrochloric | 12 | 90 | 30 | — | A | 920 | 90 | 21765 |
| B23 | A23 | 12 | 1020 | 22657 | Hydrochloric | 12 | 90 | 30 | — | A | 920 | 90 | 21765 |
| B24 | A24 | 12 | 1020 | 22657 | Hydrochloric | 12 | 90 | 30 | — | A | 920 | 90 | 21765 |
| B25 | A25 | 12 | 1020 | 22657 | Hydrochloric | 12 | 90 | 30 | — | A | 920 | 90 | 21765 |
| B26 | A26 | 12 | 1020 | 22657 | Hydrochloric | 12 | 90 | 30 | — | A | 920 | 90 | 21765 |
| B27 | A27 | 12 | 1020 | 22657 | Hydrochloric | 12 | 90 | 30 | — | A | 920 | 90 | 21765 |
| B28 | A28 | 12 | 1020 | 22657 | Hydrochloric | 12 | 90 | 30 | — | A | 920 | 90 | 21765 |
| B29 | A29 | 12 | 1020 | 22657 | Hydrochloric | 12 | 90 | 30 | — | A | 920 | 90 | 21765 |
| B30 | A30 | 12 | 1020 | 22657 | Hydrochloric | 12 | 90 | 30 | Yes | C | 920 | 90 | 21765 |
| B31 | A30 | 12 | 1020 | 22657 | Hydrochloric | 12 | 90 | 30 | Yes | B | 920 | 90 | 21765 |
| B32 | A30 | 12 | 1020 | 22657 | Hydrochloric | 12 | 90 | 30 | Yes | C | 920 | 90 | 21765 |
| B33 | A30 | 12 | 1020 | 22657 | Hydrochloric | 12 | 90 | 30 | Yes | C | 920 | 90 | 21765 |

TABLE 3-continued

| Symbol | Steel no. | Hot rolling $t_1$ (s) | Hot rolling $T_1$ (° C.) | $S_1$ | Pickling Acid | Pickling Conc. (%) | Pickling Temp. (° C.) | Pickling Time (s) | Electroplating including corrosion resistance elements | Hot dip Al coating | Heat treatment $T_2$ (° C.) | Heat treatment $t_2$ (s) | $S_2$ |
|---|---|---|---|---|---|---|---|---|---|---|---|---|---|
| B34 | A31 | 12 | 1020 | 22657 | Hydrochloric | 12 | 90 | 30 | Yes | C | 920 | 90 | 21765 |
| B35 | A31 | 12 | 1020 | 22657 | Hydrochloric | 12 | 90 | 30 | Yes | B | 920 | 90 | 21765 |
| B36 | A31 | 12 | 1020 | 22657 | Hydrochloric | 12 | 90 | 30 | Yes | C | 920 | 90 | 21765 |
| B37 | A31 | 12 | 1020 | 22657 | Hydrochloric | 12 | 90 | 30 | Yes | C | 920 | 90 | 21765 |
| B38 | a4 | 12 | 1020 | 22657 | Hydrochloric | 12 | 90 | 30 | Yes | B | 920 | 90 | 21765 |
| B39 | a9 | 12 | 1020 | 22657 | Hydrochloric | 12 | 90 | 30 | Yes | B | 920 | 90 | 21765 |
| B40 | a10 | 12 | 1020 | 22657 | Hydrochloric | 12 | 90 | 30 | Yes | B | 920 | 90 | 21765 |
| B41 | a15 | 12 | 1020 | 22657 | Hydrochloric | 12 | 90 | 30 | Yes | C | 920 | 90 | 21765 |
| B42 | a16 | 12 | 1020 | 22657 | Hydrochloric | 12 | 90 | 30 | Yes | C | 920 | 90 | 21765 |
| B43 | a17 | 12 | 1020 | 22657 | Hydrochloric | 12 | 90 | 30 | Yes | C | 920 | 90 | 21765 |
| B44 | a18 | 12 | 1020 | 22657 | Hydrochloric | 12 | 90 | 30 | Yes | C | 920 | 90 | 21765 |
| B45 | a19 | 12 | 1020 | 22657 | Hydrochloric | 12 | 90 | 30 | Yes | C | 920 | 90 | 21765 |

TABLE 4

| Symbol | Steel no. | Hot rolling $t_1$ (s) | Hot rolling $T_1$ (° C.) | $S_1$ | Pickling Acid | Pickling Conc. (%) | Pickling Temp. (° C.) | Pickling Time (s) | Electroplating including corrosion resistance elements | Hot dip Al coating | Heat treatment $T_2$ (° C.) | Heat treatment $t_2$ (s) | $S_2$ |
|---|---|---|---|---|---|---|---|---|---|---|---|---|---|
| b1 | a1 | 12 | 1020 | 22657 | Hydrochloric | 12 | 90 | 30 | — | A | 920 | 90 | 21765 |
| b2 | a2 | 12 | 1020 | 22657 | Hydrochloric | 12 | 90 | 30 | — | A | 920 | 90 | 21765 |
| b3 | a3 | 12 | 1020 | 22657 | Hydrochloric | 12 | 90 | 30 | — | A | 920 | 90 | 21765 |
| b4 | a4 | 12 | 1020 | 22657 | Hydrochloric | 12 | 90 | 30 | — | A | 920 | 90 | 21765 |
| b5 | a5 | 12 | 1020 | 22657 | Hydrochloric | 12 | 90 | 30 | — | A | 920 | 90 | 21765 |
| b6 | a7 | 12 | 1020 | 22657 | Hydrochloric | 12 | 90 | 30 | — | A | 920 | 90 | 21765 |
| b7 | a8 | 12 | 1020 | 22657 | Hydrochloric | 12 | 90 | 30 | — | A | 920 | 90 | 21765 |
| b8 | a9 | 12 | 1020 | 22657 | Hydrochloric | 12 | 90 | 30 | — | A | 920 | 90 | 21765 |
| b9 | a10 | 12 | 1020 | 22657 | Hydrochloric | 12 | 90 | 30 | — | A | 920 | 90 | 21765 |
| b10 | a11 | 12 | 1020 | 22657 | Hydrochloric | 12 | 90 | 30 | — | A | 920 | 90 | 21765 |
| b11 | a12 | 12 | 1020 | 22657 | Hydrochloric | 12 | 90 | 30 | — | A | 920 | 90 | 21765 |
| b12 | a13 | 12 | 1020 | 22657 | Hydrochloric | 12 | 90 | 30 | — | A | 920 | 90 | 21765 |
| b13 | A30 | 12 | 1020 | 22657 | Hydrochloric | 12 | 90 | 30 | — | A | 920 | 90 | 21765 |
| b14 | A31 | 12 | 1020 | 22657 | Hydrochloric | 12 | 90 | 30 | — | A | 920 | 90 | 21765 |
| b15 | a15 | 12 | 1020 | 22657 | Hydrochloric | 12 | 90 | 30 | — | A | 920 | 90 | 21765 |
| b16 | a16 | 12 | 1020 | 22657 | Hydrochloric | 12 | 90 | 30 | — | A | 920 | 90 | 21765 |
| b17 | a17 | 12 | 1020 | 22657 | Hydrochloric | 12 | 90 | 30 | — | A | 920 | 90 | 21765 |
| b18 | a18 | 12 | 1020 | 22657 | Hydrochloric | 12 | 90 | 30 | — | A | 920 | 90 | 21765 |
| b19 | a19 | 12 | 1020 | 22657 | Hydrochloric | 12 | 90 | 30 | — | A | 920 | 90 | 21765 |
| b20 | A28 | 5 | 880 | 19765 | Hydrochloric | 12 | 90 | 30 | — | A | 920 | 90 | 21765 |
| b21 | A29 | 5 | 880 | 19765 | Hydrochloric | 12 | 90 | 30 | — | A | 920 | 90 | 21765 |
| b22 | A28 | 12 | 1020 | 22657 | Sulfuric | 15 | 80 | 180 | — | A | 920 | 90 | 21765 |
| b23 | A29 | 12 | 1020 | 22657 | Hydrochloric | 12 | 90 | 90 | — | A | 920 | 90 | 21765 |

TABLE 5-1

| | Symbol | Coated steel member Maximum Cu content in Al—Fe-based coating (mass %) | Maximum Mo content in Al—Fe-based coating (mass %) | Maximum Ni content in Al—Fe-based coating (mass %) | Maximum Mn content in Al—Fe-based coating (mass %) | Maximum Cr content in Al—Fe-based coating (mass %) | Concentration of corrosion resistance elements in Al—Fe-based coating (mass %) | Maximum Si content in Al—Fe-based coating (mass %) | Thickness of Al—Fe-based coating (μm) |
|---|---|---|---|---|---|---|---|---|---|
| Inv. ex. | B1 | 0.18 | 0.18 | 0.00 | 0.83 | 0.00 | 0.19 | 0 | 40 |
| | B2 | 0.21 | 0.14 | 0.12 | 0.35 | 0.16 | 0.22 | 0 | 40 |
| | B3 | 0.18 | 0.16 | 0.00 | 0.91 | 0.00 | 0.19 | 0 | 40 |
| | B4 | 0.21 | 0.13 | 0.00 | 1.02 | 0.24 | 0.22 | 0 | 40 |
| | B5 | 0.19 | 0.19 | 0.17 | 0.29 | 0.00 | 0.19 | 0 | 40 |
| | B6 | 0.22 | 0.14 | 0.00 | 2.28 | 0.00 | 0.25 | 0 | 40 |
| | B7 | 0.15 | 0.19 | 0.00 | 0.87 | 0.00 | 0.16 | 0 | 40 |
| | B8 | 0.19 | 0.21 | 0.00 | 0.72 | 0.00 | 0.20 | 0 | 40 |

TABLE 5-1-continued

Coated steel member

| Symbol | Maximum Cu content in Al—Fe-based coating (mass %) | Maximum Mo content in Al—Fe-based coating (mass %) | Maximum Ni content in Al—Fe-based coating (mass %) | Maximum Mn content in Al—Fe-based coating (mass %) | Maximum Cr content in Al—Fe-based coating (mass %) | Concentration of corrosion resistance elements in Al—Fe-based coating (mass %) | Maximum Si content in Al—Fe-based coating (mass %) | Thickness of Al—Fe-based coating (μm) |
|---|---|---|---|---|---|---|---|---|
| B9 | 0.18 | 0.17 | 0.00 | 0.66 | 0.29 | 0.19 | 0 | 60 |
| B10 | 0.19 | 0.14 | 0.00 | 0.66 | 0.00 | 0.20 | 0 | 60 |
| B11 | 0.19 | 0.19 | 0.00 | 0.60 | 0.23 | 0.20 | 0 | 60 |
| B12 | 0.17 | 0.17 | 0.21 | 0.78 | 0.00 | 0.18 | 0 | 60 |
| B13 | 0.23 | 0.18 | 0.00 | 0.68 | 0.00 | 0.24 | 0 | 60 |
| B14 | 0.15 | 0.14 | 0.00 | 0.71 | 0.00 | 0.16 | 0 | 60 |
| B15 | 0.56 | 0.21 | 0.25 | 0.73 | 0.00 | 0.57 | 0 | 60 |
| B16 | 0.18 | 0.13 | 0.12 | 0.72 | 0.00 | 0.19 | 0 | 60 |
| B17 | 0.23 | 0.64 | 0.00 | 0.63 | 0.00 | 0.25 | 0 | 60 |
| B18 | 0.17 | 0.19 | 0.00 | 0.58 | 0.71 | 0.18 | 0 | 60 |
| B19 | 0.21 | 0.14 | 0.65 | 0.50 | 0.00 | 0.22 | 0 | 30 |
| B20 | 0.17 | 0.17 | 0.00 | 0.62 | 0.15 | 0.18 | 0 | 30 |
| B21 | 0.21 | 0.13 | 0.27 | 0.69 | 0.00 | 0.22 | 0 | 30 |
| B22 | 0.17 | 0.19 | 0.00 | 0.83 | 0.00 | 0.18 | 0 | 30 |
| B23 | 0.17 | 0.19 | 0.00 | 0.68 | 0.18 | 0.18 | 0 | 30 |
| B24 | 0.18 | 0.13 | 0.21 | 0.60 | 0.00 | 0.19 | 0 | 30 |
| B25 | 0.19 | 0.15 | 0.00 | 0.56 | 0.00 | 0.20 | 14 | 30 |
| B26 | 0.16 | 0.15 | 0.00 | 0.97 | 0.29 | 0.18 | 10 | 30 |
| B27 | 0.18 | 0.18 | 0.16 | 0.82 | 0.00 | 0.19 | 11 | 30 |
| B28 | 0.16 | 0.19 | 0.00 | 0.81 | 0.00 | 0.17 | 12 | 30 |
| B29 | 0.21 | 0.14 | 0.17 | 0.67 | 0.16 | 0.22 | 10 | 30 |
| B30 | 0.31 | 0.15 | 0.21 | 3.00 | 0.00 | 0.35 | 0 | 35 |
| B31 | 0.21 | 2.50 | 0.21 | 0.36 | 0.00 | 0.23 | 0 | 35 |
| B32 | 0.20 | 0.15 | 1.00 | 0.36 | 1.60 | 0.24 | 0 | 35 |
| B33 | 0.10 | 1.20 | 0.80 | 1.50 | 1.20 | 0.15 | 0 | 35 |
| B34 | 0.30 | 0.10 | 0.00 | 5.00 | 0.12 | 0.36 | 0 | 35 |
| B35 | 0.23 | 2.00 | 0.00 | 0.39 | 0.12 | 0.25 | 0 | 35 |
| B36 | 0.21 | 0.10 | 1.00 | 0.39 | 2.00 | 0.25 | 0 | 35 |
| B37 | 0.11 | 1.50 | 1.20 | 2.00 | 0.80 | 0.17 | 0 | 35 |
| B38 | 0.24 | 0.55 | 0.29 | 1.36 | 0.40 | 0.27 | 0 | 50 |
| B39 | 0.22 | 0.19 | 1.05 | 0.77 | 0.00 | 0.24 | 0 | 50 |
| B40 | 0.24 | 0.14 | 0.00 | 1.89 | 0.20 | 0.27 | 0 | 50 |
| B41 | 0.24 | 0.03 | 0.00 | 0.72 | 0.00 | 0.25 | 8 | 50 |
| B42 | 0.25 | 2.68 | 0.27 | 0.89 | 1.06 | 0.29 | 10 | 50 |
| B43 | 0.24 | 0.72 | 0.00 | 0.67 | 1.96 | 0.28 | 8 | 50 |
| B44 | 0.23 | 0.21 | 0.68 | 0.59 | 0.30 | 0.25 | 15 | 50 |
| B45 | 0.25 | 0.19 | 0.22 | 1.32 | 0.34 | 0.27 | 11 | 50 |

TABLE 5-2

Coated steel member

| | Symbol | Average Al content in Al—Fe-based coating (mass %) | Average Fe content in Al—Fe-based coating (mass %) | Minimum Cu content in Al—Fe-based coating (mass %) | Max/min Cu content in Al—Fe-based coating | Tensile strength (MPa) | CCT No. of cycles |
|---|---|---|---|---|---|---|---|
| Inv. ex. | B1 | 41 | 58 | 0.10 | 1.8 | 1897 | 360 |
| | B2 | 40 | 59 | 0.12 | 1.8 | 2742 | 186 |
| | B3 | 41 | 58 | 0.10 | 1.8 | 1947 | 360 |
| | B4 | 41 | 58 | 0.11 | 1.9 | 2046 | 300 |
| | B5 | 41 | 58 | 0.11 | 1.7 | 1912 | 360 |
| | B6 | 40 | 59 | 0.12 | 1.8 | 2273 | 195 |
| | B7 | 40 | 59 | 0.07 | 2.1 | 2199 | 210 |
| | B8 | 41 | 58 | 0.11 | 1.7 | 2271 | 216 |
| | B9 | 40 | 59 | 0.10 | 1.8 | 2056 | 309 |
| | B10 | 40 | 59 | 0.10 | 1.9 | 1915 | 327 |
| | B11 | 40 | 59 | 0.10 | 1.9 | 2072 | 360 |
| | B12 | 41 | 58 | 0.09 | 1.9 | 2103 | 306 |
| | B13 | 40 | 59 | 0.12 | 1.9 | 2092 | 309 |
| | B14 | 41 | 58 | 0.09 | 1.7 | 2177 | 258 |
| | B15 | 40 | 59 | 0.29 | 1.9 | 2223 | 270 |
| | B16 | 41 | 58 | 0.10 | 1.8 | 2185 | 306 |
| | B17 | 40 | 59 | 0.13 | 1.8 | 2304 | 324 |

TABLE 5-2-continued

| | | Coated steel member | | | | | |
|---|---|---|---|---|---|---|---|
| | Symbol | Average Al content in Al—Fe-based coating (mass %) | Average Fe content in Al—Fe-based coating (mass %) | Minimum Cu content in Al—Fe-based coating (mass %) | Max/min Cu content in Al—Fe-based coating | Tensile strength (MPa) | CCT No. of cycles |
| | B18 | 40 | 59 | 0.09 | 1.9 | 2038 | 303 |
| | B19 | 40 | 59 | 0.12 | 1.8 | 1940 | 312 |
| | B20 | 41 | 58 | 0.09 | 1.9 | 1909 | 360 |
| | B21 | 41 | 58 | 0.12 | 1.8 | 2141 | 360 |
| | B22 | 41 | 58 | 0.09 | 1.9 | 2194 | 342 |
| | B23 | 40 | 59 | 0.09 | 1.9 | 2351 | 360 |
| | B24 | 40 | 59 | 0.10 | 1.8 | 1998 | 339 |
| | B25 | 32 | 58 | 0.10 | 1.9 | 1950 | 360 |
| | B26 | 35 | 58 | 0.08 | 2.0 | 2042 | 342 |
| | B27 | 34 | 58 | 0.09 | 2.0 | 2194 | 360 |
| | B28 | 32 | 59 | 0.08 | 2.0 | 1937 | 360 |
| | B29 | 35 | 58 | 0.12 | 1.8 | 2136 | 360 |
| | B30 | 40 | 59 | 0.17 | 1.8 | 2102 | 270 |
| | B31 | 41 | 58 | 0.09 | 2.3 | 2102 | 171 |
| | B32 | 40 | 59 | 0.14 | 1.4 | 2100 | 172 |
| | B33 | 41 | 58 | 0.06 | 1.7 | 2104 | 162 |
| | B34 | 40 | 59 | 0.17 | 1.8 | 2195 | 240 |
| | B35 | 41 | 58 | 0.10 | 2.3 | 2192 | 165 |
| | B36 | 41 | 58 | 0.14 | 1.5 | 2194 | 165 |
| | B37 | 41 | 58 | 0.07 | 1.6 | 2190 | 162 |
| | B38 | 40 | 59 | 0.11 | 2.2 | 2700 | 165 |
| | B39 | 40 | 59 | 0.10 | 2.2 | 2230 | 222 |
| | B40 | 40 | 59 | 0.12 | 2.0 | 2523 | 192 |
| | B41 | 35 | 59 | 0.16 | 1.5 | 2310 | 183 |
| | B42 | 35 | 58 | 0.17 | 1.5 | 2335 | 234 |
| | B43 | 36 | 58 | 0.16 | 1.5 | 2436 | 219 |
| | B44 | 32 | 58 | 0.15 | 1.5 | 2345 | 227 |
| | B45 | 33 | 59 | 0.17 | 1.5 | 2513 | 213 |

TABLE 6-1

| | | Coated steel member | | | | | | | |
|---|---|---|---|---|---|---|---|---|---|
| | Symbol | Maximum Cu content in Al—Fe-based coating (mass %) | Maximum Mo content in Al—Fe-based coating (mass %) | Maximum Ni content in Al—Fe-based coating (mass %) | Maximum Mn content in Al—Fe-based coating (mass %) | Maximum Cr content in Al—Fe-based coating (mass %) | Concentration of corrosion resistance elements in Al—Fe-based coating (mass %) | Maximum Si content in Al—Fe-based coating (mass %) | Thickness of Al—Fe-based coating (μm) |
| Comp. ex. | b1 | 0.05 | 0.15 | 0.10 | 0.77 | 0.16 | 0.06 | 0 | 20 |
| | b2 | 0.07 | 0.15 | 0.00 | 0.73 | 0.00 | 0.08 | 0 | 20 |
| | b3 | 0.06 | 0.12 | 0.00 | 0.28 | 0.24 | 0.07 | 0 | 20 |
| | b4 | 0.07 | 0.23 | 0.29 | 1.36 | 0.40 | 0.10 | 0 | 20 |
| | b5 | 0.07 | 0.15 | 0.00 | 0.06 | 0.00 | 0.07 | 0 | 20 |
| | b6 | 0.06 | 0.18 | 0.23 | 0.84 | 0.00 | 0.07 | 0 | 20 |
| | b7 | 0.07 | 0.14 | 0.00 | 0.71 | 0.42 | 0.08 | 0 | 50 |
| | b8 | 0.06 | 0.19 | 0.00 | 0.77 | 0.00 | 0.07 | 0 | 50 |
| | b9 | 0.05 | 0.14 | 0.00 | 0.72 | 0.20 | 0.06 | 0 | 50 |
| | b10 | 0.06 | 0.19 | 0.22 | 0.70 | 0.00 | 0.07 | 0 | 50 |
| | b11 | 0.07 | 0.16 | 0.00 | 0.64 | 0.49 | 0.08 | 0 | 50 |
| | b12 | 0.06 | 0.21 | 0.00 | 0.68 | 0.00 | 0.07 | 0 | 50 |
| | b13 | 0.04 | 0.11 | 0.22 | 0.36 | 0.00 | 0.05 | 0 | 50 |
| | b14 | 0.06 | 0.12 | 0.00 | 0.41 | 0.16 | 0.07 | 0 | 50 |
| | b15 | 0.07 | 0.03 | 0.00 | 0.72 | 0.00 | 0.08 | 25 | 80 |
| | b16 | 0.05 | 2.68 | 0.27 | 0.89 | 0.00 | 0.08 | 23 | 80 |
| | b17 | 0.04 | 0.18 | 0.00 | 0.67 | 1.96 | 0.07 | 30 | 80 |
| | b18 | 0.07 | 0.21 | 0.00 | 0.59 | 0.30 | 0.08 | 32 | 80 |
| | b19 | 0.07 | 0.19 | 0.22 | 0.55 | 0.34 | 0.08 | 25 | 80 |
| | b20 | 0.08 | 0.15 | 0.00 | 0.61 | 0.00 | 0.09 | 12 | 30 |
| | b21 | 0.09 | 0.10 | 0.11 | 0.46 | 0.14 | 0.10 | 10 | 30 |
| | b22 | 0.07 | 0.14 | 0.00 | 0.63 | 0.00 | 0.08 | 12 | 30 |
| | b23 | 0.08 | 0.09 | 0.12 | 0.46 | 0.14 | 0.09 | 10 | 30 |

TABLE 6-2

| | Symbol | Average Al content in Al—Fe-based coating (mass %) | Average Fe content in Al—Fe-based coating (mass %) | Minimum Cu content in Al—Fe-based coating (mass %) | Max/min Cu content in Al—Fe-based coating | Tensile strength (MPa) | CCT No. of cycles |
|---|---|---|---|---|---|---|---|
| Comp. ex. | b1 | 40 | 59 | 0.04 | 1.3 | 1400 | 189 |
| | b2 | 40 | 59 | 0.06 | 1.2 | 3069 | 21 |
| | b3 | 40 | 59 | 0.05 | 1.2 | 1490 | 177 |
| | b4 | 40 | 59 | 0.06 | 1.2 | 2700 | 48 |
| | b5 | 40 | 59 | 0.06 | 1.2 | 1425 | 180 |
| | b6 | 41 | 58 | 0.05 | 1.2 | 2369 | 60 |
| | b7 | 41 | 58 | 0.06 | 1.2 | 2483 | 42 |
| | b8 | 41 | 58 | 0.05 | 1.2 | 2230 | 108 |
| | b9 | 41 | 58 | 0.04 | 1.3 | 2523 | 75 |
| | b10 | 40 | 59 | 0.05 | 1.2 | 1422 | 180 |
| | b11 | 41 | 58 | 0.06 | 1.2 | 1483 | 177 |
| | b12 | 40 | 59 | 0.05 | 1.2 | 2352 | 60 |
| | b13 | 41 | 58 | 0.03 | 1.3 | 2102 | 54 |
| | b14 | 40 | 59 | 0.05 | 1.2 | 2192 | 51 |
| | b15 | 25 | 59 | 0.06 | 1.2 | 2310 | 69 |
| | b16 | 27 | 58 | 0.04 | 1.3 | 2335 | 117 |
| | b17 | 23 | 58 | 0.03 | 1.3 | 2436 | 108 |
| | b18 | 21 | 58 | 0.06 | 1.2 | 2345 | 110 |
| | b19 | 26 | 58 | 0.06 | 1.2 | 2513 | 99 |
| | b20 | 32 | 59 | 0.06 | 1.3 | 1937 | 126 |
| | b21 | 35 | 58 | 0.07 | 1.3 | 2136 | 102 |
| | b22 | 32 | 59 | 0.06 | 1.2 | 1937 | 120 |
| | b23 | 35 | 58 | 0.06 | 1.3 | 2136 | 99 |

Example 2

Each slab of the above Table 1 and Table 2 was hot rolled to obtain a thickness 3.0 mm hot rolled steel sheet. In the hot rolling process, the slab heating temperature was made 1250° C. and the slab was hot rolled and pickled to obtain hot rolled steel sheet. Table 7 shows the hot rolling and pickling conditions. Note that, in Table 7, $t_1$ (s) is the time from the end of rough rolling to the start of finish rolling, $T_1$ (° C.) is the average temperature of the rough bar from the end of rough rolling to the start of finish rolling, and $S_1$ is the value found by $(T_1+273) \times (\log t_1+20)$. However, in the formula of $S_1$, the unit of $t_1$ is (hr). The finish rolling end temperature was made 930° C. The steel sheet was cooled by 20° C./s up to coiling and was coiled at 550° C. After that, it was cold rolled by a cold rolling machine to obtain a thickness 1.4 mm cold rolled steel sheet. The cold rolled steel sheet was hot dip Al coated to obtain an Al-based coated steel sheet.

The obtained steel sheet was analyzed by GDS (glow discharge optical emission spectrometry) by the following method to evaluate the surface concentration of Cu. The results of evaluation are shown in Table 7.

Degree of Surface Concentration of Cu

The degree of surface concentration of Cu was measured by the following procedure. GDS (glow discharge optical emission spectrometry) was performed in the thickness direction from the surface of the Al-based coated steel sheet to detect the content of Cu. At this time, the value of the maximum value of the content of Cu within a depth of 30 μm from the surface of the steel sheet divided by the content of Cu at a depth of 200 μm from the surface of the steel sheet was calculated to find the degree of surface concentration of Cu. Note that the measurement by GDS was performed at five random points at a position of ¼ of the sheet width (short side) from an end of the Al-based coated steel sheet in the width direction. The average was made the degree of surface concentration of Cu. Note that, regarding the "surface of the steel sheet" referred to here, GDS was performed from the surface of the Al-based coated steel sheet and the depth where Fe became 90% was deemed the surface of the steel sheet.

Invention Examples C1 to C29 satisfying the scope of the present invention turned out to exhibit a good degree of Cu surface concentration and average crystal grain size, but Comparative Examples c1 to c20 not satisfying the scope of the present invention turned out to not satisfy at least one of the degree of Cu surface concentration and average crystal grain size.

TABLE 7

| | | | Hot rolling | | | Pickling | | | Steel sheet | |
|---|---|---|---|---|---|---|---|---|---|---|
| | Symbol | Steel no. | $t_1$ (s) | $T_1$ (° C.) | $S_1$ | Acid | Conc. (%) | Temp. (° C.) | Time (s) | Degree of Cu surface concentration | Average crystal grain size (μm) |
| Inv. ex. | C1 | A1 | 12 | 1020 | 22657 | Hydrochloric | 12 | 90 | 30 | 1.3 | 25 |
| | C2 | A2 | 12 | 1020 | 22657 | Hydrochloric | 12 | 90 | 30 | 1.5 | 27 |
| | C3 | A3 | 12 | 1020 | 22657 | Hydrochloric | 12 | 90 | 30 | 1.3 | 24 |

TABLE 7-continued

|  | Symbol | Steel no. | Hot rolling | | | Pickling | | | | Steel sheet | |
|---|---|---|---|---|---|---|---|---|---|---|---|
|  |  |  | $t_1$ (s) | $T_1$ (° C.) | $S_1$ | Acid | Conc. (%) | Temp. (° C.) | Time (s) | Degree of Cu surface concentration | Average crystal grain size (μm) |
|  | C4 | A4 | 12 | 1020 | 22657 | Hydrochloric | 12 | 90 | 30 | 1.5 | 22 |
|  | C5 | A5 | 12 | 1020 | 22657 | Hydrochloric | 12 | 90 | 30 | 1.3 | 23 |
|  | C6 | A6 | 12 | 1020 | 22657 | Hydrochloric | 12 | 90 | 30 | 1.5 | 28 |
|  | C7 | A7 | 12 | 1020 | 22657 | Hydrochloric | 12 | 90 | 30 | 1.3 | 24 |
|  | C8 | A8 | 12 | 1020 | 22657 | Hydrochloric | 12 | 90 | 30 | 1.4 | 22 |
|  | C9 | A9 | 12 | 1020 | 22657 | Hydrochloric | 12 | 90 | 30 | 1.3 | 21 |
|  | C10 | A10 | 12 | 1020 | 22657 | Hydrochloric | 12 | 90 | 30 | 1.4 | 28 |
|  | C11 | A11 | 12 | 1020 | 22657 | Hydrochloric | 12 | 90 | 30 | 1.5 | 20 |
|  | C12 | A12 | 12 | 1020 | 22657 | Hydrochloric | 12 | 90 | 30 | 1.3 | 27 |
|  | C13 | A13 | 12 | 1020 | 22657 | Hydrochloric | 12 | 90 | 30 | 1.4 | 23 |
|  | C14 | A14 | 12 | 1020 | 22657 | Hydrochloric | 12 | 90 | 30 | 1.2 | 25 |
|  | C15 | A15 | 12 | 1020 | 22657 | Hydrochloric | 12 | 90 | 30 | 2.0 | 24 |
|  | C16 | A16 | 12 | 1020 | 22657 | Hydrochloric | 12 | 90 | 30 | 1.4 | 27 |
|  | C17 | A17 | 12 | 1020 | 22657 | Hydrochloric | 12 | 90 | 30 | 1.6 | 28 |
|  | C18 | A18 | 12 | 1020 | 22657 | Hydrochloric | 12 | 90 | 30 | 1.4 | 24 |
|  | C19 | A19 | 12 | 1020 | 22657 | Hydrochloric | 12 | 90 | 30 | 1.5 | 23 |
|  | C20 | A20 | 12 | 1020 | 22657 | Hydrochloric | 12 | 90 | 30 | 1.3 | 22 |
|  | C21 | A21 | 12 | 1020 | 22657 | Hydrochloric | 12 | 90 | 30 | 1.4 | 23 |
|  | C22 | A22 | 12 | 1020 | 22657 | Hydrochloric | 12 | 90 | 30 | 1.3 | 25 |
|  | C23 | A23 | 12 | 1020 | 22657 | Hydrochloric | 12 | 90 | 30 | 1.4 | 21 |
|  | C24 | A24 | 12 | 1020 | 22657 | Hydrochloric | 12 | 90 | 30 | 1.4 | 24 |
|  | C25 | A25 | 12 | 1020 | 22657 | Hydrochloric | 12 | 90 | 30 | 15 | 23 |
|  | C26 | A26 | 12 | 1020 | 22657 | Hydrochloric | 12 | 90 | 30 | 14 | 23 |
|  | C27 | A27 | 12 | 1020 | 22657 | Hydrochloric | 12 | 90 | 30 | 1.6 | 21 |
|  | C28 | A28 | 12 | 1020 | 22657 | Hydrochloric | 12 | 90 | 30 | 1.3 | 25 |
|  | C29 | A29 | 12 | 1020 | 22657 | Hydrochloric | 12 | 90 | 30 | 1.4 | 23 |
| Comp. ex. | c1 | a1 | 12 | 1020 | 22657 | Hydrochloric | 12 | 90 | 30 | 0.7 | 25 |
|  | c2 | a2 | 12 | 1020 | 22657 | Hydrochloric | 12 | 90 | 30 | 0.8 | 26 |
|  | c3 | a3 | 12 | 1020 | 22657 | Hydrochloric | 12 | 90 | 30 | 0.7 | 28 |
|  | c4 | a4 | 12 | 1020 | 22657 | Hydrochloric | 12 | 90 | 30 | 0.8 | 24 |
|  | c5 | a5 | 12 | 1020 | 22657 | Hydrochloric | 12 | 90 | 30 | 0.7 | 28 |
|  | c6 | a6 | 12 | 1020 | 22657 | Hydrochloric | 12 | 90 | 30 | 1.0 | 25 |
|  | c7 | a7 | 12 | 1020 | 22657 | Hydrochloric | 12 | 90 | 30 | 0.9 | 28 |
|  | c8 | a8 | 12 | 1020 | 22657 | Hydrochloric | 12 | 90 | 30 | 0.9 | 30 |
|  | c9 | a9 | 12 | 1020 | 22657 | Hydrochloric | 12 | 90 | 30 | 0.7 | 28 |
|  | c10 | a10 | 12 | 1020 | 22657 | Hydrochloric | 12 | 90 | 30 | 0.8 | 67 |
|  | c11 | a11 | 12 | 1020 | 22657 | Hydrochloric | 12 | 90 | 30 | 0.7 | 25 |
|  | c12 | a12 | 12 | 1020 | 22657 | Hydrochloric | 12 | 90 | 30 | 0.8 | 65 |
|  | c13 | a13 | 12 | 1020 | 22657 | Hydrochloric | 12 | 90 | 30 | 0.9 | 27 |
|  | c14 | A30 | 12 | 1020 | 22657 | Hydrochloric | 12 | 90 | 30 | 0.3 | 26 |
|  | c15 | A31 | 12 | 1020 | 22657 | Hydrochloric | 12 | 90 | 30 | 0.8 | 25 |
|  | c16 | a15 | 12 | 1020 | 22657 | Hydrochloric | 12 | 90 | 30 | 1.0 | 28 |
|  | c17 | a16 | 12 | 1020 | 22657 | Hydrochloric | 12 | 90 | 30 | 0.8 | 26 |
|  | c18 | a17 | 12 | 1020 | 22657 | Hydrochloric | 12 | 90 | 30 | 0.8 | 25 |
|  | c19 | a18 | 12 | 1020 | 22657 | Hydrochloric | 12 | 90 | 30 | 0.8 | 24 |
|  | c20 | a19 | 12 | 1020 | 22657 | Hydrochloric | 12 | 90 | 30 | 0.9 | 26 |

Example 3

Each slab of the above Table 1 and Table 2 was hot rolled to obtain a thickness 3.0 mm hot rolled steel sheet. In the hot rolling process, the slab heating temperature was made 1250° C. and the slab was hot rolled and pickled to obtain hot rolled steel sheet. Table 7 shows the hot rolling and pickling conditions. Note that, in Table 7, $t_1$ (s) is the time from the end of rough rolling to the start of rolling, $T_1$ (° C.) is the average temperature of the rough bar from the end of rough rolling, and $S_1$ is the value found by $(T_1+273) \times (\log t_1+20)$. However, in the formula of $S_1$, the unit of $t_1$ is (hr). The end temperature of finish rolling was made 930° C., the steel sheet was cooled at 20° C./s up to coiling, and the steel sheet was coiled at 550° C.

After that, the steel sheet was cold rolled by a cold rolling machine to obtain thickness 1.4 mm cold rolled steel sheet. The cold rolled steel sheet was hot dip Al coated to obtain an Al-based coated steel sheet. Further, among the types of steel shown in Table 1 and Table 2, some were processed by the above processes to obtain cold rolled steel sheet and the cold rolled steel sheet was electroplated including corrosion resistance elements, then was hot dip Al coated to obtain Al-based coated steel sheet having an intermediate layer containing corrosion resistance elements in a total of 30% or more on the surface of the cold rolled steel sheet. The hot rolling, pickling, and coating conditions are shown in Table 8 and Table 9 while the concentration of elements of the intermediate layers are shown in Tables 10-1 to 11-2. Note that, A, B, and C in the columns "hot dip Al coating" of Table 8 and Table 9 respectively mean the following coatings:

A: hot dip Al coating by a usual coating bath (not including corrosion resistance elements)

B: hot dip Al coating by a coating bath with a total content of corrosion resistance elements of more than 0% and less than 1.0%

C: hot dip Al coating by a coating bath with a total content of corrosion resistance elements of 1.0% or more Invention Examples D1 to D45 satisfying the scope of the present invention turned out to exhibit good total content of corrosion resistance elements at the intermediate layer or good total content of corrosion resistance elements at the Al-based coating, but Comparative Examples d1 to d20 not satisfying the scope of the present invention turned out to not satisfy at least one of the total content of corrosion resistance elements at the intermediate layer and total content of corrosion resistance elements at the Al-based coating.

TABLE 8

| | Symbol | Steel no. | Hot rolling | | | Pickling | | | Electroplating including corrosion resistance elements | Hot dip Al coating |
| | | | $t_1$ (s) | $T_1$ (° C.) | $S_1$ | Acid | Conc. (%) | Temp. (° C.) | Time (s) | | |
|---|---|---|---|---|---|---|---|---|---|---|---|
| Inv. ex. | D1 | A1 | 12 | 1020 | 22657 | Hydrochloric | 12 | 90 | 30 | Yes | A |
| | D2 | A2 | 12 | 1020 | 22657 | Hydrochloric | 12 | 90 | 30 | Yes | A |
| | D3 | A3 | 12 | 1020 | 22657 | Hydrochloric | 12 | 90 | 30 | Yes | A |
| | D4 | A4 | 12 | 1020 | 22657 | Hydrochloric | 12 | 90 | 30 | Yes | A |
| | D5 | A5 | 12 | 1020 | 22657 | Hydrochloric | 12 | 90 | 30 | Yes | A |
| | D6 | A6 | 12 | 1020 | 22657 | Hydrochloric | 12 | 90 | 30 | Yes | A |
| | D7 | A7 | 12 | 1020 | 22657 | Hydrochloric | 12 | 90 | 30 | Yes | A |
| | D8 | A8 | 12 | 1020 | 22657 | Hydrochloric | 12 | 90 | 30 | Yes | A |
| | D9 | A9 | 12 | 1020 | 22657 | Hydrochloric | 12 | 90 | 30 | Yes | A |
| | D10 | A10 | 12 | 1020 | 22657 | Hydrochloric | 12 | 90 | 30 | Yes | A |
| | D11 | A11 | 12 | 1020 | 22657 | Hydrochloric | 12 | 90 | 30 | Yes | A |
| | D12 | A12 | 12 | 1020 | 22657 | Hydrochloric | 12 | 90 | 30 | Yes | A |
| | D13 | A13 | 12 | 1020 | 22657 | Hydrochloric | 12 | 90 | 30 | Yes | A |
| | D14 | A14 | 12 | 1020 | 22657 | Hydrochloric | 12 | 90 | 30 | Yes | A |
| | D15 | A15 | 12 | 1020 | 22657 | Hydrochloric | 12 | 90 | 30 | — | C |
| | D16 | A16 | 12 | 1020 | 22657 | Hydrochloric | 12 | 90 | 30 | — | C |
| | D17 | A17 | 12 | 1020 | 22657 | Hydrochloric | 12 | 90 | 30 | — | C |
| | D18 | A18 | 12 | 1020 | 22657 | Hydrochloric | 12 | 90 | 30 | — | C |
| | D19 | A19 | 12 | 1020 | 22657 | Hydrochloric | 12 | 90 | 30 | — | C |
| | D20 | A20 | 12 | 1020 | 22657 | Hydrochloric | 12 | 90 | 30 | — | C |
| | D21 | A21 | 12 | 1020 | 22657 | Hydrochloric | 12 | 90 | 30 | — | C |
| | D22 | A22 | 12 | 1020 | 22657 | Hydrochloric | 12 | 90 | 30 | — | C |
| | D23 | A23 | 12 | 1020 | 22657 | Hydrochloric | 12 | 90 | 30 | — | C |
| | D24 | A24 | 12 | 1020 | 22657 | Hydrochloric | 12 | 90 | 30 | — | C |
| | D25 | A25 | 12 | 1020 | 22657 | Hydrochloric | 12 | 90 | 30 | — | C |
| | D26 | A26 | 12 | 1020 | 22657 | Hydrochloric | 12 | 90 | 30 | — | C |
| | D27 | A27 | 12 | 1020 | 22657 | Hydrochloric | 12 | 90 | 30 | — | C |
| | D28 | A28 | 12 | 1020 | 22657 | Hydrochloric | 12 | 90 | 30 | Yes | C |
| | D29 | A29 | 12 | 1020 | 22657 | Hydrochloric | 12 | 90 | 30 | Yes | C |
| | D30 | A30 | 12 | 1020 | 22657 | Hydrochloric | 12 | 90 | 30 | Yes | C |
| | D31 | A30 | 12 | 1020 | 22657 | Hydrochloric | 12 | 90 | 30 | Yes | B |
| | D32 | A30 | 12 | 1020 | 22657 | Hydrochloric | 12 | 90 | 30 | Yes | C |
| | D33 | A30 | 12 | 1020 | 22657 | Hydrochloric | 12 | 90 | 30 | Yes | C |
| | D34 | A31 | 12 | 1020 | 22657 | Hydrochloric | 12 | 90 | 30 | Yes | C |
| | D35 | A31 | 12 | 1020 | 22657 | Hydrochloric | 12 | 90 | 30 | Yes | B |
| | D36 | A31 | 12 | 1020 | 22657 | Hydrochloric | 12 | 90 | 30 | Yes | C |
| | D37 | A31 | 12 | 1020 | 22657 | Hydrochloric | 12 | 90 | 30 | Yes | C |
| | D38 | a4 | 12 | 1020 | 22657 | Hydrochloric | 12 | 90 | 30 | Yes | B |
| | D39 | a9 | 12 | 1020 | 22657 | Hydrochloric | 12 | 90 | 30 | Yes | B |
| | D40 | a10 | 12 | 1020 | 22657 | Hydrochloric | 12 | 90 | 30 | Yes | B |
| | D41 | a15 | 12 | 1020 | 22657 | Hydrochloric | 12 | 90 | 30 | Yes | C |
| | D42 | a16 | 12 | 1020 | 22657 | Hydrochloric | 12 | 90 | 30 | Yes | C |
| | D43 | a17 | 12 | 1020 | 22657 | Hydrochloric | 12 | 90 | 30 | Yes | C |
| | D44 | a18 | 12 | 1020 | 22657 | Hydrochloric | 12 | 90 | 30 | Yes | C |
| | D45 | a19 | 12 | 1020 | 22657 | Hydrochloric | 12 | 90 | 30 | Yes | C |

TABLE 9

| | Symbol | Steel no. | Hot rolling | | | Pickling | | | Electroplating including corrosion resistance elements | Hot dip Al coating |
| | | | $t_1$ (s) | $T_1$ (° C.) | $S_1$ | Acid | Conc. (%) | Temp. (° C.) | Time (s) | | |
|---|---|---|---|---|---|---|---|---|---|---|---|
| Comp. ex. | d1 | a1 | 12 | 1020 | 22657 | Hydrochloric | 12 | 90 | 30 | — | A |
| | d2 | a2 | 12 | 1020 | 22657 | Hydrochloric | 12 | 90 | 30 | — | A |
| | d3 | a3 | 12 | 1020 | 22657 | Hydrochloric | 12 | 90 | 30 | — | A |
| | d4 | a4 | 12 | 1020 | 22657 | Hydrochloric | 12 | 90 | 30 | — | A |
| | d5 | a5 | 12 | 1020 | 22657 | Hydrochloric | 12 | 90 | 30 | — | A |
| | d6 | a6 | 12 | 1020 | 22657 | Hydrochloric | 12 | 90 | 30 | — | A |
| | d7 | a7 | 12 | 1020 | 22657 | Hydrochloric | 12 | 90 | 30 | — | A |

TABLE 9-continued

| | | Hot rolling | | | Pickling | | | | Electroplating including corrosion | Hot dip |
|---|---|---|---|---|---|---|---|---|---|---|
| Symbol | Steel no. | $t_1$ (s) | $T_1$ (° C.) | $S_1$ | Acid | Conc. (%) | Temp. (° C.) | Time (s) | resistance elements | Al coating |
| d8 | a8 | 12 | 1020 | 22657 | Hydrochloric | 12 | 90 | 30 | Yes | A |
| d9 | a9 | 12 | 1020 | 22657 | Hydrochloric | 12 | 90 | 30 | Yes | A |
| d10 | a10 | 12 | 1020 | 22657 | Hydrochloric | 12 | 90 | 30 | Yes | A |
| d11 | a11 | 12 | 1020 | 22657 | Hydrochloric | 12 | 90 | 30 | Yes | A |
| d12 | a12 | 12 | 1020 | 22657 | Hydrochloric | 12 | 90 | 30 | Yes | A |
| d13 | a13 | 12 | 1020 | 22657 | Hydrochloric | 12 | 90 | 30 | Yes | A |
| d14 | a14 | 12 | 1020 | 22657 | Hydrochloric | 12 | 90 | 30 | Yes | A |
| d16 | a15 | 12 | 1020 | 22657 | Hydrochloric | 12 | 90 | 30 | — | B |
| d17 | a16 | 12 | 1020 | 22657 | Hydrochloric | 12 | 90 | 30 | — | B |
| d18 | a17 | 12 | 1020 | 22657 | Hydrochloric | 12 | 90 | 30 | — | B |
| d19 | a18 | 12 | 1020 | 22657 | Hydrochloric | 12 | 90 | 30 | — | B |
| d20 | a19 | 12 | 1020 | 22657 | Hydrochloric | 12 | 90 | 30 | — | B |

TABLE 10-1

| | | Coated steel sheet | | | | | | | |
|---|---|---|---|---|---|---|---|---|---|
| | Symbol | Cu content in intermediate layer (mass %) | Mo content in intermediate layer (mass %) | Ni content in intermediate layer (mass %) | Mn content in intermediate layer (mass %) | Cr content in intermediate layer (mass %) | Total content of corrosion resistance elements in intermediate layer (mass %) | Si content in intermediate layer (mass %) | Intermediate layer thickness (μm) |
| Inv. ex. | D1 | 21 | 4 | 2 | 2 | 3 | 32 | 0 | 20 |
| | D2 | 23 | 2 | 3 | 2 | 3 | 33 | 0 | 20 |
| | D3 | 22 | 3 | 2 | 5 | 2 | 34 | 0 | 20 |
| | D4 | 21 | 3 | 3 | 3 | 5 | 35 | 0 | 20 |
| | D5 | 20 | 5 | 1 | 5 | 1 | 32 | 0 | 20 |
| | D6 | 25 | 2 | 6 | 2 | 4 | 39 | 0 | 20 |
| | D7 | 19 | 5 | 1 | 3 | 5 | 33 | 15 | 20 |
| | D8 | 22 | 3 | 5 | 5 | 3 | 38 | 15 | 30 |
| | D9 | 23 | 8 | 2 | 1 | 3 | 37 | 15 | 30 |
| | D10 | 20 | 4 | 9 | 3 | 3 | 39 | 15 | 30 |
| | D11 | 22 | 1 | 2 | 8 | 1 | 34 | 15 | 30 |
| | D12 | 21 | 1 | 2 | 2 | 9 | 35 | 15 | 30 |
| | D13 | 24 | 6 | 0 | 8 | 0 | 38 | 15 | 30 |
| | D14 | 21 | 5 | 1 | 5 | 0 | 32 | 15 | 30 |
| | D15 | — | — | — | — | — | — | — | — |
| | D16 | — | — | — | — | — | — | — | — |
| | D17 | — | — | — | — | — | — | — | — |
| | D18 | — | — | — | — | — | — | — | — |
| | D19 | — | — | — | — | — | — | — | — |
| | D20 | — | — | — | — | — | — | — | — |
| | D21 | — | — | — | — | — | — | — | — |
| | D22 | — | — | — | — | — | — | — | — |
| | D23 | — | — | — | — | — | — | — | — |
| | D24 | — | — | — | — | — | — | — | — |
| | D25 | — | — | — | — | — | — | — | — |
| | D26 | — | — | — | — | — | — | — | — |
| | D27 | — | — | — | — | — | — | — | — |
| | D28 | 22 | 3 | 4 | 2 | 3 | 34 | 0 | 15 |
| | D29 | 23 | 5 | 7 | 0 | 0 | 35 | 0 | 15 |
| | D30 | 31 | 0 | 0 | 15 | 2 | 48 | 0 | 15 |
| | D31 | 30 | 16 | 0 | 3 | 0 | 49 | 0 | 15 |
| | D32 | 1 | 0 | 1 | 0 | 0 | 2 | 0 | 15 |
| | D33 | 2 | 10 | 5 | 10 | 5 | 32 | 0 | 15 |
| | D34 | 30 | 0 | 2 | 16 | 0 | 48 | 0 | 25 |
| | D35 | 31 | 17 | 1 | 0 | 1 | 50 | 0 | 25 |
| | D36 | 2 | 0 | 1 | 0 | 0 | 3 | 0 | 25 |
| | D37 | 2 | 8 | 7 | 7 | 10 | 34 | 0 | 25 |
| | D38 | 28 | 10 | 2 | 3 | 2 | 45 | 12 | 35 |
| | D39 | 29 | 2 | 11 | 3 | 2 | 47 | 12 | 35 |
| | D40 | 30 | 2 | 2 | 12 | 3 | 49 | 12 | 35 |
| | D41 | 1 | 0 | 0 | 0 | 1 | 2 | 12 | 20 |
| | D42 | 2 | 2 | 0 | 0 | 0 | 4 | 12 | 20 |

TABLE 10-1-continued

| | | Coated steel sheet | | | | | | |
|---|---|---|---|---|---|---|---|---|
| | Symbol | Cu content in intermediate layer (mass %) | Mo content in intermediate layer (mass %) | Ni content in intermediate layer (mass %) | Mn content in intermediate layer (mass %) | Cr content in intermediate layer (mass %) | Total content of corrosion resistance elements in intermediate layer (mass %) | Si content in intermediate layer (mass %) | Intermediate layer thickness (μm) |
| | D43 | 2 | 0 | 1 | 0 | 0 | 3 | 12 | 20 |
| | D44 | 2 | 0 | 0 | 3 | 0 | 5 | 12 | 20 |
| | D45 | 1 | 0 | 0 | 0 | 2 | 3 | 12 | 20 |

TABLE 10-2

| | | Coated steel sheet | | | | | | | |
|---|---|---|---|---|---|---|---|---|---|
| | Symbol | Cu content in Al-based coating (mass %) | Mo content in Al-based coating (mass %) | Ni content in Al-based coating (mass %) | Mn content in Al-based coating (mass %) | Cr content in Al-based coating (mass %) | Total content of corrosion resistance elements in Al-based coating (mass %) | Si content in Al-based coating (mass %) | Al-based coating thickness (μm) |
| Inv. ex. | D1 | — | — | — | — | — | — | — | 20 |
| | D2 | — | — | — | — | — | — | — | 20 |
| | D3 | — | — | — | — | — | — | — | 20 |
| | D4 | — | — | — | — | — | — | — | 20 |
| | D5 | — | — | — | — | — | — | — | 20 |
| | D6 | — | — | — | — | — | — | — | 20 |
| | D7 | — | — | — | — | — | — | — | 20 |
| | D8 | — | — | — | — | — | — | — | 20 |
| | D9 | — | — | — | — | — | — | — | 20 |
| | D10 | — | — | — | — | — | — | — | 20 |
| | D11 | — | — | — | — | — | — | — | 20 |
| | D12 | — | — | — | — | — | — | — | 20 |
| | D13 | — | — | — | — | — | — | — | 20 |
| | D14 | — | — | — | — | — | — | — | 20 |
| | D15 | 4.0 | 2.0 | 0.5 | 0.4 | 0.1 | 7.0 | 10 | 30 |
| | D16 | 3.0 | 0.1 | 1.6 | 0.1 | 0.2 | 5.0 | 10 | 30 |
| | D17 | 5.0 | 0.5 | 0.1 | 2.2 | 0.2 | 8.0 | 10 | 30 |
| | D18 | 4.0 | 0.1 | 0.1 | 0.2 | 1.6 | 6.0 | 10 | 30 |
| | D19 | 3.0 | 0.8 | 0.8 | 0.2 | 0.2 | 5.0 | 10 | 30 |
| | D20 | 5.0 | 0.2 | 1.3 | 1.2 | 0.3 | 8.0 | 10 | 30 |
| | D21 | 5.0 | 0.2 | 0.3 | 1.5 | 2.0 | 9.0 | 10 | 30 |
| | D22 | 4.0 | 0.8 | 0.2 | 0.9 | 0.1 | 6.0 | 10 | 60 |
| | D23 | 5.0 | 2.5 | 0.1 | 0.1 | 2.3 | 10.0 | 0 | 60 |
| | D24 | 2.0 | 0.4 | 0.2 | 0.3 | 0.1 | 3.0 | 0 | 60 |
| | D25 | 4.0 | 0.5 | 0.6 | 0.4 | 0.5 | 6.0 | 0 | 60 |
| | D26 | 2.0 | 0.4 | 0.3 | 0.6 | 0.7 | 4.0 | 0 | 60 |
| | D27 | 2.0 | 0.2 | 0.3 | 0.3 | 0.2 | 3.0 | 0 | 60 |
| | D28 | 3.0 | 0.3 | 0.2 | 0.3 | 0.2 | 4.0 | 0 | 20 |
| | D29 | 4.0 | 0.4 | 0.1 | 0.4 | 0.1 | 5.0 | 0 | 20 |
| | D30 | 3.0 | 0.3 | 0.3 | 1.9 | 0.5 | 6.0 | 8 | 20 |
| | D31 | 0.2 | 0.1 | 0.1 | 0.0 | 0.0 | 0.4 | 8 | 20 |
| | D32 | 3.0 | 0.0 | 2.5 | 0.2 | 2.3 | 8.0 | 8 | 20 |
| | D33 | 0.6 | 0.4 | 0.6 | 0.8 | 0.6 | 3.0 | 8 | 20 |
| | D34 | 2.0 | 0.0 | 0.1 | 4.8 | 0.1 | 7.0 | 8 | 10 |
| | D35 | 0.2 | 0.3 | 0.0 | 0.0 | 0.0 | 0.5 | 8 | 10 |
| | D36 | 4.0 | 0.0 | 3.0 | 0.2 | 2.8 | 10.0 | 8 | 10 |
| | D37 | 0.8 | 0.5 | 0.4 | 0.5 | 0.8 | 3.0 | 8 | 10 |
| | D38 | 0.1 | 0.1 | 0.0 | 0.0 | 0.0 | 0.2 | 10 | 15 |
| | D39 | 0.2 | 0.0 | 0.2 | 0.0 | 0.0 | 0.4 | 10 | 15 |
| | D40 | 0.1 | 0.0 | 0.0 | 0.2 | 0.0 | 0.3 | 10 | 15 |
| | D41 | 8.0 | 0.3 | 0.3 | 0.2 | 3.2 | 12.0 | 10 | 30 |
| | D42 | 8.0 | 2.5 | 0.2 | 0.2 | 0.1 | 11.0 | 10 | 30 |
| | D43 | 10.0 | 0.2 | 3.5 | 0.2 | 0.1 | 14.0 | 10 | 30 |
| | D44 | 5.0 | 0.5 | 0.3 | 3.6 | 0.6 | 10.0 | 10 | 30 |
| | D45 | 6.0 | 0.8 | 0.2 | 0.8 | 3.2 | 11.0 | 10 | 30 |

TABLE 11-1

| | | Coated steel sheet | | | | | | | |
|---|---|---|---|---|---|---|---|---|---|
| | Symbol | Cu content in intermediate layer (mass %) | Mo content in intermediate layer (mass %) | Ni content in intermediate layer (mass %) | Mn content in intermediate layer (mass %) | Cr content in intermediate layer (mass %) | Total content of corrosion resistance elements in intermediate layer (mass %) | Si content in intermediate layer (mass %) | Intermediate layer thickness (μm) |
| Comp. ex. | d1 | — | — | — | — | — | — | — | — |
| | d2 | — | — | — | — | — | — | — | — |
| | d3 | — | — | — | — | — | — | — | — |
| | d4 | — | — | — | — | — | — | — | — |
| | d5 | — | — | — | — | — | — | — | — |
| | d6 | — | — | — | — | — | — | — | — |
| | d7 | — | — | — | — | — | — | — | — |
| | d8 | 1 | 1 | 1 | 0 | 0 | 3 | 0 | 10 |
| | d9 | 1 | 0 | 1 | 1 | 1 | 4 | 0 | 10 |
| | d10 | 2 | 0 | 1 | 1 | 1 | 5 | 0 | 10 |
| | d11 | 2 | 1 | 2 | 1 | 1 | 7 | 0 | 10 |
| | d12 | 2 | 1 | 2 | 2 | 1 | 8 | 15 | 40 |
| | d13 | 2 | 1 | 0 | 2 | 0 | 5 | 15 | 40 |
| | d14 | 2 | 1 | 0 | 0 | 1 | 4 | 15 | 40 |
| | d16 | — | — | — | — | — | — | — | — |
| | d17 | — | — | — | — | — | — | — | — |
| | d18 | — | — | — | — | — | — | — | — |
| | d19 | — | — | — | — | — | — | — | — |
| | d20 | — | — | — | — | — | — | — | — |

TABLE 11-2

| | | Coated steel sheet | | | | | | | |
|---|---|---|---|---|---|---|---|---|---|
| | Symbol | Cu content in Al-based coating (mass %) | Mo content in Al-based coating (mass %) | Ni content in Al-based coating (mass %) | Mn content in Al-based coating (mass %) | Cr content in Al-based coating (mass %) | Total content of corrosion resistance elements in Al-based coating (mass %) | Si content in Al-based coating (mass %) | Al-based coating thickness (μm) |
| Comp. ex. | d1 | — | — | — | — | — | — | — | 40 |
| | d2 | — | — | — | — | — | — | — | 40 |
| | d3 | — | — | — | — | — | — | — | 40 |
| | d4 | — | — | — | — | — | — | — | 80 |
| | d5 | — | — | — | — | — | — | — | 80 |
| | d6 | — | — | — | — | — | — | — | 80 |
| | d7 | — | — | — | — | — | — | — | 80 |
| | d8 | — | — | — | — | — | — | — | 40 |
| | d9 | — | — | — | — | — | — | — | 40 |
| | d10 | — | — | — | — | — | — | — | 40 |
| | d11 | — | — | — | — | — | — | — | 40 |
| | d12 | — | — | — | — | — | — | — | 20 |
| | d13 | — | — | — | — | — | — | — | 20 |
| | d14 | — | — | — | — | — | — | — | 20 |
| | d16 | 0.2 | 0.0 | 0.1 | 0.0 | 0.0 | 0.3 | 0 | 30 |
| | d17 | 0.2 | 0.1 | 0.0 | 0.1 | 0.0 | 0.4 | 0 | 30 |
| | d18 | 0.1 | 0.0 | 0.0 | 0.1 | 0.1 | 0.3 | 0 | 30 |
| | d19 | 0.1 | 0.1 | 0.0 | 0.0 | 0.0 | 0.2 | 10 | 30 |
| | d20 | 0.1 | 0.0 | 0.0 | 0.0 | 0.0 | 0.1 | 10 | 30 |

Example 4

Slabs having the steel constituents of Steel Nos. A28 and A29 in the types of steel shown in Table 1 and Table 2 were hot rolled (some heated using bar heater), pickled (hydrochloric acid or sulfuric acid), and hot dip Al coated as shown in Table 8 to manufacture Al-based coated steel sheets (thickness 2.8 mm)

The results of evaluation of the structures of the obtained steel sheets are shown in Table 12.

Invention Examples E1 to E22 satisfying the scope of the present invention turned out to exhibit good degree of Cu surface concentration and average crystal grain size, but Comparative Examples e1 to e18 not satisfying the scope of the present invention turned out to not satisfy at least one of the degree of Cu surface concentration and average crystal grain size.

TABLE 12

|  | Symbol | Steel no. | Slab heating temp (° C.) | $t_1$ (s) | $T_1$ (° C.) | $S_1$ | Bar heater | Finish rolling end temp. (° C.) | Cooling rate (° C./s) | Coiling temp. (° C.) | Pickling Acid | Conc. (%) | Temp. (° C.) | Time (s) | Degree of Cu surface concentration | Average crystal grain size (μm) |
|---|---|---|---|---|---|---|---|---|---|---|---|---|---|---|---|---|
| Inv. ex. | E1 | A28 | 1130 | 10 | 1050 | 23078 | Yes | 960 | 22 | 570 | Hydrochloric | 12 | 90 | 30 | 1.3 | 21 |
| | E2 | A28 | 1320 | 13 | 1040 | 23053 | No | 920 | 17 | 540 | Hydrochloric | 12 | 90 | 30 | 1.3 | 28 |
| | E3 | A28 | 1270 | 8 | 950 | 21215 | No | 940 | 18 | 560 | Hydrochloric | 12 | 90 | 30 | 1.2 | 22 |
| | E4 | A28 | 1280 | 10 | 1020 | 22555 | No | 850 | 17 | 590 | Hydrochloric | 12 | 90 | 30 | 1.3 | 28 |
| | E5 | A28 | 1250 | 10 | 1040 | 22904 | Yes | 980 | 19 | 580 | Hydrochloric | 12 | 90 | 30 | 1.3 | 27 |
| | E6 | A28 | 1280 | 12 | 1040 | 23008 | No | 910 | 12 | 620 | Hydrochloric | 12 | 90 | 30 | 1.3 | 27 |
| | E7 | A28 | 1290 | 19 | 1020 | 22915 | No | 920 | 23 | 690 | Hydrochloric | 12 | 90 | 30 | 1.2 | 28 |
| | E8 | A28 | 1250 | 12 | 1020 | 22657 | No | 930 | 20 | 550 | Hydrochloric | 12 | 90 | 30 | 1.3 | 25 |
| | E9 | A28 | 1250 | 12 | 1020 | 22657 | No | 930 | 20 | 550 | Sulfuric | 10 | 80 | 60 | 1.3 | 25 |
| | E10 | A28 | 1250 | 12 | 1020 | 22657 | No | 930 | 20 | 550 | Hydrochloric | 8 | 90 | 30 | 1.5 | 25 |
| | E11 | A28 | 1250 | 12 | 1020 | 22657 | No | 930 | 20 | 550 | Hydrochloric | 7 | 80 | 150 | 1.3 | 25 |
| | E12 | A29 | 1130 | 10 | 1050 | 23078 | Yes | 960 | 22 | 570 | Hydrochloric | 12 | 90 | 30 | 1.4 | 22 |
| | E13 | A29 | 1320 | 13 | 1040 | 23053 | No | 920 | 17 | 540 | Hydrochloric | 12 | 90 | 30 | 1.4 | 27 |
| | E14 | A29 | 1270 | 8 | 950 | 21215 | No | 940 | 18 | 560 | Hydrochloric | 12 | 90 | 30 | 1.3 | 21 |
| | E15 | A29 | 1280 | 10 | 1020 | 22555 | No | 850 | 17 | 590 | Hydrochloric | 12 | 90 | 30 | 1.4 | 28 |
| | E16 | A29 | 1250 | 10 | 1040 | 22904 | Yes | 980 | 19 | 580 | Hydrochloric | 12 | 90 | 30 | 1.4 | 27 |
| | E17 | A29 | 1280 | 12 | 1040 | 23008 | No | 910 | 12 | 620 | Hydrochloric | 12 | 90 | 30 | 1.4 | 27 |
| | E18 | A29 | 1290 | 19 | 1020 | 22915 | No | 920 | 23 | 690 | Hydrochloric | 12 | 90 | 30 | 1.3 | 28 |
| | E19 | A29 | 1250 | 12 | 1020 | 22657 | No | 930 | 20 | 550 | Hydrochloric | 12 | 90 | 30 | 1.4 | 23 |
| | E20 | A29 | 1250 | 12 | 1020 | 22657 | No | 930 | 20 | 550 | Sulfuric | 10 | 80 | 60 | 1.4 | 23 |
| | E21 | A29 | 1250 | 12 | 1020 | 22657 | No | 930 | 20 | 550 | Hydrochloric | 8 | 90 | 30 | 1.6 | 23 |
| | E22 | A29 | 1250 | 12 | 1020 | 22657 | No | 930 | 20 | 550 | Hydrochloric | 7 | 80 | 150 | 1.4 | 23 |
| Comp. ex. | e1 | A28 | 1380 | 14 | 1030 | 22920 | No | 930 | 18 | 590 | Hydrochloric | 12 | 90 | 30 | 1.3 | 92 |
| | e2 | A28 | 1260 | 5 | 880 | 19765 | Yes | 940 | 16 | 600 | Hydrochloric | 12 | 90 | 30 | 1.0 | 24 |
| | e3 | A28 | 1260 | 5 | 800 | 18394 | Yes | 940 | 16 | 600 | Hydrochloric | 12 | 90 | 30 | 0.7 | 23 |
| | e4 | A28 | 1270 | 10 | 980 | 21857 | No | 750 | 17 | 610 | Hydrochloric | 12 | 90 | 30 | 1.2 | 82 |
| | e5 | A28 | 1250 | 12 | 960 | 21606 | Yes | 1100 | 15 | 590 | Hydrochloric | 12 | 90 | 30 | 1.2 | 80 |
| | e6 | A28 | 1260 | 14 | 960 | 21688 | No | 950 | 3 | 580 | Hydrochloric | 12 | 90 | 30 | 1.2 | 74 |
| | e7 | A28 | 1270 | 10 | 960 | 21508 | No | 940 | 19 | 850 | Hydrochloric | 12 | 90 | 30 | 1.2 | 75 |
| | e8 | A28 | 1270 | 10 | 960 | 21508 | No | 940 | 19 | 600 | Sulfuric | 15 | 80 | 180 | 0.9 | 24 |
| | e9 | A28 | 1270 | 10 | 960 | 21508 | No | 940 | 19 | 600 | Hydrochloric | 10 | 90 | 180 | 1.0 | 24 |
| | e10 | A29 | 1380 | 14 | 1030 | 22920 | No | 930 | 18 | 590 | Hydrochloric | 12 | 90 | 30 | 1.3 | 78 |
| | e11 | A29 | 1260 | 5 | 880 | 19765 | Yes | 940 | 16 | 600 | Hydrochloric | 12 | 90 | 30 | 1.0 | 22 |
| | e12 | A29 | 1260 | 5 | 800 | 18394 | Yes | 940 | 16 | 600 | Hydrochloric | 12 | 90 | 30 | 0.8 | 21 |
| | e13 | A29 | 1270 | 5 | 980 | 21480 | No | 750 | 17 | 610 | Hydrochloric | 12 | 90 | 30 | 1.2 | 74 |
| | e14 | A29 | 1250 | 6 | 980 | 21579 | Yes | 1100 | 15 | 590 | Hydrochloric | 12 | 90 | 30 | 1.2 | 76 |
| | e15 | A29 | 1260 | 8 | 980 | 21736 | No | 950 | 3 | 580 | Hydrochloric | 12 | 90 | 30 | 1.2 | 74 |
| | e16 | A29 | 1270 | 8 | 980 | 21736 | No | 940 | 19 | 850 | Hydrochloric | 12 | 90 | 30 | 1.2 | 75 |
| | e17 | A29 | 1270 | 8 | 980 | 21736 | No | 940 | 19 | 600 | Hydrochloric | 12 | 90 | 90 | 1.0 | 22 |
| | e18 | A29 | 1270 | 8 | 980 | 21736 | No | 940 | 19 | 600 | Hydrochloric | 10 | 90 | 180 | 1.0 | 22 |

Example 5

The types of steel shown in Table 1 and Table 2 were used to manufacture coated steel sheets (thickness 1.8 mm) under the hot rolling, pickling, and plating conditions shown in Table 13 and Table 14. The intermediate layers of the coated steel sheets and the contents of the corrosion resistance elements in the Al-based coating are shown in Tables 15-1 to 16-2. Note that, A, B, and C in the columns "hot dip Al coating" of Table 13 and Table 14 respectively mean the following coating:

A: hot dip Al coating by a usual coating bath (not including corrosion resistance elements)

B: hot dip Al coating by a coating bath with a total content of corrosion resistance elements of more than 0% and less than 1.0%

C: hot dip Al coating by a coating bath with a total content of corrosion resistance elements of 1.0% or more Next, these coated steel sheets were heat treated under the conditions of Table 17 and Table 18 to manufacture coated steel members. The results of evaluation of the structures and properties of the obtained coated steel members are shown in Tables 19-1 to 20-2.

Invention Examples F1 to F38 satisfying the scope of the present invention turned out to be good in both the concentration of corrosion resistance elements in the Al—Fe-based coatings and the properties, but Comparative Examples f1 to f24 not satisfying the scope of the present invention turned out to not satisfy the concentration of corrosion resistance elements in the Al—Fe-based coatings.

TABLE 13

| Symbol | Steel no. | Hot rolling | | | Picking | | | | Al electroplating including corrosion resistance elements | Hot dip Al coating |
| | | $t_1$ (s) | $T_1$ (°C.) | $S_1$ | Acid | Conc. % | Temp. (°C.) | Time (s) | | |
| --- | --- | --- | --- | --- | --- | --- | --- | --- | --- | --- |
| F1 | A28 | 12 | 1020 | 22657 | Hydrochloric | 12 | 90 | 30 | — | A |
| F2 | A28 | 12 | 1020 | 22657 | Hydrochloric | 12 | 90 | 30 | — | A |
| F3 | A28 | 12 | 1020 | 22657 | Hydrochloric | 12 | 90 | 30 | — | A |
| F4 | A28 | 12 | 1020 | 22657 | Hydrochloric | 12 | 90 | 30 | — | A |
| F5 | A28 | 12 | 1020 | 22657 | Hydrochloric | 12 | 90 | 30 | — | A |
| F6 | A28 | 12 | 1020 | 22657 | Hydrochloric | 12 | 90 | 30 | — | A |
| F7 | A28 | 12 | 1020 | 22657 | Hydrochloric | 12 | 90 | 30 | — | A |
| F8 | A28 | 12 | 1020 | 22657 | Hydrochloric | 12 | 90 | 30 | — | A |
| F9 | A28 | 12 | 1020 | 22657 | Hydrochloric | 12 | 90 | 30 | — | A |
| F10 | A29 | 12 | 1020 | 22657 | Hydrochloric | 12 | 90 | 30 | — | A |
| F11 | A29 | 12 | 1020 | 22657 | Hydrochloric | 12 | 90 | 30 | — | A |
| F12 | A29 | 12 | 1020 | 22657 | Hydrochloric | 12 | 90 | 30 | — | A |
| F13 | A29 | 12 | 1020 | 22657 | Hydrochloric | 12 | 90 | 30 | — | A |
| F14 | A29 | 12 | 1020 | 22657 | Hydrochloric | 12 | 90 | 30 | — | A |
| F15 | A29 | 12 | 1020 | 22657 | Hydrochloric | 12 | 90 | 30 | — | A |
| F16 | A29 | 12 | 1020 | 22657 | Hydrochloric | 12 | 90 | 30 | — | A |
| F17 | A29 | 12 | 1020 | 22657 | Hydrochloric | 12 | 90 | 30 | — | A |
| F18 | A29 | 12 | 1020 | 22657 | Hydrochloric | 12 | 90 | 30 | — | A |
| F19 | A30 | 12 | 1020 | 22657 | Hydrochloric | 12 | 90 | 30 | Yes | C |
| F20 | A30 | 12 | 1020 | 22657 | Hydrochloric | 12 | 90 | 30 | Yes | B |
| F21 | A30 | 12 | 1020 | 22657 | Hydrochloric | 12 | 90 | 30 | Yes | C |
| F22 | A30 | 12 | 1020 | 22657 | Hydrochloric | 12 | 90 | 30 | Yes | C |
| F23 | A31 | 12 | 1020 | 22657 | Hydrochloric | 12 | 90 | 30 | Yes | C |
| F24 | A31 | 12 | 1020 | 22657 | Hydrochloric | 12 | 90 | 30 | Yes | B |
| F25 | A31 | 12 | 1020 | 22657 | Hydrochloric | 12 | 90 | 30 | Yes | C |
| F26 | A31 | 12 | 1020 | 22657 | Hydrochloric | 12 | 90 | 30 | Yes | C |
| F27 | a4 | 12 | 1020 | 22657 | Hydrochloric | 12 | 90 | 30 | Yes | B |
| F28 | a9 | 12 | 1020 | 22657 | Hydrochloric | 12 | 90 | 30 | Yes | B |
| F29 | a10 | 12 | 1020 | 22657 | Hydrochloric | 12 | 90 | 30 | Yes | B |
| F30 | a15 | 12 | 1020 | 22657 | Hydrochloric | 12 | 90 | 30 | Yes | C |
| F31 | a16 | 12 | 1020 | 22657 | Hydrochloric | 12 | 90 | 30 | Yes | C |
| F32 | a17 | 12 | 1020 | 22657 | Hydrochloric | 12 | 90 | 30 | Yes | C |
| F33 | a18 | 12 | 1020 | 22657 | Hydrochloric | 12 | 90 | 30 | Yes | C |
| F34 | a19 | 12 | 1020 | 22657 | Hydrochloric | 12 | 90 | 30 | Yes | C |
| F35 | A28 | 12 | 1020 | 22657 | Hydrochloric | 12 | 90 | 30 | Yes | C |
| F36 | A29 | 12 | 1020 | 22657 | Hydrochloric | 12 | 90 | 30 | Yes | C |
| F37 | A28 | 5 | 880 | 19765 | Sulfuric | 15 | 80 | 180 | Yes | A |
| F38 | A29 | 5 | 880 | 19765 | Hydrochloric | 12 | 90 | 90 | Yes | A |

TABLE 14

| Symbol | Steel no. | Hot rolling | | | Picking | | | | Al electroplating including corrosion resistance elements | Hot dip Al coating |
| | | $t_1$ (s) | $T_1$ (°C.) | $S_1$ | Acid | Conc. % | Temp. (°C.) | Time (s) | | |
| --- | --- | --- | --- | --- | --- | --- | --- | --- | --- | --- |
| f1 | A28 | 12 | 1020 | 22657 | Hydrochloric | 12 | 90 | 30 | — | A |
| f2 | A28 | 12 | 1020 | 22657 | Hydrochloric | 12 | 90 | 30 | — | A |
| f3 | A28 | 12 | 1020 | 22657 | Hydrochloric | 12 | 90 | 30 | — | A |
| f4 | A28 | 12 | 1020 | 22657 | Hydrochloric | 12 | 90 | 30 | — | A |
| f5 | A28 | 12 | 1020 | 22657 | Hydrochloric | 12 | 90 | 30 | — | A |
| f6 | A28 | 12 | 1020 | 22657 | Hydrochloric | 12 | 90 | 30 | — | A |
| f7 | A28 | 12 | 1020 | 22657 | Hydrochloric | 12 | 90 | 30 | — | A |
| f8 | A29 | 12 | 1020 | 22657 | Hydrochloric | 12 | 90 | 30 | — | A |
| f9 | A29 | 12 | 1020 | 22657 | Hydrochloric | 12 | 90 | 30 | — | A |
| f10 | A29 | 12 | 1020 | 22657 | Hydrochloric | 12 | 90 | 30 | — | A |
| f11 | A29 | 12 | 1020 | 22657 | Hydrochloric | 12 | 90 | 30 | — | A |
| f12 | A29 | 12 | 1020 | 22657 | Hydrochloric | 12 | 90 | 30 | — | A |
| f13 | A28 | 12 | 1020 | 22657 | Hydrochloric | 12 | 90 | 30 | Yes | C |
| f14 | A28 | 12 | 1020 | 22657 | Hydrochloric | 12 | 90 | 30 | Yes | C |
| f15 | A28 | 12 | 1020 | 22657 | Hydrochloric | 12 | 90 | 30 | Yes | C |
| f16 | A28 | 12 | 1020 | 22657 | Hydrochloric | 12 | 90 | 30 | Yes | C |
| f17 | A28 | 12 | 1020 | 22657 | Hydrochloric | 12 | 90 | 30 | Yes | C |
| f18 | A28 | 12 | 1020 | 22657 | Hydrochloric | 12 | 90 | 30 | Yes | C |
| f19 | A28 | 12 | 1020 | 22657 | Hydrochloric | 12 | 90 | 30 | Yes | C |
| f20 | A29 | 12 | 1020 | 22657 | Hydrochloric | 12 | 90 | 30 | Yes | C |

TABLE 14-continued

| | | Hot rolling | | | Picking | | | Al electroplating including corrosion | Hot dip |
|---|---|---|---|---|---|---|---|---|---|
| Symbol | Steel no. | t₁ (s) | T₁ (° C.) | S₁ | Acid | Conc. % | Temp. (° C.) | Time (s) | resistance elements | Al coating |
| f21 | A29 | 12 | 1020 | 22657 | Hydrochloric | 12 | 90 | 30 | Yes | C |
| f22 | A29 | 12 | 1020 | 22657 | Hydrochloric | 12 | 90 | 30 | Yes | C |
| f23 | A29 | 12 | 1020 | 22657 | Hydrochloric | 12 | 90 | 30 | Yes | C |
| f24 | A29 | 12 | 1020 | 22657 | Hydrochloric | 12 | 90 | 30 | Yes | C |

TABLE 15-1

Coated steel sheet

| Symbol | Degree of Cu surface concentration | Grain size (μm) | Cu content in intermediate layer (mass %) | Mo content in intermediate layer (mass %) | Ni content in intermediate layer (mass %) | Mn content in intermediate layer (mass %) | Cr content in intermediate layer (mass %) | Total content of corrosion resistance elements in intermediate layer (mass %) |
|---|---|---|---|---|---|---|---|---|
| F1 | 1.3 | 25 | — | — | — | — | — | — |
| F2 | 1.3 | 25 | — | — | — | — | — | — |
| F3 | 1.3 | 25 | — | — | — | — | — | — |
| F4 | 1.3 | 25 | — | — | — | — | — | — |
| F5 | 1.3 | 25 | — | — | — | — | — | — |
| F6 | 1.3 | 25 | — | — | — | — | — | — |
| F7 | 1.3 | 25 | — | — | — | — | — | — |
| F8 | 1.3 | 25 | — | — | — | — | — | — |
| F9 | 1.3 | 25 | — | — | — | — | — | — |
| F10 | 1.3 | 23 | — | — | — | — | — | — |
| F11 | 1.3 | 23 | — | — | — | — | — | — |
| F12 | 1.3 | 23 | — | — | — | — | — | — |
| F13 | 1.4 | 23 | — | — | — | — | — | — |
| F14 | 1.4 | 23 | — | — | — | — | — | — |
| F15 | 1.4 | 23 | — | — | — | — | — | — |
| F16 | 1.4 | 23 | — | — | — | — | — | — |
| F17 | 1.4 | 23 | — | — | — | — | — | — |
| F18 | 1.4 | 23 | — | — | — | — | — | — |
| F19 | 0.3 | 26 | 31 | 0 | 0 | 15 | 2 | 48 |
| F20 | 0.3 | 26 | 30 | 16 | 0 | 3 | 0 | 49 |
| F21 | 0.3 | 26 | 1 | 0 | 1 | 0 | 0 | 2 |
| F22 | 0.3 | 26 | 2 | 10 | 5 | 10 | 5 | 32 |
| F23 | 0.8 | 25 | 30 | 0 | 2 | 16 | 0 | 48 |
| F24 | 0.8 | 25 | 31 | 17 | 1 | 0 | 1 | 50 |
| F25 | 0.8 | 25 | 2 | 0 | 1 | 0 | 0 | 3 |
| F26 | 0.8 | 25 | 2 | 8 | 7 | 7 | 10 | 34 |
| F27 | 0.8 | 24 | 28 | 10 | 2 | 3 | 2 | 45 |
| F28 | 0.7 | 28 | 29 | 2 | 11 | 3 | 2 | 47 |
| F29 | 0.8 | 67 | 30 | 2 | 2 | 12 | 3 | 49 |
| F30 | 0.8 | 26 | 1 | 0 | 0 | 0 | 1 | 2 |
| F31 | 0.8 | 25 | 2 | 2 | 0 | 0 | 0 | 4 |
| F32 | 0.8 | 24 | 2 | 0 | 1 | 0 | 0 | 3 |
| F33 | 0.8 | 24 | 2 | 0 | 0 | 3 | 0 | 5 |
| F34 | 0.9 | 26 | 1 | 0 | 0 | 0 | 2 | 3 |
| F35 | 1.3 | 25 | 22 | 3 | 4 | 2 | 3 | 34 |
| F36 | 1.4 | 23 | 23 | 5 | 7 | 0 | 0 | 35 |
| F37 | 0.9 | 24 | 21 | 4 | 2 | 2 | 3 | 32 |
| F38 | 1.0 | 22 | 23 | 2 | 3 | 2 | 3 | 33 |

TABLE 15-2

| | Coated steel sheet | | | | | |
|---|---|---|---|---|---|---|
| Symbol | Cu content in Al-based coating (mass %) | Mo content in Al-based coating (mass %) | Ni content in Al-based coating (mass %) | Mn content in Al-based coating (mass %) | Cr content in Al-based coating (mass %) | Total content of corrosion resistance elements in Al-based coating (mass %) |
| F1 | — | — | — | — | — | — |
| F2 | — | — | — | — | — | — |
| F3 | — | — | — | — | — | — |
| F4 | — | — | — | — | — | — |
| F5 | — | — | — | — | — | — |
| F6 | — | — | — | — | — | — |
| F7 | — | — | — | — | — | — |
| F8 | — | — | — | — | — | — |
| F9 | — | — | — | — | — | — |
| F10 | — | — | — | — | — | — |
| F11 | — | — | — | — | — | — |
| F12 | — | — | — | — | — | — |
| F13 | — | — | — | — | — | — |
| F14 | — | — | — | — | — | — |
| F15 | — | — | — | — | — | — |
| F16 | — | — | — | — | — | — |
| F17 | — | — | — | — | — | — |
| F18 | — | — | — | — | — | — |
| F19 | 3.0 | 0.3 | 0.3 | 1.9 | 0.5 | 6.0 |
| F20 | 0.2 | 0.1 | 0.1 | 0.0 | 0.0 | 0.4 |
| F21 | 3.0 | 0.0 | 2.5 | 0.2 | 2.3 | 8.0 |
| F22 | 0.6 | 0.4 | 0.6 | 0.8 | 0.6 | 3.0 |
| F23 | 2.0 | 0.0 | 0.1 | 4.8 | 0.1 | 7.0 |
| F24 | 0.2 | 0.3 | 0.0 | 0.0 | 0.0 | 0.5 |
| F25 | 4.0 | 0.0 | 3.0 | 0.2 | 2.8 | 10.0 |
| F26 | 0.8 | 0.5 | 0.4 | 0.5 | 0.8 | 3.0 |
| F27 | 0.1 | 0.1 | 0.0 | 0.0 | 0.0 | 0.2 |
| F28 | 0.2 | 0.0 | 0.2 | 0.0 | 0.0 | 0.4 |
| F29 | 0.1 | 0.0 | 0.0 | 0.2 | 0.0 | 0.3 |
| F30 | 8.0 | 0.3 | 0.3 | 0.2 | 3.2 | 12.0 |
| F31 | 8.0 | 2.5 | 0.2 | 0.2 | 0.1 | 11.0 |
| F32 | 10.0 | 0.2 | 3.5 | 0.2 | 0.1 | 14.0 |
| F33 | 5.0 | 0.5 | 0.3 | 3.6 | 0.6 | 10.0 |
| F34 | 6.0 | 0.8 | 0.2 | 0.8 | 3.2 | 11.0 |
| F35 | 3.0 | 0.3 | 0.2 | 0.3 | 0.2 | 4.0 |
| F36 | 4.0 | 0.4 | 0.1 | 0.4 | 0.1 | 5.0 |
| F37 | — | — | — | — | — | — |
| F38 | — | — | — | — | — | — |

TABLE 16-1

| | Coated steel sheet | | | | | | | |
|---|---|---|---|---|---|---|---|---|
| Symbol | Degree of Cu surface concentration | Grain size (μm) | Cu content in intermediate layer (mass %) | Mo content in intermediate layer (mass %) | N content in intermediate layer (mass %) | Mn content in intermediate layer (mass %) | Cr content in intermediate layer (mass %) | Total content of corrosion resistance elements in intermediate layer (mass %) |
| f1 | 1.3 | 25 | — | — | — | — | — | — |
| f2 | 1.3 | 25 | — | — | — | — | — | — |
| f3 | 1.3 | 25 | — | — | — | — | — | — |
| f4 | 1.3 | 25 | — | — | — | — | — | — |
| f5 | 1.3 | 25 | — | — | — | — | — | — |
| f6 | 1.3 | 25 | — | — | — | — | — | — |
| f7 | 1.3 | 25 | — | — | — | — | — | — |
| f8 | 1.4 | 23 | — | — | — | — | — | — |
| f9 | 1.4 | 23 | — | — | — | — | — | — |
| f10 | 1.4 | 23 | — | — | — | — | — | — |
| f11 | 1.4 | 23 | — | — | — | — | — | — |
| f12 | 1.4 | 23 | — | — | — | — | — | — |
| f13 | 1.3 | 25 | 22 | 3 | 4 | 2 | 3 | 34 |
| f14 | 1.3 | 25 | 22 | 3 | 4 | 2 | 3 | 34 |
| f15 | 1.3 | 25 | 22 | 3 | 4 | 2 | 3 | 34 |
| f16 | 1.3 | 25 | 22 | 3 | 4 | 2 | 3 | 34 |

TABLE 16-1-continued

Coated steel sheet

| Symbol | Degree of Cu surface concentration | Grain size (μm) | Cu content in intermediate layer (mass %) | Mo content in intermediate layer (mass %) | N content in intermediate layer (mass %) | Mn content in intermediate layer (mass %) | Cr content in intermediate layer (mass %) | Total content of corrosion resistance elements in intermediate layer (mass %) |
|---|---|---|---|---|---|---|---|---|
| f17 | 1.3 | 25 | 22 | 3 | 4 | 2 | 3 | 34 |
| f18 | 1.3 | 25 | 22 | 3 | 4 | 2 | 3 | 34 |
| f19 | 1.3 | 25 | 22 | 3 | 4 | 2 | 3 | 34 |
| f20 | 1.4 | 23 | 23 | 5 | 7 | 0 | 0 | 35 |
| f21 | 1.4 | 23 | 23 | 5 | 7 | 0 | 0 | 35 |
| f22 | 1.4 | 23 | 23 | 5 | 7 | 0 | 0 | 35 |
| f23 | 1.4 | 23 | 23 | 5 | 7 | 0 | 0 | 35 |
| f24 | 1.4 | 23 | 23 | 5 | 7 | 0 | 0 | 35 |

TABLE 16-2

Coated steel sheet

| Symbol | Cu content in Al-based coating (mass %) | Mo content in Al-based coating (mass %) | Ni content in Al-based coating (mass %) | Mn content in Al-based coating (mass %) | Cr content in Al-based coating (mass %) | Total content of corrosion resistance elements in Al-based coating (mass %) |
|---|---|---|---|---|---|---|
| f1 | — | — | — | — | — | — |
| f2 | — | — | — | — | — | — |
| f3 | — | — | — | — | — | — |
| f4 | — | — | — | — | — | — |
| f5 | — | — | — | — | — | — |
| f6 | — | — | — | — | — | — |
| f7 | — | — | — | — | — | — |
| f8 | — | — | — | — | — | — |
| f9 | — | — | — | — | — | — |
| f10 | — | — | — | — | — | — |
| f11 | — | — | — | — | — | — |
| f12 | — | — | — | — | — | — |
| f13 | 3.0 | 0.3 | 0.2 | 0.3 | 0.2 | 4.0 |
| f14 | 3.0 | 0.3 | 0.2 | 0.3 | 0.2 | 4.0 |
| f15 | 3.0 | 0.3 | 0.2 | 0.3 | 0.2 | 4.0 |
| f16 | 3.0 | 0.3 | 0.2 | 0.3 | 0.2 | 4.0 |
| f17 | 3.0 | 0.3 | 0.2 | 0.3 | 0.2 | 4.0 |
| f18 | 3.0 | 0.3 | 0.2 | 0.3 | 0.2 | 4.0 |
| f19 | 3.0 | 0.3 | 0.2 | 0.3 | 0.2 | 4.0 |
| f20 | 4.0 | 0.4 | 0.1 | 0.4 | 0.1 | 5.0 |
| f21 | 4.0 | 0.4 | 0.1 | 0.4 | 0.1 | 5.0 |
| f22 | 4.0 | 0.4 | 0.1 | 0.4 | 0.1 | 5.0 |
| f23 | 4.0 | 0.4 | 0.1 | 0.4 | 0.1 | 5.0 |
| f24 | 4.0 | 0.4 | 0.1 | 0.4 | 0.1 | 5.0 |

TABLE 17

Heat treatment

| Symbol | Heating temp. $T_2$ (° C.) | Rate of temperature rise (° C./s) | $t_2$ (s) | $S_2$ | Cooling rate down to Ms (° C./s) | Ms to 100° C. cooling rate (° C./s) |
|---|---|---|---|---|---|---|
| F1 | 850 | 10 | 30 | 19946 | 95 | 50 |
| F2 | 1080 | 12 | 20 | 23831 | 90 | 55 |
| F3 | 990 | 7 | 30 | 22455 | 100 | 40 |
| F4 | 870 | 500 | 40 | 20446 | 90 | 45 |
| F5 | 900 | 8 | 3 | 19679 | 90 | 55 |
| F6 | 920 | 10 | 30 | 21200 | 35 | 50 |
| F7 | 910 | 9 | 40 | 21168 | 50 | 8 |
| F8 | 920 | 10 | 100 | 21819 | 100 | 50 |
| F9 | 920 | 10 | 90 | 21765 | 100 | 30 |
| F10 | 850 | 10 | 50 | 20193 | 95 | 50 |
| F11 | 1050 | 12 | 20 | 23299 | 90 | 55 |
| F12 | 990 | 7 | 30 | 22455 | 100 | 40 |
| F13 | 870 | 500 | 40 | 20446 | 90 | 45 |
| F14 | 900 | 8 | 4 | 19824 | 90 | 55 |
| F15 | 920 | 10 | 30 | 21200 | 35 | 50 |
| F16 | 910 | 9 | 40 | 21168 | 50 | 8 |
| F17 | 920 | 10 | 80 | 21704 | 100 | 50 |
| F18 | 920 | 10 | 90 | 21765 | 100 | 25 |

TABLE 17-continued

| | Heat treatment | | | | | |
|---|---|---|---|---|---|---|
| Symbol | Heating temp. $T_2$ (°C.) | Rate of temperature rise (°C./s) | $t_2$ (s) | $S_2$ | Cooling rate down to Ms (°C./s) | Ms to 100° C. cooling rate (°C./s) |
| F19 | 920 | 10 | 90 | 21765 | 100 | 25 |
| F20 | 920 | 10 | 90 | 21765 | 100 | 25 |
| F21 | 920 | 10 | 90 | 21765 | 100 | 25 |
| F22 | 920 | 10 | 90 | 21765 | 100 | 25 |
| F23 | 920 | 10 | 90 | 21765 | 100 | 25 |
| F24 | 920 | 10 | 90 | 21765 | 100 | 25 |
| F25 | 920 | 10 | 90 | 21765 | 100 | 25 |
| F26 | 920 | 10 | 90 | 21765 | 100 | 25 |
| F27 | 920 | 10 | 90 | 21765 | 100 | 25 |
| F28 | 920 | 10 | 90 | 21765 | 100 | 25 |
| F29 | 920 | 10 | 90 | 21765 | 100 | 25 |
| F30 | 920 | 10 | 90 | 21765 | 100 | 25 |
| F31 | 920 | 10 | 90 | 21765 | 100 | 25 |
| F32 | 920 | 10 | 90 | 21765 | 100 | 25 |
| F33 | 920 | 10 | 90 | 21765 | 100 | 25 |
| F34 | 920 | 10 | 90 | 21765 | 100 | 25 |
| F35 | 920 | 10 | 90 | 21765 | 100 | 25 |
| F36 | 920 | 10 | 90 | 21765 | 100 | 25 |
| F37 | 920 | 10 | 90 | 21765 | 100 | 25 |
| F38 | 920 | 10 | 90 | 21765 | 100 | 25 |

TABLE 18

| | Heat treatment | | | | | |
|---|---|---|---|---|---|---|
| Symbol | Heating temp. $T_2$ (°C.) | Rate of temperature rise (°C./s) | $t_2$ (s) | $S_2$ | Cooling rate down to Ms (°C./s) | Ms to 100° C. cooling rate (°C./s) |
| f1 | 810 | 10 | 10 | 18717 | 120 | 60 |
| f2 | 970 | 2 | 0.05 | 18671 | 100 | 45 |
| f3 | 870 | 1500 | 1 | 18631 | 110 | 55 |
| f4 | 870 | 9 | 1 | 18631 | 105 | 40 |
| f5 | 870 | 9 | 0.1 | 17498 | 105 | 40 |
| f6 | 910 | 10 | 0.5 | 18935 | 5 | 50 |
| f7 | 960 | 8 | 0.1 | 18888 | 60 | 1 |
| f8 | 800 | 10 | 5 | 18223 | 120 | 60 |
| f9 | 980 | 2 | 0.01 | 17954 | 100 | 45 |
| f10 | 870 | 1500 | 0.2 | 17839 | 110 | 55 |
| f11 | 920 | 10 | 0.3 | 18834 | 5 | 50 |
| f12 | 980 | 8 | 0.05 | 18822 | 60 | 1 |
| f13 | 810 | 10 | 4 | 18290 | 120 | 60 |
| f14 | 940 | 2 | 0.05 | 18217 | 100 | 45 |
| f15 | 850 | 1500 | 1 | 18302 | 110 | 55 |
| f16 | 850 | 9 | 1 | 18302 | 105 | 40 |
| f17 | 850 | 9 | 0.1 | 17189 | 105 | 40 |
| f18 | 890 | 10 | 0.5 | 18612 | 5 | 50 |
| f19 | 940 | 8 | 0.1 | 18579 | 60 | 1 |
| f20 | 800 | 10 | 2 | 17800 | 120 | 60 |
| f21 | 960 | 2 | 0.01 | 17665 | 100 | 45 |
| f22 | 850 | 1500 | 0.2 | 17524 | 110 | 55 |
| f23 | 900 | 10 | 0.3 | 18516 | 5 | 50 |
| f24 | 960 | 8 | 0.05 | 18519 | 60 | 1 |

TABLE 19-1

| | | Coated steel member | | | | | | | |
|---|---|---|---|---|---|---|---|---|---|
| | Symbol | Maximum Cu content in Al—Fe-based coating (mass %) | Maximum Mo content in Al—Fe-based coating (mass %) | Maximum Ni content in Al—Fe-based coating (mass %) | Maximum Mn content in Al—Fe-based coating (mass %) | Maximum Cr content in Al—Fe-based coating (mass %) | Concentration of corrosion resistance elements in in Al—Fe-based coating (mass %) | Maximum Si content in Al—Fe-based coating (mass %) | Al—Fe-based coating thickness (μM) |
| Inv. ex. | F1 | 0.16 | 0.15 | 0.00 | 0.62 | 0.00 | 0.17 | 11 | 30 |
| | F2 | 0.18 | 0.20 | 0.00 | 0.83 | 0.00 | 0.19 | 12 | 30 |
| | F3 | 0.17 | 0.20 | 0.00 | 0.91 | 0.00 | 0.18 | 12 | 30 |
| | F4 | 0.16 | 0.16 | 0.00 | 0.71 | 0.00 | 0.17 | 11 | 30 |
| | F5 | 0.13 | 0.10 | 0.00 | 0.52 | 0.00 | 0.14 | 11 | 30 |
| | F6 | 0.16 | 0.19 | 0.00 | 0.80 | 0.00 | 0.17 | 12 | 30 |
| | F7 | 0.16 | 0.18 | 0.00 | 0.79 | 0.00 | 0.17 | 12 | 30 |
| | F8 | 0.16 | 0.18 | 0.00 | 0.78 | 0.00 | 0.17 | 12 | 30 |
| | F9 | 0.16 | 0.19 | 0.00 | 0.81 | 0.00 | 0.17 | 12 | 30 |
| | F10 | 0.20 | 0.13 | 0.16 | 0.60 | 0.14 | 0.21 | 9 | 30 |
| | F11 | 0.21 | 0.15 | 0.20 | 0.74 | 0.23 | 0.22 | 10 | 30 |
| | F12 | 0.22 | 0.14 | 0.18 | 0.70 | 0.18 | 0.23 | 10 | 30 |
| | F13 | 0.19 | 0.13 | 0.15 | 0.66 | 0.15 | 0.20 | 10 | 30 |
| | F14 | 0.14 | 0.10 | 0.12 | 0.49 | 0.12 | 0.15 | 9 | 30 |
| | F15 | 0.20 | 0.15 | 0.17 | 0.65 | 0.15 | 0.21 | 9 | 30 |
| | F16 | 0.19 | 0.14 | 0.16 | 0.62 | 0.15 | 0.20 | 10 | 30 |
| | F17 | 0.20 | 0.14 | 0.17 | 0.66 | 0.14 | 0.21 | 10 | 30 |
| | F18 | 0.21 | 0.14 | 0.17 | 0.67 | 0.16 | 0.22 | 10 | 30 |
| | F19 | 0.31 | 0.15 | 0.21 | 3.00 | 0.00 | 0.35 | 0 | 35 |
| | F20 | 0.21 | 2.50 | 0.21 | 0.36 | 0.00 | 0.23 | 0 | 35 |
| | F21 | 0.20 | 0.15 | 1.00 | 0.36 | 1.60 | 0.24 | 0 | 35 |
| | F22 | 0.10 | 1.20 | 0.80 | 1.50 | 1.20 | 0.15 | 0 | 35 |
| | F23 | 0.30 | 0.10 | 0.00 | 5.00 | 0.12 | 0.36 | 0 | 35 |
| | F24 | 0.23 | 2.00 | 0.00 | 0.39 | 0.12 | 0.25 | 0 | 35 |
| | F25 | 0.21 | 0.10 | 1.00 | 0.39 | 2.00 | 0.25 | 0 | 35 |
| | F26 | 0.11 | 1.50 | 1.20 | 2.00 | 0.80 | 0.17 | 0 | 35 |
| | F27 | 0.24 | 0.55 | 0.29 | 1.36 | 0.40 | 0.27 | 0 | 50 |
| | F28 | 0.22 | 0.19 | 1.05 | 0.77 | 0.00 | 0.24 | 0 | 50 |
| | F29 | 0.24 | 0.14 | 0.00 | 1.89 | 0.20 | 0.27 | 0 | 50 |
| | F30 | 0.24 | 0.03 | 0.00 | 0.72 | 0.00 | 0.25 | 8 | 50 |
| | F31 | 0.25 | 2.68 | 0.27 | 0.89 | 1.06 | 0.29 | 10 | 50 |

TABLE 19-1-continued

| | | | | | Coated steel member | | | |
|---|---|---|---|---|---|---|---|---|
| Symbol | Maximum Cu content in Al—Fe- based coating (mass %) | Maximum Mo content in Al—Fe- based coating (mass %) | Maximum Ni content in Al—Fe- based coating (mass %) | Maximum Mn content in Al—Fe- based coating (mass %) | Maximum Cr content in Al—Fe- based coating (mass %) | Concentration of corrosion resistance elements in Al—Fe- based coating (mass %) | Maximum Si content in Al—Fe- based coating (mass %) | Al—Fe- based coating thickness (μM) |
| F32 | 0.24 | 0.72 | 0.00 | 0.67 | 1.96 | 0.28 | 8 | 50 |
| F33 | 0.23 | 0.21 | 0.68 | 0.59 | 0.30 | 0.25 | 15 | 50 |
| F34 | 0.25 | 0.19 | 0.22 | 1.32 | 0.34 | 0.27 | 11 | 50 |
| F35 | 0.27 | 0.35 | 0.18 | 0.95 | 0.12 | 0.29 | 0 | 35 |
| F36 | 0.34 | 0.50 | 0.41 | 1.20 | 0.45 | 0.37 | 0 | 35 |
| F37 | 0.17 | 0.17 | 0.06 | 0.57 | 0.03 | 0.18 | 0 | 20 |
| F38 | 0.22 | 0.21 | 0.20 | 0.59 | 0.17 | 0.23 | 0 | 20 |

TABLE 19-2

| | | Coated steel member | | | | | |
|---|---|---|---|---|---|---|---|
| | Symbol | Average Al content in Al—Fe- based coating (mass %) | Average Fe content in Al—Fe- based coating (mass %) | Minimum Cu content in Al—Fe- based coating (mass %) | Max/min Cu in Al—Fe- based coating | Tensile strength (MPa) | CCT No. of cycles |
| Inv. ex. | F1 | 33 | 59 | 0.09 | 1.8 | 1945 | 276 |
| | F2 | 33 | 58 | 0.09 | 2.0 | 1903 | 360 |
| | F3 | 32 | 59 | 0.09 | 1.9 | 1902 | 360 |
| | F4 | 33 | 59 | 0.07 | 2.3 | 1949 | 264 |
| | F5 | 33 | 59 | 0.06 | 2.2 | 1941 | 204 |
| | F6 | 32 | 59 | 0.08 | 2.0 | 1947 | 360 |
| | F7 | 32 | 59 | 0.08 | 2.0 | 1789 | 360 |
| | F8 | 32 | 59 | 0.08 | 2.0 | 1936 | 360 |
| | F9 | 32 | 59 | 0.08 | 2.0 | 1937 | 360 |
| | F10 | 35 | 58 | 0.11 | 1.8 | 2145 | 252 |
| | F11 | 35 | 58 | 0.11 | 1.9 | 2103 | 360 |
| | F12 | 34 | 59 | 0.11 | 2.0 | 2102 | 360 |
| | F13 | 35 | 58 | 0.09 | 2.1 | 2149 | 258 |
| | F14 | 35 | 58 | 0.06 | 2.3 | 2141 | 204 |
| | F15 | 35 | 58 | 0.11 | 1.8 | 2147 | 360 |
| | F16 | 35 | 58 | 0.10 | 1.9 | 1920 | 360 |
| | F17 | 35 | 58 | 0.11 | 1.8 | 2135 | 360 |
| | F18 | 35 | 58 | 0.12 | 1.8 | 2136 | 360 |
| | F19 | 40 | 59 | 0.17 | 1.8 | 2102 | 270 |
| | F20 | 41 | 58 | 0.09 | 2.3 | 2102 | 171 |
| | F21 | 40 | 59 | 0.14 | 1.4 | 2100 | 172 |
| | F22 | 41 | 58 | 0.06 | 1.7 | 2104 | 162 |
| | F23 | 40 | 59 | 0.17 | 1.8 | 2195 | 240 |
| | F24 | 41 | 58 | 0.10 | 2.3 | 2192 | 165 |
| | F25 | 41 | 58 | 0.14 | 1.5 | 2194 | 165 |
| | F26 | 41 | 58 | 0.07 | 1.6 | 2190 | 162 |
| | F27 | 40 | 59 | 0.11 | 2.2 | 2700 | 165 |
| | F28 | 40 | 59 | 0.10 | 2.2 | 2230 | 222 |
| | F29 | 40 | 59 | 0.12 | 2.0 | 2523 | 192 |
| | F30 | 35 | 59 | 0.16 | 1.5 | 2310 | 183 |
| | F31 | 35 | 58 | 0.17 | 1.5 | 2335 | 234 |
| | F32 | 36 | 58 | 0.16 | 1.5 | 2436 | 219 |
| | F33 | 32 | 58 | 0.15 | 1.5 | 2345 | 227 |
| | F34 | 33 | 59 | 0.17 | 1.5 | 2513 | 213 |
| | F35 | 40 | 59 | 0.14 | 1.9 | 1937 | 360 |
| | F36 | 40 | 59 | 0.18 | 1.9 | 2136 | 360 |
| | F37 | 40 | 59 | 0.06 | 2.8 | 1937 | 360 |
| | F38 | 40 | 59 | 0.09 | 2.4 | 2136 | 360 |

TABLE 20-1

| | | Coated steel member | | | | | | | |
|---|---|---|---|---|---|---|---|---|---|
| | Symbol | Maximum Cu content in Al—Fe-based coating (mass %) | Maximum Mo content in Al—Fe-based coating (mass %) | Maximum Ni content in Al—Fe-based coating (mass %) | Maximum Mn content in Al—Fe-based coating (mass %) | Maximum Cr content in Al—Fe-based coating (mass %) | Concentration of corrosion resistance elements in in Al—Fe-based coating (mass %) | Maximum Si content in Al—Fe-based coating (mass %) | Al—Fe-based coating thickness (μM) |
| Comp. ex. | f1 | 0.09 | 0.14 | 0.00 | 0.55 | 0.00 | 0.10 | 10 | 30 |
| | f2 | 0.09 | 0.16 | 0.00 | 0.65 | 0.00 | 0.10 | 10 | 30 |
| | f3 | 0.08 | 0.15 | 0.00 | 0.58 | 0.00 | 0.09 | 10 | 30 |
| | f4 | 0.09 | 0.15 | 0.00 | 0.60 | 0.00 | 0.10 | 10 | 30 |
| | f5 | 0.08 | 0.08 | 0.00 | 0.33 | 0.00 | 0.08 | 10 | 30 |
| | f6 | 0.08 | 0.16 | 0.00 | 0.61 | 0.00 | 0.09 | 10 | 30 |
| | f7 | 0.09 | 0.16 | 0.00 | 0.63 | 0.00 | 0.10 | 10 | 30 |
| | f8 | 0.09 | 0.09 | 0.13 | 0.49 | 0.10 | 0.10 | 9 | 30 |
| | f9 | 0.09 | 0.12 | 0.15 | 0.56 | 0.11 | 0.10 | 9 | 30 |
| | f10 | 0.09 | 0.10 | 0.13 | 0.50 | 0.11 | 0.10 | 9 | 30 |
| | f11 | 0.09 | 0.12 | 0.14 | 0.58 | 0.12 | 0.10 | 9 | 30 |
| | f12 | 0.10 | 0.11 | 0.15 | 0.57 | 0.13 | 0.11 | 9 | 30 |
| | f13 | 0.09 | 0.12 | 0.05 | 0.32 | 0.03 | 0.10 | 0 | 35 |
| | f14 | 0.09 | 0.11 | 0.05 | 0.32 | 0.03 | 0.10 | 0 | 35 |
| | f15 | 0.09 | 0.12 | 0.05 | 0.32 | 0.03 | 0.10 | 0 | 35 |
| | f16 | 0.09 | 0.12 | 0.06 | 0.32 | 0.03 | 0.10 | 0 | 35 |
| | f17 | 0.08 | 0.13 | 0.06 | 0.31 | 0.04 | 0.09 | 0 | 35 |
| | f18 | 0.10 | 0.11 | 0.06 | 0.31 | 0.04 | 0.11 | 0 | 35 |
| | f19 | 0.09 | 0.12 | 0.05 | 0.31 | 0.04 | 0.10 | 0 | 35 |
| | f20 | 0.09 | 0.17 | 0.13 | 0.39 | 0.15 | 0.10 | 0 | 35 |
| | f21 | 0.09 | 0.16 | 0.13 | 0.39 | 0.14 | 0.10 | 0 | 35 |
| | f22 | 0.08 | 0.16 | 0.14 | 0.40 | 0.14 | 0.09 | 0 | 35 |
| | f23 | 0.10 | 0.16 | 0.14 | 0.40 | 0.14 | 0.11 | 0 | 35 |
| | f24 | 0.10 | 0.17 | 0.13 | 0.40 | 0.14 | 0.11 | 0 | 35 |

TABLE 20-2

| | | Coated steel member | | | | | |
|---|---|---|---|---|---|---|---|
| | Symbol | Average Al content in Al—Fe-based coating (mass %) | Average Fe content in Al—Fe-based coating (mass %) | Minimum Cu content in Al—Fe-based coating (mass %) | Max/min Cu in Al—Fe-based coating | Tensile strength (MPa) | CCT No. of cycles |
| Comp. ex. | f1 | 34 | 59 | 0.04 | 2.3 | 1646 | 117 |
| | f2 | 34 | 59 | 0.05 | 1.8 | 1901 | 108 |
| | f3 | 34 | 59 | 0.03 | 2.7 | 1953 | 105 |
| | f4 | 34 | 59 | 0.05 | 1.8 | 1945 | 99 |
| | f5 | 34 | 59 | 0.04 | 2.0 | 1940 | 97 |
| | f6 | 34 | 59 | 0.04 | 2.0 | 824 | 360 |
| | f7 | 34 | 59 | 0.04 | 2.3 | 1445 | 183 |
| | f8 | 35 | 58 | 0.04 | 2.3 | 1826 | 93 |
| | f9 | 35 | 58 | 0.05 | 1.8 | 2081 | 87 |
| | f10 | 35 | 58 | 0.05 | 1.8 | 2133 | 81 |
| | f11 | 35 | 58 | 0.05 | 1.8 | 1004 | 348 |
| | f12 | 35 | 58 | 0.05 | 2.0 | 1480 | 165 |
| | f13 | 40 | 59 | 0.05 | 1.8 | 1657 | 126 |
| | f14 | 40 | 59 | 0.05 | 1.8 | 1907 | 114 |
| | f15 | 40 | 59 | 0.04 | 2.3 | 1942 | 105 |
| | f16 | 40 | 59 | 0.04 | 2.3 | 1936 | 105 |
| | f17 | 40 | 59 | 0.03 | 2.7 | 1927 | 97 |
| | f18 | 40 | 59 | 0.04 | 2.5 | 834 | 360 |
| | f19 | 40 | 59 | 0.04 | 2.3 | 1450 | 186 |
| | f20 | 41 | 58 | 0.05 | 1.8 | 1838 | 93 |
| | f21 | 41 | 58 | 0.05 | 1.8 | 2089 | 87 |
| | f22 | 41 | 58 | 0.03 | 2.7 | 2124 | 81 |
| | f23 | 41 | 58 | 0.04 | 2.5 | 994 | 360 |
| | f24 | 41 | 58 | 0.04 | 2.5 | 1485 | 168 |

INDUSTRIAL APPLICABILITY

According to the present invention, it becomes possible to obtain a coated steel member and steel sheet excellent in hydrogen embrittlement resistance in a corrosive environment. The coated steel member according to the present invention is particularly suitable for a frame part of an automobile.

The invention claimed is:

1. A hot stamped member comprising an Al—Fe-based coating on its surface,
   the Al—Fe-based coating containing Cu and one or more of Mo, Ni, Mn, and Cr in a total by mass % of 0.12% or more,
   the contents of Cu, Mo, Ni, Mn, and Cr satisfying, by mass %, Cu+0.01×63.5(Mo/95.9+Ni/58.7+Mn/54.9+Cr/52.0)≥0.12%, wherein:
   a thickness of the Al—Fe-based coating is 10 to 100 μm, and
   the chemical composition of the Al—Fe-based coating satisfies, by mass %:
   an average value of Al content in a thickness direction: 20.0% or more,
   an average value of Fe content in the thickness direction: 50.0% or more,
   a minimum value of Cu content in the thickness direction: 0.06% or more, and
   a ratio of a maximum value and a minimum value of Cu content in the thickness direction: 1.4 or more.

2. The hot stamped member according to claim 1 wherein a chemical composition of the part of the hot stamped member other than the Al—Fe-based coating comprises, by mass %,
   C: 0.25 to 0.60%,
   Si: 0.25 to 2.00%,
   Mn: 0.30 to 3.00%,
   P: 0.050% or less,
   S: 0.0100% or less,
   N: 0.010% or less,
   Ti: 0.010 to 0.100%,
   B: 0.0005 to 0.0100%,
   Mo: 0.10 to 1.00%,
   Cu: 0.01 to 1.00%,
   Cr: 0 to 1.00%,
   Ni: 0 to 1.00%,
   V: 0 to 1.00%,
   Ca: 0 to 0.010%,
   Al: 0 to 1.00%,
   Nb: 0 to 0.10%,
   Sn: 0 to 1.00%,
   W: 0 to 1.00%,
   Sb: 0 to 1.00%,
   REM: 0 to 0.30%, and
   balance: Fe and impurities.

3. The hot stamped member according to claim 2 wherein the Al—Fe-based coating contains, by mass %, Si in 1 to 20%.

4. A method for manufacturing the hot stamped member according to claim 2, the method comprising the steps of:
   heating a coated steel sheet for hot stamping under conditions where, when defining a peak temperature as $T_2$ (° C.) and a time from when a temperature of the coated steel sheet for hot stamping reaches a temperature lower by 10° C. from $T_2$ (° C.) as $t_2$ (hr), $(T_2+273-10) \times (\log t_2+20) \geq 19000$, an $Ac_3$ point≤$T_2$≤($Ac_3$ point+300)° C., and an average rate of temperature rise 5 to 1000° C./s, the coated steel sheet for hot stamping selected from (A), (B), or (C)
   (A) a coated steel sheet for hot stamping having a layer where Cu is concentrated at a surface of a steel sheet, having a degree of Cu surface concentration at the layer where Cu is concentrated of 1.2 or more, further having an Al-based coating on the layer where Cu is concentrated, and having an average crystal grain size of the steel sheet of 30 μm or less,
   (B) a coated steel sheet for hot stamping comprised of a steel sheet, an intermediate layer positioned on a surface of the steel sheet, and an Al-based coating positioned on a surface of the intermediate layer, the intermediate layer containing Cu and one or more of Mo, Ni, Mn, and Cr in a total by mass % of 30% or more,
   (C) a coated steel sheet for hot stamping comprised of a steel sheet and an Al-based coating positioned on a surface of the steel sheet, the Al-based coating containing Cu, the Al-based coating containing Cu and one or more of Mo, Ni, Mn, and Cr in a total by mass % of 1.0% or more; and
   cooling the heated coated steel sheet for hot stamping down to an Ms point by an average cooling rate made an upper critical cooling rate or more, then cooling from the Ms point down to 100° C. or less by an average cooling rate of 5° C./s or more;
   here, the "degree of Cu surface concentration" shows the ratio of (maximum content of Cu in range from surface of steel sheet to depth of 0 to 30 μm)/(average content of Cu from surface of steel sheet to depth of 200 μm), while the "surface of steel sheet" means the position of a depth where the Fe content becomes 90% when performing GDS from the surface of the coated steel sheet in the thickness direction.

5. The method according to claim 4, wherein the coated steel sheet for hot stamping is hot shaped during cooling down to the Ms point.

6. The hot stamped member according to claim 1 wherein the Al—Fe-based coating contains, by mass %, Si in 1 to 20%.

7. A method for manufacturing the hot stamped member according to claim 6, the method comprising the steps of:
   heating a coated steel sheet for hot stamping under conditions where, when defining a peak temperature as $T_2$ (° C.) and a time from when a temperature of the coated steel sheet for hot stamping reaches a temperature lower by 10° C. from $T_2$ (° C.) as $t_2$ (hr), $(T_2+273-10) \times (\log t_2+20) \geq 19000$, an $Ac_3$ point≤$T_2$≤($Ac_3$ point+300)° C., and an average rate of temperature rise 5 to 1000° C./s, the coated steel sheet for hot stamping selected from (A), (B), or (C)
   (A) a coated steel sheet for hot stamping having a layer where Cu is concentrated at a surface of a steel sheet, having a degree of Cu surface concentration at the layer where Cu is concentrated of 1.2 or more, further having an Al-based coating on the layer where Cu is concentrated, and having an average crystal grain size of the steel sheet of 30 μm or less,
   (B) a coated steel sheet for hot stamping comprised of a steel sheet, an intermediate layer positioned on a surface of the steel sheet, and an Al-based coating positioned on a surface of the intermediate layer, the intermediate layer containing Cu and one or more of Mo, Ni, Mn, and Cr in a total by mass % of 30% or more, (C) a coated steel sheet for hot stamping comprised of a steel sheet and an Al-based coating positioned on a surface of the steel sheet, the Al-based coating containing Cu, the Al-based coating containing Cu and one or more of Mo, Ni, Mn, and Cr in a total by mass % of 1.0% or more; and cooling the heated coated steel sheet for hot stamping down to an Ms point by an average cooling rate made an upper critical cooling rate or more, then cooling from the Ms point down to 100° C. or less by an average cooling rate of 5° C./s or more;

here, the "degree of Cu surface concentration" shows the ratio of (maximum content of Cu in range from surface of steel sheet to depth of 0 to 30 μm)/(average content of Cu from surface of steel sheet to depth of 200 μm), while the "surface of steel sheet" means the position of a depth where the Fe content becomes 90% when performing GDS from the surface of the coated steel sheet in the thickness direction.

8. A method for manufacturing the hot stamped member according to claim 1, the method comprising the steps of:

heating a coated steel sheet for hot stamping under conditions where, when defining a peak temperature as $T_2$ (° C.) and a time from when a temperature of the coated steel sheet for hot stamping reaches a temperature lower by 10° C. from $T_2$(° C.) as $t_2$ (hr), $(T_2+273-10) \times (\log t_2+20) \geq 19000$, an $Ac_3$ point $\leq T_2 \leq (Ac_3$ point+ 300)° C., and an average rate of temperature rise 5 to 1000° C./s, the coated steel sheet for hot stamping selected from (A), (B), or (C)

(A) a coated steel sheet for hot stamping having a layer where Cu is concentrated at a surface of a steel sheet, having a degree of Cu surface concentration at the layer where Cu is concentrated of 1.2 or more, further having an Al-based coating on the layer where Cu is concentrated, and having an average crystal grain size of the steel sheet of 30 μm or less, (B) a coated steel sheet for hot stamping comprised of a steel sheet, an intermediate layer positioned on a surface of the steel sheet, and an Al-based coating positioned on a surface of the intermediate layer, the intermediate layer containing Cu and one or more of Mo, Ni, Mn, and Cr in a total by mass % of 30% or more, (C) a coated steel sheet for hot stamping comprised of a steel sheet and an Al-based coating positioned on a surface of the steel sheet, the Al-based coating containing Cu, the Al-based coating containing Cu and one or more of Mo, Ni, Mn, and Cr in a total by mass % of 1.0% or more;

and cooling the heated coated steel sheet for hot stamping down to an Ms point by an average cooling rate made an upper critical cooling rate or more, then cooling from the Ms point down to 100° C. or less by an average cooling rate of 5° C./s or more;

here, the "degree of Cu surface concentration" shows the ratio of (maximum content of Cu in range from surface of steel sheet to depth of 0 to 30 μm)/(average content of Cu from surface of steel sheet to depth of 200 μm), while the "surface of steel sheet" means the position of a depth where the Fe content becomes 90% when performing GDS from the surface of the coated steel sheet in the thickness direction.

9. The method according to claim 8, wherein the coated steel sheet for hot stamping is hot shaped during cooling down to the Ms point.

10. The method for manufacturing the hot stamped member according to claim 8, wherein the coated steel sheet for hot stamping has a chemical composition of the steel sheet comprising, by mass %, C: 0.25 to 0.60%, Si: 0.25 to 2.00%, Mn: 0.30 to 3.00%, P: 0.050% or less, S: 0.0100% or less, N: 0.010% or less, Ti: 0.010 to 0.100%, B: 0.0005 to 0.0100%, Mo: 0.10 to 1.00%, Cu: 0.01 to 1.00%, Cr: 0 to 1.00%, Ni: 0 to 1.00%, V: 0 to 1.00%, Ca: 0 to 0.010%, Al: 0 to 1.00%, Nb: 0 to 0.10%, Sn: 0 to 1.00%, W: 0 to 1.00%, Sb: 0 to 1.00%, REMs: 0 to 0.30%, and balance: Fe and impurities.

11. The hot stamped member according to claim 1, wherein a tensile strength of the hot stamped member is more than 1500 MPa.

12. The hot stamped member according to claim 1, wherein the hot stamped member other than the Al—Fe-based coating comprises C of 0.25 mass % or more and 0.6 mass % or less.

13. The hot stamped member according to claim 1, wherein a structure of the hot stamped member comprises martensite of 70% or more, and balance including one or more of retained austenite, bainite, ferrite and pearlite.

14. The method for manufacturing the hot stamped member according to claim 4, wherein the coated steel sheet for hot stamping has a chemical composition of the steel sheet comprising, by mass%, C: 0.25 to 0.60%, Si: 0.25 to 2.00%, Mn: 0.30 to 3.00%, P: 0.050% or less, S: 0.0100% or less, N: 0.010% or less, Ti: 0.010 to 0.100%, B 0.0005 to 0.0100%, Mo: 0.10 to 1.00%, Cu: 0.01 to 1.00%, Cr: 0 to 1.00%, Ni: 0 to 1.00%, V: 0 to 1.00%, Ca: 0 to 0.010%, Al: 0 to 1.00%, Nb: 0 to 0.10%, Sn: 0 to 1.00%, W: 0 to 1.00%, Sb: 0 to 1.00%, REMs: 0 to 0.30%, and balance: Fe and impurities.

15. The method for manufacturing the hot stamped member according to claim 7, wherein the coated steel sheet for hot stamping has a chemical composition of the steel sheet comprising, by mass%, C: 0.25 to 0.60%, Si: 0.25 to 2.00%, Mn: 0.30 to 3.00%, P: 0.050% or less, S: 0.0100% or less, N: 0.010% or less, Ti: 0.010 to 0.100%, B 0.0005 to 0.0100%, Mo: 0.10 to 1.00%, Cu: 0.01 to 1.00%, Cr: 0 to 1.00%, Ni: 0 to 1.00%, V: 0 to 1.00%, Ca: 0 to 0.010%, Al: 0 to 1.00%, Nb: 0 to 0.10%, Sn: 0 to 1.00%, W: 0 to 1.00%, Sb: 0 to 1.00%, REMs: 0 to 0.30%, and balance: Fe and impurities.

\* \* \* \* \*